United States Patent
Harrison et al.

(10) Patent No.: US 9,264,226 B2
(45) Date of Patent: Feb. 16, 2016

(54) METHOD AND APPARATUS FOR SELECTIVELY ROUTING ENTANGLEMENT BUILDING

(75) Inventors: Keith Harrison, Chepstow (GB); William Munro, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 931 days.

(21) Appl. No.: 13/387,111

(22) PCT Filed: Oct. 26, 2009

(86) PCT No.: PCT/GB2009/051437
§ 371 (c)(1),
(2), (4) Date: Jan. 25, 2012

(87) PCT Pub. No.: WO2010/128268
PCT Pub. Date: Nov. 11, 2010

(65) Prior Publication Data
US 2012/0155870 A1   Jun. 21, 2012

(30) Foreign Application Priority Data
May 8, 2009   (GB) .................................. 0907936.9

(51) Int. Cl.
*H04B 10/00* (2013.01)
*H04L 9/08* (2006.01)
(Continued)

(52) U.S. Cl.
CPC .............. *H04L 9/0855* (2013.01); *B82Y 10/00* (2013.01); *G06N 99/002* (2013.01); *H04B 10/70* (2013.01); *H04L 2209/38* (2013.01)

(58) Field of Classification Search
USPC ......................................................... 398/45
See application file for complete search history.

(56) References Cited

U.S. PATENT DOCUMENTS

| 7,639,953 B2* | 12/2009 | Spillane | B82Y 10/00 250/214.1 |
| 8,103,172 B2* | 1/2012 | Peters | H04L 9/0855 398/140 |

(Continued)

FOREIGN PATENT DOCUMENTS

| EP | 1383267 B1 | 5/2006 |
| EP | 1865657 A1 | 12/2007 |

(Continued)

OTHER PUBLICATIONS

Bennett, et al. "Teleporting an Unknown Quantum State Via Dual Classical and Einstein-Podolsky-Rosen Channels," Physical Review Letters, American Physical Society, New York, US LNKD-DOI: 10.1103/PHYSREVLETT.70.1895, vol. 70, No. 13, Mar. 29, 1993, pp. 1895-1899.

(Continued)

*Primary Examiner* — Agustin Bello
(74) *Attorney, Agent, or Firm* — Hewlett Packard Enterprise Patent Department

(57) ABSTRACT

A method and apparatus (80) are provided for routing entanglement building between a selected pairing of interface qubits (82). The qubits of the selected pairing of interface qubits (82) are separately entangled with at least one intermediate qubit (84) by interacting respective light fields with the interface qubits of the selected pairing and using an optical merge arrangement (83) to further interact the light fields with at least one intermediate qubit (84). Where there are multiple intermediate qubits (84) the intermediate qubits are entangled with each other. The or each entangled intermediate qubit (84) is then removed from entanglement.

18 Claims, 22 Drawing Sheets

(51) Int. Cl.
B82Y 10/00 (2011.01)
G06N 99/00 (2010.01)
H04B 10/70 (2013.01)

(56) References Cited

U.S. PATENT DOCUMENTS

| | | | | |
|---|---|---|---|---|
| 8,135,276 | B2* | 3/2012 | Munro | B82Y 10/00 250/251 |
| 8,270,841 | B2* | 9/2012 | Nishioka | H04B 10/70 380/255 |
| 8,781,334 | B2* | 7/2014 | Munro | B82Y 10/00 398/173 |
| 8,913,900 | B2* | 12/2014 | Lukin | H04B 10/30 398/176 |
| 2003/0002674 | A1 | 1/2003 | Nambu et al. | |
| 2003/0123516 | A1* | 7/2003 | Steinberg | B82Y 10/00 372/102 |
| 2004/0131179 | A1 | 7/2004 | Ichimura et al. | |
| 2004/0264958 | A1* | 12/2004 | Zoller | H04B 10/70 398/40 |
| 2005/0111665 | A1 | 5/2005 | Ichimura et al. | |
| 2008/0025804 | A1 | 1/2008 | Heule | |
| 2008/0258049 | A1* | 10/2008 | Kuzmich | B82Y 10/00 250/214.1 |
| 2009/0097862 | A1* | 4/2009 | Munro | B82Y 10/00 398/175 |
| 2009/0317089 | A1* | 12/2009 | Peters | H04L 9/0855 398/173 |
| 2010/0226659 | A1* | 9/2010 | Nishioka | H04L 9/0852 398/154 |
| 2012/0050834 | A1* | 3/2012 | Harrison | B82Y 10/00 359/107 |
| 2012/0093521 | A1* | 4/2012 | Harrison | B82Y 10/00 398/173 |
| 2012/0134675 | A1* | 5/2012 | Munro | B82Y 10/00 398/58 |
| 2012/0148237 | A1* | 6/2012 | Harrison | B82Y 10/00 398/37 |
| 2012/0155870 | A1* | 6/2012 | Harrison | B82Y 10/00 398/45 |
| 2012/0177201 | A1* | 7/2012 | Ayling | H04L 9/0858 380/278 |
| 2015/0055961 | A1* | 2/2015 | Meyers | B82Y 10/00 398/140 |

FOREIGN PATENT DOCUMENTS

| | | |
|---|---|---|
| GB | 2470612 | 1/2010 |
| GB | 2456347 | 10/2010 |
| GB | 2470081 | 11/2010 |
| JP | 2007-329865 | 12/2007 |
| WO | WO-02/097725 A2 | 12/2002 |
| WO | WO-02097725 A2 | 12/2002 |
| WO | WO-2006/019858 A2 | 2/2006 |
| WO | WO-2007/021945 A2 | 2/2007 |
| WO | WO-2007/102408 A1 | 9/2007 |
| WO | WO-2009/155486 A1 | 12/2009 |
| WO | WO-2010127723 | 11/2010 |
| WO | WO-2010128268 A2 | 11/2010 |
| WO | WO-2010142355 | 12/2010 |

OTHER PUBLICATIONS

Chin-Wen Chou et al: "Functional Quantum Nodes for Entanglement Distribution Over Scalable Quantum Networks" Science American Assoc iation for the Advancement of Science USA, vol. 326, No. 5829 Jun. 1, 2007, pp. 1316-1320.

Collins, et al; "Multiplexed Memory-Insensitive Quantum Repeaters"; Physical Review Letters, American Physical Society, New York, US LNKDDOI:10.II03/PHYSREVLETT.98.060502, vol. 98, No. 6, Feb. 9, 2007, pp. 60502/1-60502/4.

Duan, et al; "Long-Distance Quantum Communication With Atomic Ensembles and Linear Optics", Nature, vol. 414, pp. 413-418, Nov. 22, 2001.

International Search Report and Written Opinion for PCT Application No. PCT/GB2009/051437, mailed Nov. 3, 2010, pp. 13.

Razavi, et al; "Physical and Architectural Considerations in Quantum Repeaters", Proceedings of the International Society for Optical Engineering, Quantum Communications Realized II, San Jose, US, Jan. 28, 2009, vol. 7236, pp. 723603-723615.

Van Meter, et al; "System Design for a Long-Line Quantum Repeater," IEEE/ACM Transaction on Networking, vol. 17, No. 3, Jun. 1, 2009, pp. 12.

Wu Xiang-Sheng; Memory-Based Quantum Repeater in Quantum Information Communication, China Phys.Soc. and IOP Publishing Ltd., vol. 13, No. 2, Feb. 2, 2004, pp. 5.

Cheng Lam Lam, Hideaki Matsueda, "Quantum Information Processing by Quantum Entanglement", Memoirs of the Faculty of Science, Kochi University, Japan, Department of Information Science, Faculty of Science, Kochi University, [Online], Mar. 25, 2005, vol. 26 (2005), No. 6, pp. 1-22, [Search on May 21, 2013], Internet URL, <http://memoirs.is.kochi-u.ac.jp/Vol26/MemoirsF26-6.pdf>.

GB Search report received in GB Application No. 0911276.4, mailed Sep. 24, 2010, p. 6.

GB Search Report received in Application No. GB0907936.9, mailed Aug. 31, 2010, p. 12.

GB Search Report Received in GB Application No. 0911274.9, mailed Sep. 8, 2010, p. 6.

Guo-Ping Guo, Chuan-Feng Li, Guang-Can Guo, "Quantum nondemolition measurement of nonlocal variables and its application in quantum authentication", arXiv:quant-ph/0103088, Quantum Physics, [online], May 15, 2001, [retrieved on Feb. 25, 2013]. Retrieved from the Internet, URL <http://arxiv.org/pdf/quant-ph/0103088v1.pdf>.

International Search Report and Written Opinion received in PCT Application No. PCT/EP/2009/064067, mailed Oct. 6, 2010, p. 15.

International Search Report and Written Opinion received in PCT Application No. PCT/EP2009/064065, mailed Oct. 5, 2010, p. 12.

International Search Report and Written Opinion Received in PCT Application No. PCT/EP2009/064069, Mailed Nov. 2, 2010, p. 14.

Liang Jiang, et al., "Quantum repeater with encoding", Physical Review A, Mar. 20, 2009, vol. 29, Issue 3, pp. 32325-1-10.

Mio Murao, "Quantum Information and Quantum Computer; Magnificent Fusion of Quantum Mechanics and Information Science; Quantum Information Processing Utilizing Entanglement", Mathematical Sciences, Japan, Saiensu-sha Co., Ltd., Jun. 1, 2001, vol. 39, No. 6, pp. 30-38.

P. van Loock, et al., "Hybrid Quantum Repeater Using Bright Coherent Light", Physical Review Letters, Jun. 23, 2006, vol. 96, pp. 240501-1-4.

Robert Raussendorf and Hans J. Briegel, "A One-Way Quantum Computer", Physical Review Letters, [Online], May 28, 2001, vol. 86, Issue 22, pp. 5188-5191, [retrieved on May 21, 2013]. Retrieved from the Internet URL <http://prl.aps.org/pdf/PRL/v86/i22/p5188_1>.

Satoshi Ishizaka, "Classification and detection methods of the quantum states toward the optimal entanglement distillation protocol", [Quanta and Information] Abstracts of Lectures of 1st Reaearch Completion Report Meeting, Japan, [Online] Nov. 16, 2006, pp. 1-8, [Search on May 21, 2013], Internet URL <http://www.jst.go.jp/kisoken/presto/complete/ryousi/sympo/youchi/ishizaka.pdf>.

\* cited by examiner

ELONGATE OPERATION (a)

(b)

(c)

"X Measurement" 12

(d)

METHOD AND APPARATUS FOR SELECTIVELY ROUTING ENTANGLEMENT BUILDING

This application claims priority from GB Patent Application No. 0907936.9, filed May 8, 2009 and entitled "Quantum Repeater and System and Method for Creating Extended Entanglements."

The present invention relates to a method and apparatus for selectively routing entanglement building.

BACKGROUND OF THE INVENTION

In quantum information systems, information is held in the "state" of a quantum system; typically this will be a two-level quantum system providing for a unit of quantum information called a quantum bit or "qubit". Unlike classical digital states which are discrete, a qubit is not restricted to discrete states but can be in a superposition of two states at any given time.

Any two-level quantum system can be used for a qubit and several physical implementations have been realized including ones based on the polarization states of single photons, electron spin, nuclear spin, and the coherent state of light.

One way of transferring quantum information between two locations uses the technique known as 'quantum teleportation'. This makes uses of two entangled qubits, known as a Bell pair, situated at respective ones of the locations; the term "entanglement" is also used in the present specification to refer to two entangled qubits. The creation of such a Bell pair is generally mediated by a light field sent over an optical channel (for example an optical waveguide such as optical fibre or silicon channels within a chip). Although this process is distance limited, where a respective qubit from two separate distributed Bell Pairs are co-located, it is possible to combine (or 'merge') the Bell pairs by a local quantum operation effected between the co-located qubits. This process, known as 'entanglement swapping', results in an entanglement between the two non co-located qubits of the Bell pairs while the co-located qubits cease to be entangled at all.

The device hosting the co-located qubits and which performs the local quantum operation to merge the Bell pairs is called a "quantum repeater". The basic role of a quantum repeater is to create a respective Bell pair with each of two neighbouring spaced nodes and then to merge the Bell pairs. By chaining multiple quantum repeaters, an end-to-end entanglement can be created between end points separated by any distance thereby permitting the transfer of quantum information between arbitrarily-spaced end points.

Where a desired entanglement between two qubits is not directly created by a mediating light field interacting with both qubits in turn, the entanglement is effectively built up from multiple entanglements each involving a respective mediating light field; the qubit-to-qubit path taken by each such light field can be thought of as defining a build path segment for the desired entanglement, the aggregate of these build path segments defining an overall entanglement build path for the desired entanglement corresponding to the combined qubit-to-qubit paths taken by the mediating light fields. Thus, an entanglement formed between first and second spaced endpoint qubits that are coupled through a quantum repeater, will have a build path comprising a first segment between the first endpoint qubit and a first qubit of the quantum repeater, a second segment between the first qubit of the quantum repeater and a second qubit of the repeater, and a third segment between the second qubit of the quantum repeater and the second endpoint qubit; note that in this example the segments are not formed in order, the second segment being created last.

By controlling the path of a mediating light field, the endpoint qubits involved in an entanglement can be controlled. In terms of the entanglement build path, this corresponds to the selective routing of a build path segment whereby entanglement building is selectively routed to occur between desired endpoint qubits. Typically, routing of a light field is effected by an optical switch; again, in terms of entanglement build paths, such a switch can be considered to be one example of an entanglement build path switch.

Optical switches are complex and expensive and the present invention is concerned with providing an entanglement build path switch that reduces or avoids entirely the use of optical switches.

SUMMARY OF THE INVENTION

According to the present invention, there is provided an apparatus and method for selectively routing entanglement building as set out in accompanying claims 1 and 14 respectively.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1A:
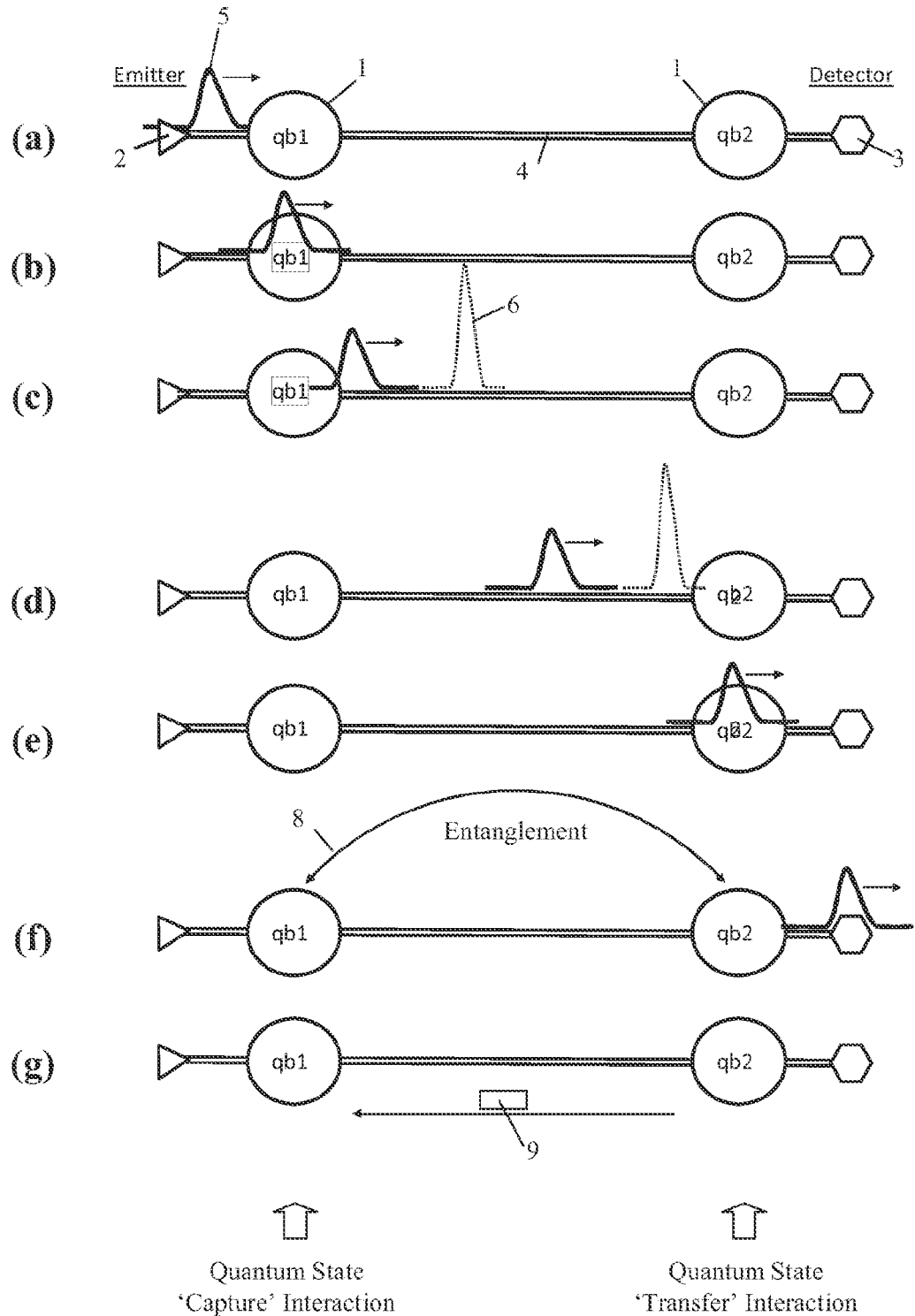
FIG. 1A is a diagram depicting a known operation for entangling two qubits.

Basic Entanglement Creation and Extension Operations
Entanglement Operation (FIG. 1A)

FIG. 1A depicts, in general terms, a known process (herein referred to as an "entanglement operation") for entangling two qubits qb1, qb2 (referenced 1) to create a Bell pair, the Figure showing a time series of snapshots (a) to (g) taken over the course of the entanglement operation. Where, as in the present case, the qubits qb1, qb2 are separated by a distance greater than a few millimeters, the creation of a Bell pair is mediated by photons, which may be sent through free space or aver a waveguide such as optical fibre 4. Very generally, processes for Bell-pair creation may be divided into those that use very weak amounts of light (single photons, pairs of photons, or laser pulses of very few photons) and those that use pulses of many photons from a coherent source, such as a laser. As will be understood by persons skilled in the art, the details of the methods of creating photons, performing entanglement operations, and making measurements differ depending on whether very weak amounts of light or laser pulses of many photons are used; however, as the present invention can be implemented using any such approach, the following description will be couched simply in terms of a "light field" being used to create (and subsequently extend Bell Pairs.

Considering FIG. 1A in more detail, a light field 5 emitted by an emitter 2 (snapshot (a)) is passed through the physical qubit qb1 (snapshot (b)) which is in a prepared non-classical state (for example: 0, +1); typically, the physical qubit implementation is as electron spin, the electron being set into a predetermined state immediately prior to passage of the light field. The light field 5 and qubit qb1 interact, with the light field 5 effectively 'capturing' the quantum state of the qubit qb1. The light field 5 then travels down the optical fibre 4 (snapshots (c) and (d)) and interacts with qubit qb2 (snapshot (e)) before being measured at detector 3 (snapshot (f)); if successful, this results in the 'transfer' of the quantum state of qubit qb1 to qubit qb2, entangling these qubits (in FIG. 1A, this entanglement is represented by double-headed arrowed arc 8, this form of representation being used generally throughout the drawings to depict entanglements). The properties of the light field 5 measured by detector 13 enable a determination to be made as whether or not the entanglement operation was successful. The success or failure of the entanglement operation is then passed back to the qb1 end of the fibre 4 in a classical (non-quantum) message 9 (snapshot (g)). This message can be very simple in form (the presence or absence of a single pulse) and as used herein the term "message" is to be understood to encompass both such simple forms as well as structured messages of any degree of complexity (subject to processing time constraints); in embodiments where the message 9 needs to identify a particular qubit amongst several as well as the success or failure of an entanglement operation, the message may still take the form of the presence or absence of a single pulse with the timing of the latter being used to identify the qubit concerned. Where there is a need to transmit information about the success/failure of the entanglement operation (or to identify an involve qubit) back to the qb1 end of the fibre 4, the overall elapsed time for the entanglement operation is at least the round trip propagation time along the fibre 4, even where the entanglement operation is successful.

An entanglement operation can be performed to entangle qubits 411 and qb2 whether or not qb2 is already entangled with another qubit (in the case of qb2 already being entangled with another qubit qbj when an entanglement operation is performed between qb1 and qb2, this results in the states of all three qubits qb1, qb2 and qbj becoming entangled).

The properties of the light field 5 measured by detector 3 also enable a determination to be made, in the case of a successful entanglement operation, as to whether the entangled states of the qb1 and qb2 are correlated or anti-correlated, this generally being referred to as the 'parity' of the entanglement even and odd parity respectively corresponding to correlated and anti-correlated qubit states). It is normally important to know the parity of an entanglement when subsequently using it as a result, either parity information must be stored or steps taken to ensure that the parity always ends up the same (for example, if an odd parity is determined, the state of qb2 can be flipped to produce an even parity whereby the parity of the entanglement between qb1 and qb2 always ends up even).

In fact, the relative parity of two entangled qubits is a two dimensional quantity often called the "generalized parity" and comprising both a qubit parity value and a conjugate qubit parity value. For a simple entanglement operation as depicted in FIG. 1A, the conjugate qubit parity value information is effectively even parity and need not be measured. "Generalized parity" requires two classical bits to represent it. In certain applications (such as QKD), knowledge of the conjugate qubit parity value information may not be required. Hereinafter, except where specific reference is being made to one of the components of "generalized parity" (that is, to the qubit parity value or the conjugate qubit parity value), reference to "parity" is to be understood to mean "generalized parity" but with the understanding that in appropriate cases, the conjugate qubit parity value information can be omitted.

As already indicated, the qubits qb1 and qb2 are typically physically implemented as electron spin. However, the practical lifetime of quantum information stored in this way is very short (of the order of $10^{-6}$ seconds cumulative) and therefore generally, immediately following the interaction of the light field 5 with qb1 and qb2, the quantum state of the cubit concerned is transferred to nuclear spin which has a much longer useful lifetime (typically of the order of a second, cumulatively). The quantum state can be later transferred back to electron spin for a subsequent light field interaction (such as to perform a merge of two entanglements, described below).

Another practical feature worthy of note is that the physical qubits qb1 and qb2 are generally kept shuttered from light except for the passage of light field 5. To facilitate this at the qb2 end of the fibre 4 (and to trigger setting the qubit into a prepared state immediately prior to its interaction with light field 5), the light field 5 can be preceded by a 'herald' light pulse 6; this light pulse is detected at the qb2 end of the fibre 14 and used to trigger priming of the qubit qb2 and then its un-shuttering for interaction with the light field 5. Other ways of triggering these tasks are alternatively possible.

The relationship between the probability of successfully creating a Bell pair, the distance between qubits involved, and the fidelity of the created pair is complex. By way of example, for one particular implementation using a light field in the form of a laser pulse of many photons; Bell pairs are created with fidelities of 0.77 or 0.638 for 10 km and 20 km distances respectively between qubits, and the creation succeeds on thirty eight to forty percent of the attempts. The main point is that the entanglement operation depicted in FIG. 1A is distance limited; for simplicity, in the following a probability of success of 0.25 is assumed at a distance of 10 km.

Figure 2:
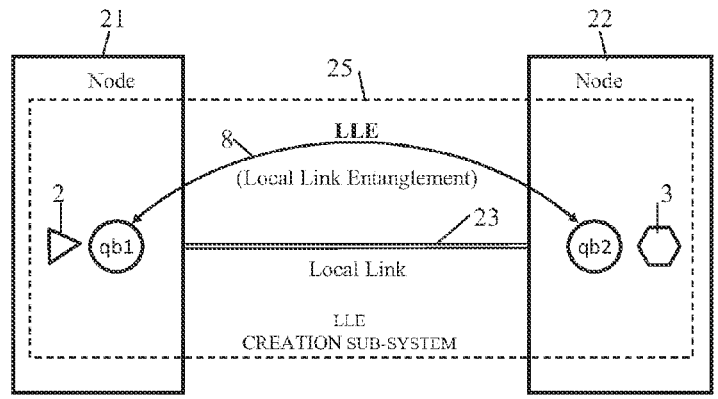
FIG. 2 is a diagram depicting an entanglement creation subsystem for carrying out an entanglement operation between two qubits located in respective, spaced, nodes.

LLE Creation Subsystem (FIG. 2)

An assembly of components for carrying out an entanglement operation is herein referred to as an "entanglement creation subsystem" and may be implemented locally within a piece of apparatus or between remotely located pieces of apparatus (generally referred to as nodes). FIG. 2 depicts an example of the latter case where two nodes 21 and 22 are optically coupled by an optical fibre 23; optical fibres, such as the fibre 23, providing a node-to-node link are herein called "local link" fibres. The nodes 21, 22 of FIG. 2 include components for implementing respective qubits qb1 and qb2 (for ease of understanding, the same qubit designations are used in FIG. 2 as in FIG. 1A). The qubits qb1 and qb2, together with an emitter 2 associated with qb1, a detector 3 associated with qb3, the local link fibre 23 and entanglement-operation control logic in each node (not shown), form an entanglement creation subsystem 25 for creating an entanglement 8 between qubits qb1 and qb2. An entanglement of this sort created by a light field passed across a local link fibre between nodes is herein called a "local link entanglement" or "LLE"; the node-spanning entanglement creation subsystem 25 is correspondingly called an "LLE creation subsystem".

Figure 1B:
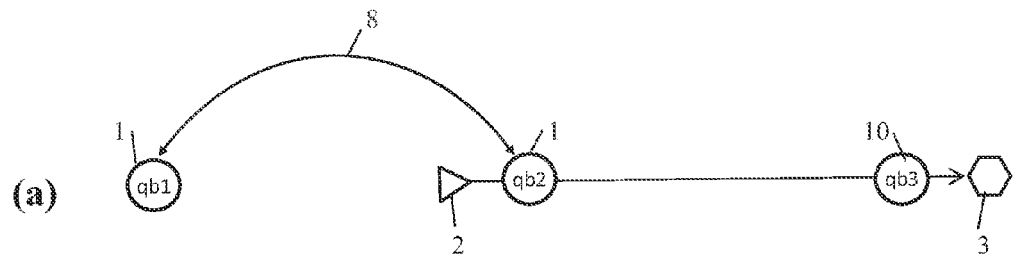
FIG. 1B is a diagram depicting an elongate operation thr extending an existing entanglement to create a new entanglement involving one of the originally-entangled qubits and a new qubit.
Figure 1B:
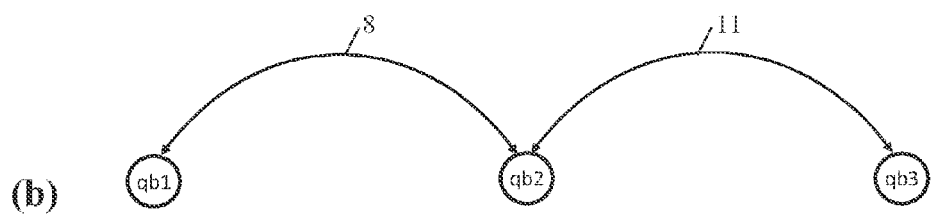
Figure 1B:
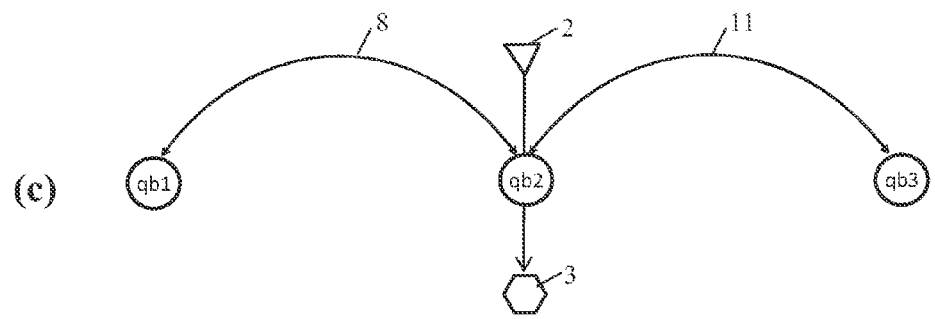
Figure 1B:
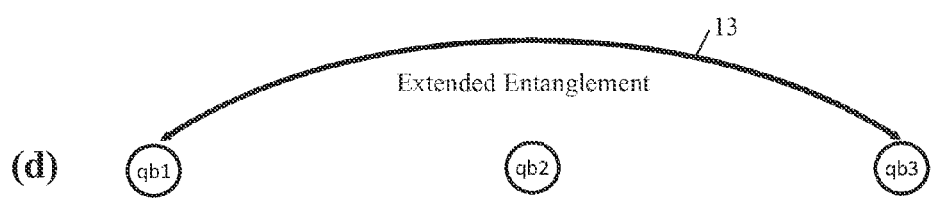

Elongate Operation (FIG. 1B)

Figure 1C:
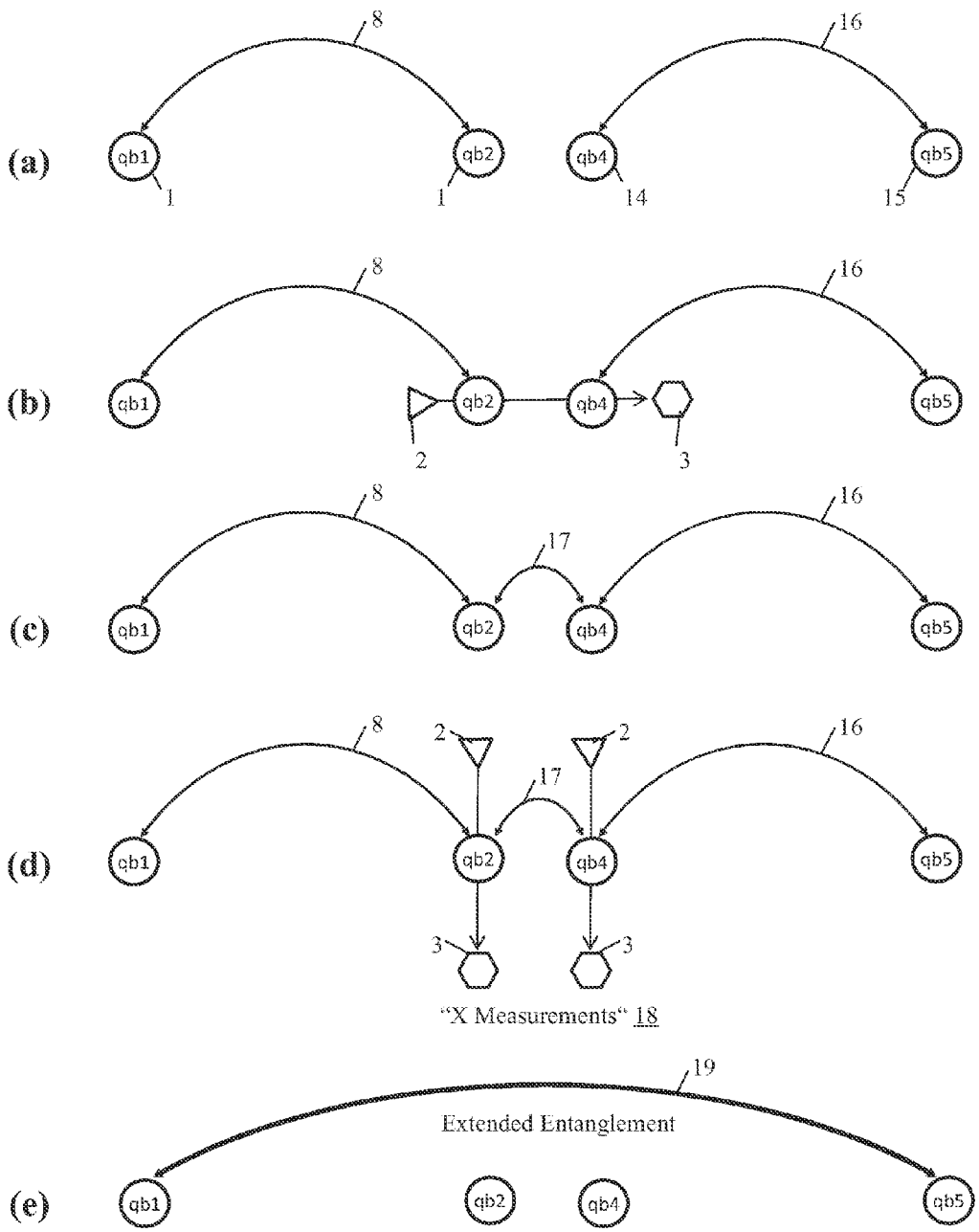
FIG. 1C is a diagram depicting a merge operation for extending an existing entanglement by merging it with another entanglement to create a new entanglement involving one qubit from each of the original entanglements.

An entanglement such as created by a FIG. 1A entanglement operation can be 'extended' to create a new entanglement involving one of the originally-entangled qubits and a new cubit, the latter typically being located at a greater distance from the involved originally-entangled qubit than the other originally-entangled qubit. FIGS. 1B and 1C illustrate two ways of extending an initial entanglement 8 between qubits qb1 and qb2 (referenced 1) to form an entanglement between qubit qb1 and another qubit; both ways involve the passing of light fields through various qubits followed by measurement of the light fields but, for simplicity, the light fields themselves and the optical fibres typically used to channel them have been omitted from FIGS. 1B and 1C.

FIG. 1B illustrates, by way of a time series of snapshots (a) to (d), an entanglement extension process that is herein referred to as an "elongate operation". In general terms, an elongate operation involves further entangling a qubit of an existing first entanglement with qubit that is not involved in the first entanglement (though it may already be involved in a different entanglement) to form a linked series of entanglements from which the intermediate qubit (that is, the qubit at the end of the first entanglement being extended) is then removed by measurement to leave an 'extended' entanglement between the remaining qubit of the first entanglement and the newly entangled qubit. FIG. 1B illustrates an elongate operation for the simplest case where the qubit that is not involved in the first entanglement is not itself already entangled. More particularly, as shown in snapshot (a) of FIG.

1B, qubit qb2 of an existing entanglement 8 involving qubits qb1 and qb2 (both referenced 1), is further entangled with a qubit qb3 (referenced 10) by means of an entanglement operation. This entanglement operation involves a light field, emitted by an emitter 2, being passed through qubits qb2 and qb3 before being measured by a detector 3. Snapshot (b) depicts the resulting entanglement 11 between qb2 and qb3. The entanglements 8 and 11 form a linked series of entanglements—which is another way of saying that the states of qb1, qb2 and qb3 are now entangled with each other. A particular type of measurement, herein an "X measurement" (referenced 12 in FIG. 1B), is then effected on the intermediate qubit qb2 by sending a light field from an emitter 2 through qb2 and detecting it with a detector 3, thereby to eliminate qb2 from entanglement with qb1 and qb3 (see snapshot (c)) leaving qb1 and qb3 entangled. A characteristic of the X measurement 12 is that it is done in a manner so as to give no information about the rest of the quantum state of entangled cubits qb1 and qb3; for example, for a joint state between qubits qb1, qb2 and qb3 like "a|000>+b|111>" where a and b are probability amplitudes, an X measurement on qubit qb2 would give a state for the entanglement between qb1 and qb3 of either "a|00>+b|11>" (for an X measurement result of +1) or "a|00>−b|11>" (for an X measurement result of −1). This measurement does not give any information about a or b.

After the X measurement 12 has been made to eliminate qb2 from entanglement, an extended entanglement is left between qb1 and qb3—this extended entanglement is depicted as medium thick arc 13 in snapshot (d) of FIG. 1B.

The parity of the extended entanglement 13 is a combination of the parities of the entanglements 8 and 11 and a conjugate qubit parity value determined from the X measurement (in the above example, the X measurement gives either a +1 or −1 result—this sign is the conjugate qubit parity value). Where qubit parity value information and conjugate qubit parity value information are each represented by binary values '0' and '1' for even and odd parity respectively, the qubit parity value information and conjugate qubit parity value information of the extended entanglement are respective XOR (Exclusive OR) combinations of the corresponding component parities.

It may be noted that a functionally equivalent result to the FIG. 1B elongate operation can be obtained, by first entangling qb3 with qb2 by means of an entanglement operation in which the mediating light field passes first through qb3, and then removing qb2 from entanglement by effecting an X measurement on it. In the present specification, for linguistic clarity, reference to an 'elongate operation' (with its integral X measurement) only encompasses the case where the initial entanglement performed as part of the elongate operation is effected by a light field first passing through a qubit of the entanglement being extended; the above described functional equivalent to the elongate operation is treated as being separate entanglement and X measurement operations.

Where the objective is to set up an entanglement between two qubits spaced by a substantial distance, the elongate operation described above with reference to FIG. 1B is not that useful by itself. This is because should the component entanglement operation (see (a) of FIG. 1B) fail, then the pre-existing entanglement that is being extended (entanglement 8 in FIG. 1B) will be destroyed. In effect, the probability of successfully creating the extended entanglement 13 is the product of the success probabilities of the entanglement operations used to create entanglements 8 and 11. As already noted, the probability of a successful entanglement operation is distance related so the chances of successfully creating an entanglement over long distances using only elongate operations to successively extend an initial entanglement, are poor. The same problem exists with the described functional equivalent of the elongate operation.

Merge Operation (FIG. 1C)

A better approach is to use the merge operation illustrated in FIG. 1C to knit together independently created entanglements that individually span substantial distances; this approach effectively decouples the success probabilities associated with the individual entanglements as a failure of one attempt to create such an entanglement does not destroy the other entanglements. Of course, to be useful, the merge operation used to join the individual entanglements must itself be highly reliable and this is achieved by carrying it out over extremely short distances.

FIG. 1C illustrates, by way of a time series of snapshots (a) to (e), an example embodiment of a merge operation for 'extending' an entanglement 8 existing between qubits qb1 and qb2 by merging it with another entanglement 16 that exists between qubits qb4 (referenced 14) and qb5 (referenced 15), in order to end up with an 'extended entanglement' between qb1 and qb5 (medium thick arc 19 in FIG. 1C). The qubits qb2 and qb4 are located in close proximity to each other (typically within tens of millimeters). The order in which the entanglements 8 and 16 are created is not relevant (indeed they could be created simultaneously); all that is required is that both entanglements exist in a usable condition at a common point in time. At such a time, the entanglements 8 and 16 are "merged" by a quantum operation carried out locally on qubits qb2 and qb4. (Where the quantum states of qubits qb2, qb4 have been transferred from electron spin to nuclear spin immediately following the creation of the LLEs 8, 16 respectively, these states need to be transferred back to electron spin before the merge operation is effected). The local merge operation involves a first process akin to that of FIG. 1A entanglement operation effected by passing a light field, emitted by an emitter 2, successively through the two qubits qb2 and qb4, or vice versa, and then measuring the light field (see snapshot (b) of FIG. 1C). This first process, if successful, results in the qubits qb2 and qb4 becoming entangled (as indicated by entanglement 17 in snapshot (c) of FIG. 1C) creating a linked series of entanglements by which qubits qb1 and qb5 are entangled with each other. A second measurement process comprising one or more X measurements 18 (see snapshot (d) of FIG. 1C) is then used to remove the intermediate qubits qb2 and qb4 from the entangled whole leaving an 'extended' entanglement 19 between the qubits qb1 and qb5 The qubits qb2 and qb4 finish up neither entangled with each other nor with the qubits qb1, qb5. Because the merge operation is a local operation between two co-located qubits, the probability of success is very high.

The measurements made as part of the merge operation provide both an indication of the success or otherwise of the merge, and an indication of the "generalized parity" of the merge operation. For example, the first merge-operation process may measure a qubit parity value and the second merge-operation process, the conjugate qubit parity value. In this case, the second process can be effected either as a single X measurement using a light field passed through both qubits qb2 and qb4 (in which case the light field has a different value to that used in the first process e.g. 0,+1 as opposed to 0,−1), or as individual X measurements, subsequently combined, made individually on qb2, and qb4, the latter approach being depicted in FIG. 1C. The parity of the extended entanglement 19 will be a combination of the parities of the entanglements 8 and 15 and the parity of the merge operation. As before, where qubit parity value information and conjugate qubit parity value information are each represented by binary values '0' and '1' for even and odd parity respectively, the qubit parity value information and conjugate qubit parity value information of the extended entanglement are respective XOR (Exclusive OR) combinations of the corresponding component parities.

Information about the success or otherwise of the merge operation is passed in classical messages to the end qubit locations as otherwise these locations do not know whether the cubits qb1, qb5 are entangled; alternatively since the failure probability of a merge operation is normally very low, success can be assumed and no success/failure message sent in this case, it will be up to applications consuming the extended entanglement 19 to detect and compensate for merge failure leading to absence of entanglement. As the parity of the extended entanglement will normally need to be known to make use of the entangled qubits, parity information needed to determine the parity of the extended entanglement 19 is also passed on to one or other of the end qubit locations.

It will be appreciated that the form of merge operation described above with respect to FIG. 1C is effectively an elongate operation carried out over a very short distance between qb2 and qb4 to extend entanglement 8, together with an X measurement on qb4 to remove it from entanglement (qb2 having been removed from entanglement by the X measurement performed as part of the elongate operation). Of course, unlike the Figure example elongate operation where the qubit qb3 to which the entanglement 8 is being extended is not itself already entangled, the equivalent qubit qb4 in FIG. 1C is already involved in a second entanglement 16; however, as already noted, an elongate operation encompasses this possibility.

As already noted, the merge operation is a local operation (between qubits qb2 and qb3 in FIG. 1C) that is effected over very short distance and thus has a high probability of success. A merge operation takes of the order of $10^{-9}$ secs.

Figure 3A:
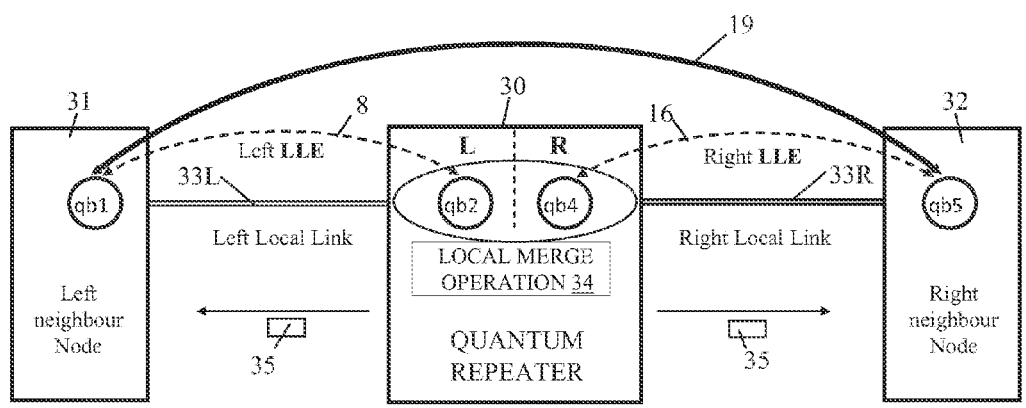
FIG. 3A is a diagram depicting how a quantum repeater can be used to create an entanglement between two qubits over a distance greater than that possible using the FIG. 1A entanglement operation alone.
Figure 3B:
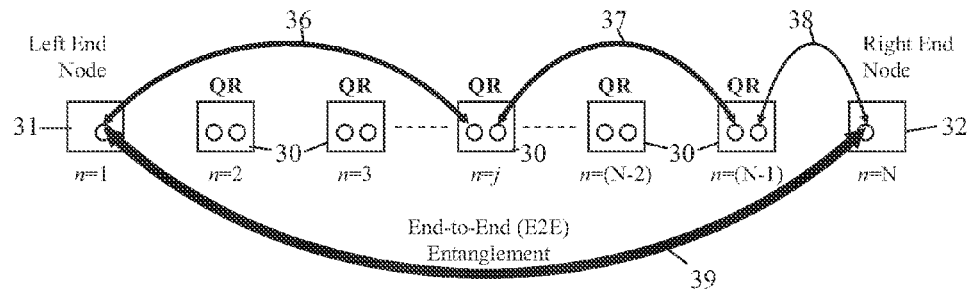
FIG. 3B is a diagram illustrating how a chain of quantum repeaters, can be used to create an extended entanglement between any arbitrarily spaced pair of nodes.

Quantum Repeater (FIGS. 3A & 3B)

In practice, when seeking to create an extended entanglement between two qubits which are located in respective end nodes separated by a distance greater than that over which a basic entanglement operation can be employed with any reasonable probability of success, one or more intermediate nodes, called quantum repeaters, are used to merge basic entanglements that together span the distance between the end nodes. Each quantum repeater node effectively implements a merge operation on a local pair of qubits that correspond to the qubits qb2 and qb4 of FIG. 1C and are involved in respective entanglements with qubits in other nodes. FIG. 3A depicts such a quantum repeater node 30 forming one node in a chain (sequential series) of nodes terminated by left and right end nodes 31 and 32 that respectively accommodate the qubits qb1, qb5 it is desired to entangle (but which are too far apart to entangle directly using an entanglement operation). In the present example, the chain of nodes comprises three nodes with the left and right end nodes 31, 32 also forming the left and right neighbour nodes of the quantum repeater 30. The quantum repeater 30 is connected to its left and right neighbour nodes 31, 32 by left and right local link optical fibres 33L and 33R respectively. It is to be noted that the terms "left" and "right" as used throughout the present specification are simply to be understood as convenient labels for distinguishing opposite senses (directions along; ends of; and the like) of the chain of nodes that includes a quantum repeater.

The quantum repeater 30 effectively comprises left and right portions or sides (labeled "L" and "R" in FIG. 3A) each comprising a respective cubit qb2, qb4 (for ease of understanding, the same qubit designation are used in FIG. 3A as in FIG. 1C). The qubit qb1 of the left neighbour node 31 and qb2 of the quantum repeater node 30 are part of a LLE creation subsystem formed between these nodes and operative to create a left LLE 8 (shown as a dashed arrowed arc 8 in FIG. 3A) between qb1 and qb2. Similarly, the qubit qb5 of the right neighbour node 32 and qb4 of the quantum repeater node 30 are part of a LLE creation subsystem formed between these nodes and operative to create a right LLE 16 between qb5 and q4.

It may be noted that the direction of travel (left-to-right or right-to-left) of the light field used to set up each LLE is not critical whereby the disposition of the associated emitters and detectors can be set as desired. For example, the light fields involved in creating LLEs 8 and 16 could both be sent out from the quantum repeater 30 meaning that the emitters are disposed in the quantum repeater 30 and the detectors in the left and right neighbour nodes 31, 32. However, to facilitate chaining of quantum repeaters of the same form, it is convenient if the light fields all travel in the same direction along the chain of nodes; for example, the light fields can be arranged all to travel from left to right in which case the left side L of the quantum repeater node 30 will include the detector for creating the left LLE 8 and the right side R will include the emitter for creating the right LLE 16. For simplicity, and unless otherwise stated, a left-to-right direction of travel of the light field between the nodes will be assumed hereinafter unless otherwise stated; the accompanying Claims are not, however, to be interpreted as restricted to any particular direction of travel of the light field, or to the direction of travel being the same across different links, unless so stated or implicitly required.

In operation of the quantum repeater 30, after creation, in any order, of the left and right LLEs 8 and 16, a local merge operation 34 involving the qubits qb2 and qb4 is effected thereby to merge the left LLE 8 and the right LLE 16 and form extended entanglement 19 between the qubits qb1 and qb5 in the end nodes 31 and 32 respectively.

If required, information about the success or otherwise of the merge operation and about parity is passed in classical messages 35 from the quantum repeater 30 to the nodes 31, 32.

Regarding the parity information, where the parity of the local link entanglements has been standardized (by qubit state flipping as required), only the merge parity information needs to be passed on by the quantum repeater and either node 31 or 32 can make use of this information. However, where LIE parity information has simply been stored, then the quantum repeater needs to pass on whatever parity information it possesses; for example, where the parities of the left and right LLEs 8, 16 are respectively known by the quantum repeater 30 and the node 32, the quantum repeater 30 needs to pass on to node 32 both the parity information on LLE 8 and the merge parity information, typically after combining the two. Node 32 can now determine the parity of the extended entanglement by combining the parity information it receives from the quantum repeater 30 with the parity information it already knows about LLE 16.

From the foregoing, it can be seen that although the merge operation itself is very rapid (of the order of $10^{-9}$ seconds), there is generally a delay corresponding to the message propagation time to the furthest one of the nodes 31, 32 before the extended entanglement 19 is usefully available to these nodes.

By chaining together multiple quantum repeaters, it is possible to create an extended entanglement between any arbitrarily spaced pair of nodes. FIG. 3B illustrates this for a chain of N nodes comprising left and right end nodes 31 and 32 respectively, and a series of (N−2) quantum repeaters 30 (each labeled "QR" and diagrammatically depicted for simplicity as a rectangle with two circles that represent L and R cubits). The nodes 30-32 are interconnected into a chain by optical fibres (not shown) and are numbered from left to right—the number n of each node is given beneath each node and node number "j" represents an arbitrary QR node 30 along the chain. The node number of a QR node can be used as a suffix to identify the node; thus "$QR_j$" is a reference to the quantum repeater node numbered j. This node representation, numbering and identification is used generally throughout the present specification.

In FIG. 3B, three existing entanglements 36, 37, and 38 are shown between qubits in respective node pairings; for convenience, when referring at a high level to entanglements along a chain of nodes, a particular entanglement will herein be identified by reference to the pair of nodes holding the qubits between which the entanglement exists, this reference taking the form of a two-element node-number tuple. Thus, entanglement 38, which is a local link entanglement LLE between qubits in the neighbouring nodes numbered (N−1) and N, is identifiable by the node number tuple {(N−1), N}. Entanglements 36 and 37 (shown by medium thick arcs in FIG. 3B) are extended entanglements existing between qubits in the node pairings {1, j} and {j, (N−1)} respectively, these entanglements having been created by the merging of LLEs. To create an end-to-end (abbreviated herein to "E2E") entanglement between qubits in the left and right end nodes 31, 32 (see thick arc 39 in FIG. 3), entanglements 36 and 37 can first be merged by $QR_j$ with the resultant extended entanglement then being merged with LLE 38 by $QR_{(N-1)}$; alternatively, entanglements 37 and 38 can first be merged by $QR_{(N-1)}$ with the resultant extended entanglement then being merged with entanglement 36 by $QR_j$.

Entanglement Build Path

The "entanglement build path" (EBP) of an entanglement is the aggregate qubit-to-qubit path taken by the mediating light field or fields used in the creation of an un-extended or extended entanglement; where there are multiple path segments (that is, the path involves more than two qubits), the light fields do not necessarily traverse their respective segments in sequence as will be apparent from a consideration of how the FIG. 3B E2E entanglement is built (in this example, the entanglement build path is the path from one end node to the other via the left and right side qubits of the chain of quantum repeaters).

Representation of Low Level Quantum Physical Hardware

The particular form of physical implementation of a qubit and the details of the methods of performing entanglement, elongate, and merge operations (for example, whether very weak amounts of light or laser pulses of many photons are used) are not of direct relevance to the present invention and accordingly will not be further described herein, it being understood that appropriate implementations will be known to persons skilled in the art. Instead, the physical hardware for implementing the quantum operations (the "quantum physical hardware") will be represented in terms of a basic block, herein called a "Q-block", that provides for the implementation of, and interaction with, one qubit, and an associated optical fabric.

Figure 4:
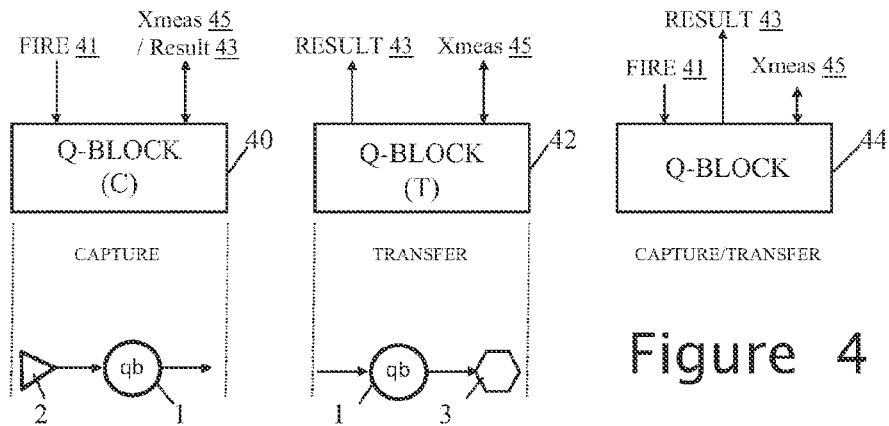
FIG. 4 is a diagram illustrating three varieties of a basic quantum physical hardware block, herein a "Q-block", for carrying out various quantum interactions.

FIG. 4 depicts three varieties of Q-block, respectively referenced 40, 42 and 44.

Q-block variety 40 represents the physical hardware needed to manifest a qubit and carry out the "Capture" interaction of FIG. 1A with that qubit, that is, the controlled sending of a light field through the qubit in a prepared state. This variety of Q-block—herein called "a Capture Q-block" (abbreviated in the drawings to "Q-block (C)")—comprises a physical implementation of a qubit 10 and a light-field emitter 12, together with appropriate optical plumbing, functionality for putting the cubit in a prepared state and for shuttering it (for example, using an electro-optical shutter) except when a light field is to be admitted, functionality (where appropriate for the qubit implementation concerned) for transferring the qubit state between electron spin and nuclear spin (and vice versa) as needed, and control functionality thr coordinating the operation of the Capture Q-block to send a light field through its qubit (and on out of the Q-block) upon receipt of a "Fire" signal 41.

Q-block variety 42 represents the physical hardware needed to manifest a qubit and carry out the "Transfer" interaction of FIG. 1A with that qubit, that is, the passing of a received light field through the qubit in a prepared state followed by measurement of the light field. This variety of Q-block—herein called "a Transfer Q-block" (abbreviated in the drawings to "Q-block (T)")—comprises a physical implementation of a qubit 10 and a light-field detector 13, together with appropriate optical plumbing, functionality (responsive, for example to a herald light pulse 6) for putting the qubit in a prepared state and for shuttering it except when a light field is to be admitted, functionality (where appropriate for the qubit implementation concerned) for transferring the qubit state between electron spin and nuclear spin (and vice versa) as needed, and control functionality for coordinating the operation of the Transfer Q-block and for outputting the measurement results 43.

Q-block variety 44 is a universal form of Q-block that incorporates the functionality of both of the Capture and Transfer Q-block varieties 40 and 42 and so can be used to effect both Capture and Transfer interactions. For convenience, this O-Block variety is referred to herein simply as a "Q-block" without any qualifying letter and unless some specific point is being made about the use of a Capture or Transfer Q-block 40, 42, this is the variety of Q-block that will be generally be referred to even though it may not in fact be necessary for the Q-block to include both Capture and Transfer interaction functionality in the context concerned—persons skilled in the art will have no difficulty in recognizing such cases and in discerning whether Capture or Transfer interaction functionality is required by the Q-block in its context. One reason not to be more specific about whether a Q-block is of a Capture or Transfer variety is that often either variety could be used provided that a cooperating Q-block is of the other variety (the direction of travel of light fields between them not being critical).

Regardless of variety, every Q-block will be taken to include functionality for carrying out an X measurement in response to receipt of an Xmeas signal 45 thereby enabling the Q-block to be used in elongate and merge operations; the X measurement result is provided in the Result signal 43, it being appreciated that where the Q-block has Transfer interaction functionality the X measurement functionality will typically use the detector 2 associated with the Transfer interaction functionality. X measurement functionality is not, of course, needed for an entanglement operation and could therefore be omitted from Q-blocks used only for such operations.

It may be noted that where there are multiple Q-blocks in a node, the opportunity exists to share certain components between Q-blocks (for example, where there are multiple Q-blocks with Capture interaction functionality, a common light-field emitter may be used for all such Q-blocks). Persons skilled in the art will appreciate when such component sharing is possible.

An entanglement operation will involve a Q-block with Capture interaction functionality (either a Transfer Q-block 40 or a universal Q-block 44) optically coupled to a Q-block with Transfer interaction functionality (either a Transfer Q-block 42 or a universal Q-block 44), the entanglement operation being initiated by a Fire signal 41 sent to the Q-block with Capture interaction functionality and the success/failure of the operation being indicated in the result signal 43 output by the Q-block with Transfer interaction functionality.

Where an elongate operation is to be effected, the initial entanglement-operation component of the elongate operation will also involve a Q-block with Capture interaction functionality and a Q-block with Transfer interaction functionality. The provision of X measurement functionality in all varieties of Q-block enables the subsequent removal from entanglement of the intermediate qubit to be effected by sending an Xmeas signal to the Q-block implementing this qubit, the measurement results being provided in the result signals 43 output by this Q-block.

Where a merge operation is to be effected, this will also involve a Q-block with Capture interaction functionality and a Q-block with Transfer interaction functionality. Again, the provision of X measurement functionality in all varieties of Q-block enables the removal from entanglement of the qubit(s) involved in the merge operation. Measurement results are provided in the result signals 43 output by the appropriate Q-blocks.

Figure 5:
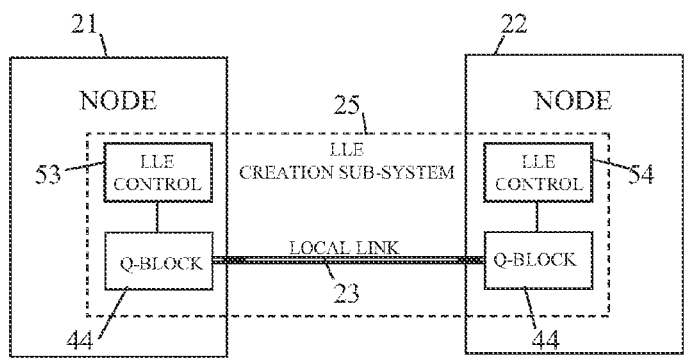
FIG. 5 is a diagram illustrating an implementation of the FIG. 2 entanglement creation subsystem using Q-blocks.

FIG. 5 depicts the FIG. 2 LLE creation subsystem 25 as implemented using respective Q-blocks 44. A respective Q-block 44 is provided in each node 21 and 22, these Q-blocks 44 being optically coupled through the local link fibre 23. Each Q-block 44 has associated control logic formed by LLE control unit 53 in node 21 and LLE control unit 54 in node 54, 53. Because the Q-blocks 44 depicted in FIG. 5 are of the universal variety, the direction of travel along the local link fibre 23 of light fields involved in entanglement creation is not tied down; thus, the Q-block 44 of the node 21 could serve as a Capture Q-block and that of node 22 as a Transfer Q-block or the Q-block 44 of the node 21 could serve as a Transfer Q-block and that of node 51 as a Capture Q-block.

In the LLE creation subsystem 25 of FIG. 5, the single Q-blocks 44 are simply coupled directly to the local link fibre 23. However, in many cases there will be a need to provide a controllable optical fabric in a node to appropriately guide light fields to/from the Q-block(s) of the node depending on its current operational requirements. For example, where there are multiple Q-blocks in a node sharing the same external fibre, an optical fabric may be required to merge outgoing light fields onto the common fibre or direct incoming light fields from the fibre to selected Q-blocks; in another example, an optical fabric may be required in a quantum repeater node (such as node 30 in FIG. 3A) to switch a L-side Q-block and a R-side Q-block from optically interfacing with respective left and right local link fibres for LLE creation, to optically interfacing, with each other for a local merge operation.

Figure 6:
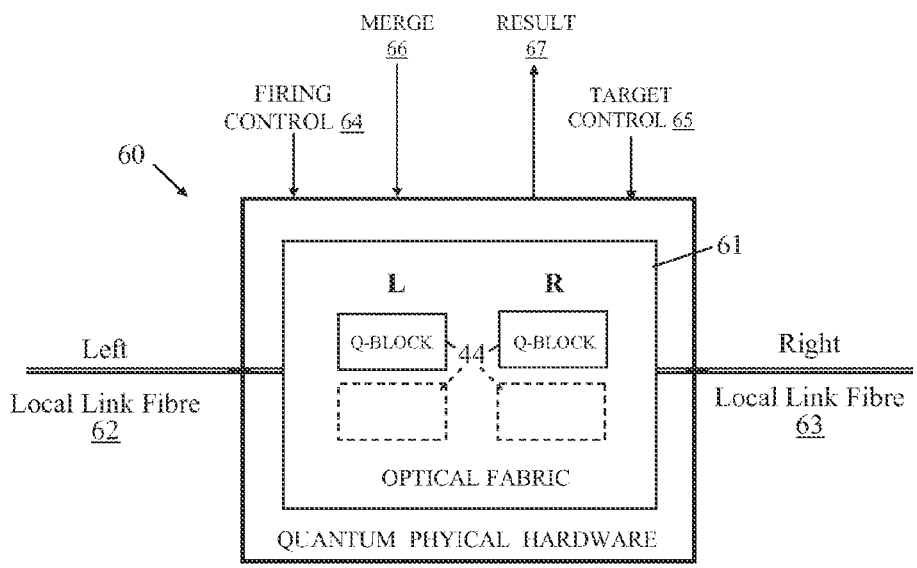
FIG. 6 is a generic diagram of quantum physical hardware of a quantum repeater.

In general terms, therefore, the quantum physical hardware of a node, that is, the physical elements that implement and support qubits and their interaction through light fields, comprises not only one or more Q-blocks but also an optical fabric in which the Q-block(s) are effectively embedded. By way of example, FIG. 6 depicts such a representation for a quantum repeater node; thus, quantum physical hardware 60 is shown as comprising an optical fabric 61 for guiding light fields to/from the Q-blocks 44 and the Q-blocks 44 are depicted as existing within the optical fabric 61 with the local link fibres 62, 63 coupling directly to the optical fabric. One L-side and one R-side Q-block are shown in solid outline and possible further L-side and R-side Q-blocks are indicated by respective dashed-outline Q-blocks.

As employed herein, any instance of the above-described generalized quantum physical hardware representation (such as the instance shown in FIG. 6 in respect of a quantum repeater), is intended to embrace all possible implementations of the quantum physical hardware concerned, appropriate for the number and varieties of Q-blocks involved and their intended roles. (It may be noted that although FIG. 6 shows the Q-blocks as Q-blocks 44—that is, of the Universal variety—this is simply to embrace all possible implementations and is not a requirement of the role being played by the Q-blocks in the quantum repeater; a particular implementation may use other varieties of Q-blocks as appropriate to their roles. This use of Q-blocks 44 in the above-described generalized quantum physical hardware representation is not limited to the FIG. 6 representation of quantum physical hardware for a quantum repeater).

Depending on the quantum operations to be performed by the quantum physical hardware, the latter is arranged to receive various control signals and to output result signals. In the case of the FIG. 6 quantum physical hardware block 60 appropriate for a quantum repeater, the quantum physical hardware is arranged to receive "Firing Control" and "Target Control" signals 64, 65 for controlling entanglement creation operations, to receive "Merge" signals 67 for controlling merge operations, and to output "Result" signals 66 indicative of the outcome of these operations. The signals 64-67 may be parameterized to indicate particular Q-blocks. Target Control signals are not needed in some quantum repeater embodiments as will become apparent hereinafter. In one implementation of the FIG. 6 quantum physical hardware 60, the Firing Control signals 64 comprise both:

set-up signals for appropriately configuring the optical fabric 61 (if not already so configured) to optically couple one or more Q-block(s) with Capture interaction functionality to one of the local link fibres, and the previously-mentioned "Fire" signal(s) for triggering light-field generation by one or more of the Q-block(s) with Capture interaction functionality;

and the Target Control signals 65 comprise:

set-up signals for appropriately configuring the optical fabric 61 (if not already so configured) to optically couple a Q-block with Transfer interaction functionality to one of the local link fibres.

Furthermore, in this implementation, the Merge signals 66 comprise both:

set-up signals for appropriately configuring the optical fabric 61 (if not already so configured) to effect a merge operation involving a L-side and R-side Q-block of the repeater, a "Fire" signal for triggering the first merge-operation process, and where the FIG. 1C form of merge operation is being carried out, one or more Xmeas signals to instigate the X measurements that form the second merge-operation process.

For quantum physical hardware intended to perform elongate operations, the quantum physical hardware, as well as being arranged to receive Firing Control signals (for performing the entanglement creation component of the elongate operation) and to output Result signals, is also arranged to receive Xmeas signals for instigating X measurements whereby to complete the elongate operation.

The optical fabric of a node may have a default configuration. For example, where the FIG. 6 quantum physical hardware 60 only includes one L-side and one R-side Q-block, the optical fabric 61 may be arranged to default to an LLE creation configuration optically coupling the Q-blocks to respective ones of the local link fibres, in this case, the merge signals 66 are arranged to only temporarily optically couple the two Q-blocks to each other for the time needed to carry out a merge operation. In cases such as this, the Target Control signals 65 can be dispensed with entirely and the Firing Control signals 64 simply comprise Fire signals sent to the appropriate Q-block.

Figure 7A:
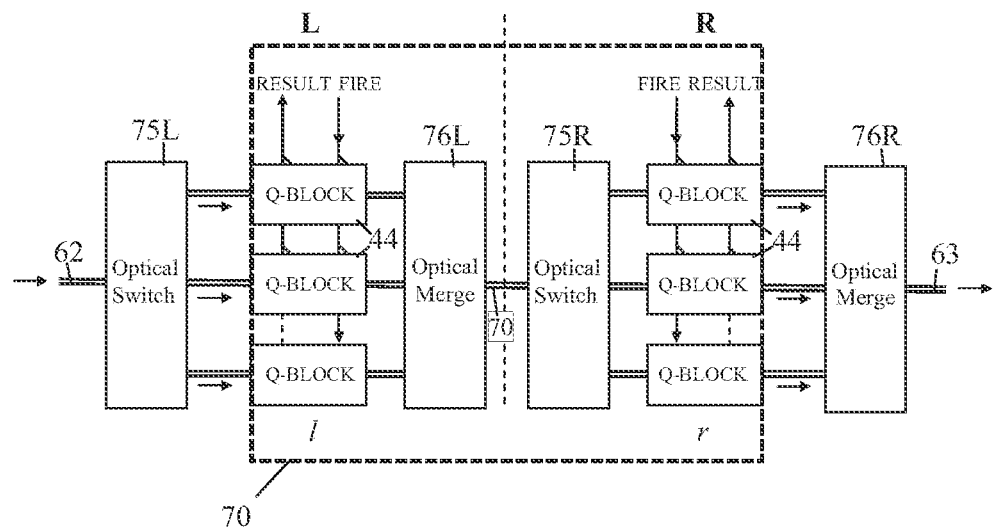
FIG. 7A Shows one example implementation of an optical fabric of the FIG. 6 quantum physical hardware in the case of multiple left-side and multiple right-side qubits.
Figure 7B:
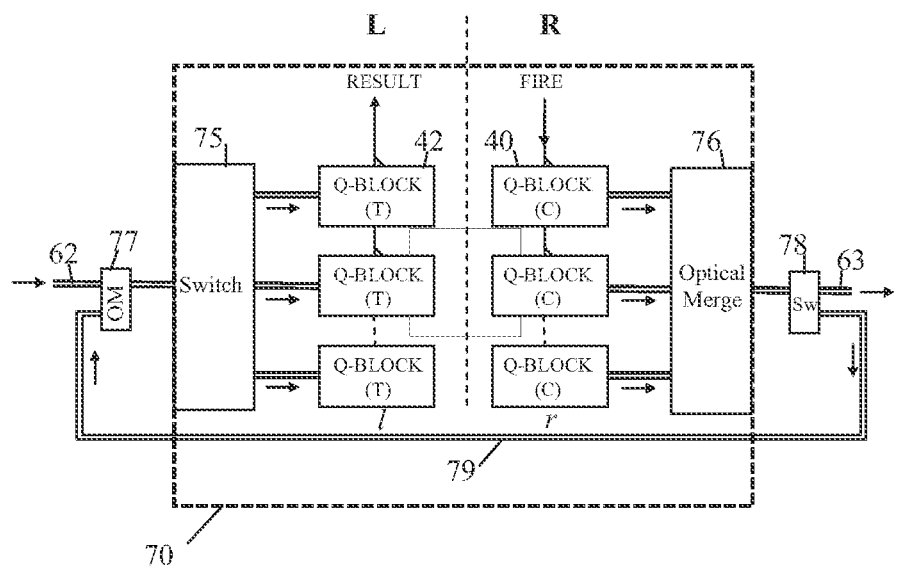
FIG. 7B shows another example implementation of the optical fabric of the FIG. 6 quantum physical hardware in the case of multiple left-side and multiple right-side qubits.

FIGS. 7A and 7B show example implementations of the qua physical hardware 60, and in particular of the optical fabric 61, for a quantum repeater with l L-side Q-blocks 44 (where l≥1) and r R-side Q-blocks ((where r≥1); the general case is assumed where any one of the L-side Q blocks is capable of being optically coupled to any one of the R-side Q-blocks to enable a merge operation to be effected between these Q-blocks. In these Figures, the directions of travel of light fields along optical fibres are indicated by arrows.

The FIG. 7A implementation is applicable to the case where universal Q-blocks 44 are being used. In this case, an active optical switch 75L interfaces the left local link fibre 62 with the inputs of the L-side Q-blocks 44 and a passive optical merge unit 76l, puts the outputs of the L-side Q-blocks 44 onto a single intermediate fibre 70. Similarly, an active optical switch 75R interfaces the intermediate fibre 70 with the inputs of the R-side Q-blocks 44 and a passive optical merge unit 76R puts the outputs of the R-side Q-blocks 44 onto the right local link fibre 63. For LLE creation operation, the optical switch 75L switches a light field coming in over the left link fibre 62 to a desired one of the L-side Q blocks 44 (as indicated in the Target Control set-up signals fed to the quantum physical hardware), while the optical merge unit 76R couples the R-side Q-blocks 44 to the right local link fibre 63. For a merge operation, the optical merge unit 76L and the optical switch 75R enable any one of the L-side Q blocks 44 to be optically coupled to any desired one of the R-side Q-blocks 44 (as indicated in the Merge set-up signals fed to the quantum physical hardware).

The FIG. 7B implementation is applicable to the case where the L-side Q-blocks are Transfer Q-blocks 42 and the R-side Q-blocks are Capture Q-blocks 40. In this case, a passive optical merge unit 76 puts the outputs of the R-side Capture Q-blocks 40 onto a single fibre which is then switched by an active optical switch 78 either to the right local link fibre 63 or to a loop-back optical fibre 79. An active optical switch 75, disposed in front of the L-side Transfer Q-blocks 42, is coupled to receive the output of a passive optical merge unit 77, the latter being coupled on its input side to the left local link fibre 62 and the loop-back optical fibre 79. The active optical switch 75 enables light fields received from the optical merge unit 77 to be selectively passed to a desired one of the L-side Transfer Q-blocks 42.

For an LLE creation operation, the optical switch 78 is set to feed the light field output by one or more of the R-side Capture Q-blocks 40 to the right local link fibre 63, and the optical switch 75 is set to feed a light field received aver the left local link fibre 62 to a selected one of the Transfer Q-blocks 42 (the selected block being indicated in the Target Control set-up signals fed to the quantum physical hardware). For a merge operation, the optical switch 78 is set to feed the light field output by one of the R-side Capture Q-blocks 40 to the loop-back fibre 79 (the Q-block concerned will have been indicated in the Merge set-up signals fed to the quantum physical hardware), and the optical switch 75 is set to feed the light field received via the loop-back fibre 79 to a selected one of the Transfer Q-blocks 42 (again, the selected Q-block being indicated in the Merge set-up signals).

Of course, for both the FIGS. 7A and 7B quantum physical hardware implementations with 1 L-side Q-blocks and r R-side Q blocks, the value of l or r (or both) could be one in which case certain of the optical hardware elements (optical merges/switches) can be omitted.

Entanglement Build Path Switch

The heart of the quantum-physical-hardware implementations shown in FIGS. 7A and 7B is a controllable arrangement for enabling a merge operation to be effected between any selected one of the quantum repeater L-side Q-blocks and any selected one of the R-side Q-blocks. This is one example of what is hereinafter referred to as an 'entanglement build path switch' (or 'EBP switch'), this being a controllable apparatus for establishing an EBP length between a selected pairing of interface qubits of the apparatus; this EBP length can be the totality of the EBP for a target entanglement (that is, the target entanglement is between the selected pairing of interface qubits), or the EBP length can be simply a portion of the EBP of the target entanglement.

In the FIG. 7A, 7B, the elements of the quantum-physical-hardware implementations forming the EBP switch are indicated by dashed box 70, the interface qubits of the switch being provided by the L-side and R-side Q-blocks. In the FIG. 7A EBP switch 70, selection of the pairing of interface qubits to be involved in a merge is done by:
  selective firing of a L-side Q-block to determine the L-side qubit involved, and
  operation of the optical switch 75R to select the R-side qubit involved.

Similarly, in the FIG. 7B EBP switch 70, selection of the pairing of interface qubits to be involved in a merge is done by:
  selective firing, of a R-side Q-block to determine the R-side qubit involved, and
  operation of the optical switch 75 to select the L-side qubit involved (this switch 75 also serves to couple the left local link fibre to a selected L-side Q-block).

In both cases, a one-to-many optical switch is involved which is not ideal as such elements are complex and expensive.

Embodiments of the invention are described below that provide an EBP switch which reduces or eliminates the need to employ an optical switch element.

Figure 8:
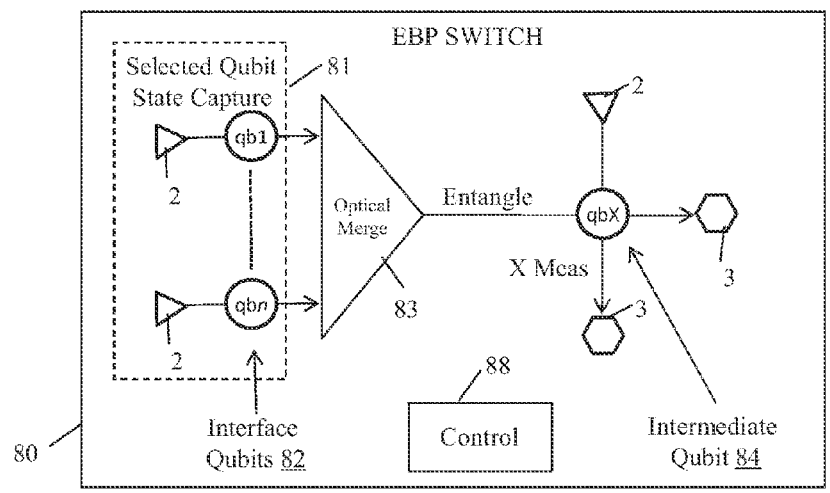
FIG. 8 is a diagram of a first embodiment of an intermediate-qubit-based entanglement build path (EPB) switch of the present invention for establishing, through the use of an intermediate qubit, an EBP length between a selected pairing of a group of interface qubits of the switch.

A first embodiment in the form of EBP switch 80 is conceptually depicted in FIG. 8. The switch includes a group 82 of n interface qubits qb1 to qbn where n≥2; an interface qubit is simply one that can interact with the world beyond the switch through light fields. A selected-qubit state-capture arrangement 8 enables any selected one of the interface qubits to have its state captured by a mediating light field generated by an emitter 2 of the switch; this light field is then channeled by an optical merge unit 83 to interact with an intermediate qubit 84 before being measured by a detector 3 thereby to entangle the selected interface qubit with the intermediate qubit. The selected-qubit state-capture arrangement 81 can take a variety of forms the simplest of which is the provision of a individually energizable emitter 2 associated with each interface qubit 82; another possibility is the use of a single common emitter 2, optically coupled to all interface qubits, to generate the light field, and to provide each interface qubit with an individually controllable shutter that is only opened to select that qubit and let through a light field from the common emitter.

An emitter 2 and detector 3 are associated with the intermediate qubit 84 to enable an X measurement to be performed on this qubit. Although not shown in FIG. 8, provision is also be made to carry out X measurements on the interface qubits 82 in applications of the EBP switch 80 where the target entanglement (that is, the entanglement thr which the EBP length through the switch is being provided) involves at least one qubit external to the switch—in such cases, one or more X measurements on interface qubits are needed to remove them from the target entanglement, this typically being done as part of an elongate or merge operation. Where the EBP switch 80 is only to be used in the building of target entanglements whose end-point qubits are both members of the group 82 of interface qubits, then there is no need to provide for making X measurements on the interface qubits.

By carrying out an appropriate combination of the previously described operations (entanglement, elongate, merge, and X measurement), an EBP length can be established, via the intermediary qubit 84, between any two selected interface qubits 82 with these qubits being removed from the target entanglement whose EBP includes the EBP length established by the switch (except, of course, for where the first and/or second interface qubit is part of the target entanglement). The appropriate combination of operations will generally depend on whether one or both of the selected interface qubits 82 is already externally entangled (that is, entangled with a qubit outside the switch 80). Each such combination of operations is herein referred to as an EBP switch 'process'.

Various switch processes will next be described for which purpose the first and second selected qubits 82 will be referred to as 'qbA' and 'qbB' respectively and the intermediate qubit 84 as 'qbX'.

Figure 9:
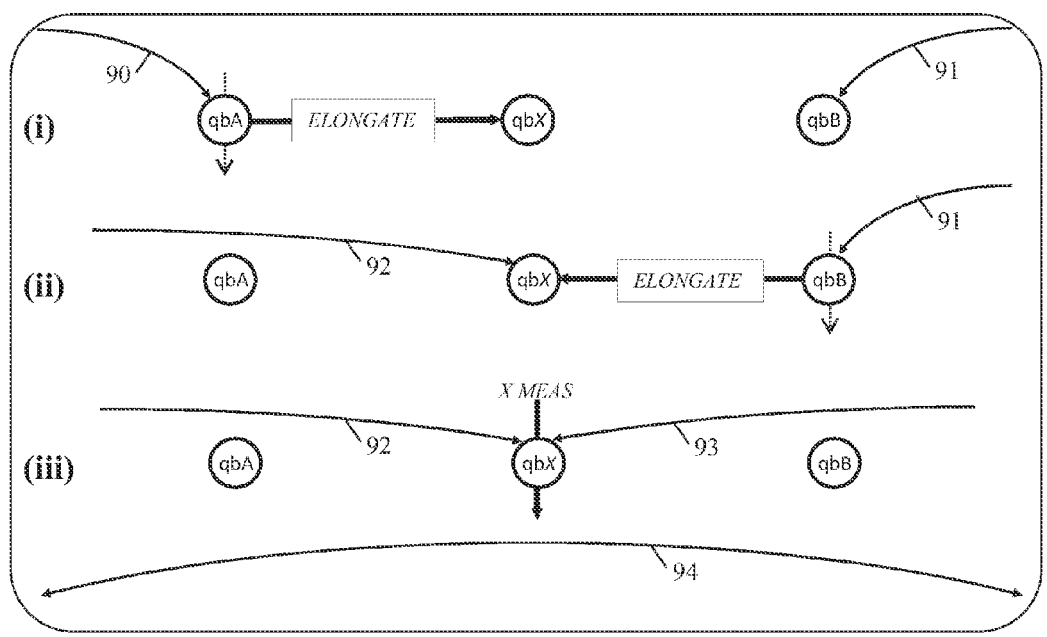
FIG. 9 is a diagram depicting a process for operating the FIG. 8 EBP switch in the situation of the qubits of the selected pairing of interface qubits both being initially separately externally entangled.

FIG. 9 depicts a switch process 101 for the case of the first and second selected qubits qbA, qbB both being initially separately externally entangled (entangled with qubits, not shown, outside of the switch 80) more particularly, qbA is involved, in an entanglement 90 and qbB is involved in an entanglement 91 (see the half arcs top left and top right in FIG. 9). In FIG. 9, each thick horizontal arrow represents an entanglement, elongate or merge operation as designated and the direction of pointing of the arrow indicates the direction of the mediating light field in the entangling element of the operation; for an elongate or merge operation the integral X measurement(s) is represented by a dotted vertical arrow through the qubit concerned. An X measurement effected outside of an elongate or merge operation is shown as a thick vertical arrow through the qubit concerned.

The FIG. 9 switch process 100 process proceeds as follows:

Step (i) Entanglement 90 is extended by an elongate operation between interface qubit qbA and intermediate qubit qbX resulting in an extended entanglement 92 involving the intermediate qubit qbX but not the interface qubit qbA;

Step (ii) Entanglement 91 is extended by an elongate operation between interface qubit qbB and intermediate qubit qbX resulting in an extended entanglement 93 involving the intermediate qubit qbX but not the interface qubit qbB;

Step (iii) An X measurement is performed on the intermediate qubit qbX to remove it from entanglements 92, 93 leaving entanglement 94 between the external qubits (not shown) involved, in the initial entanglements 90, 91 respectively.

Thus, at the end of the process 100 the EBP length established between qbA and qbB by the process results in an entanglement 94 existing between the external qubits.

Figure 10:
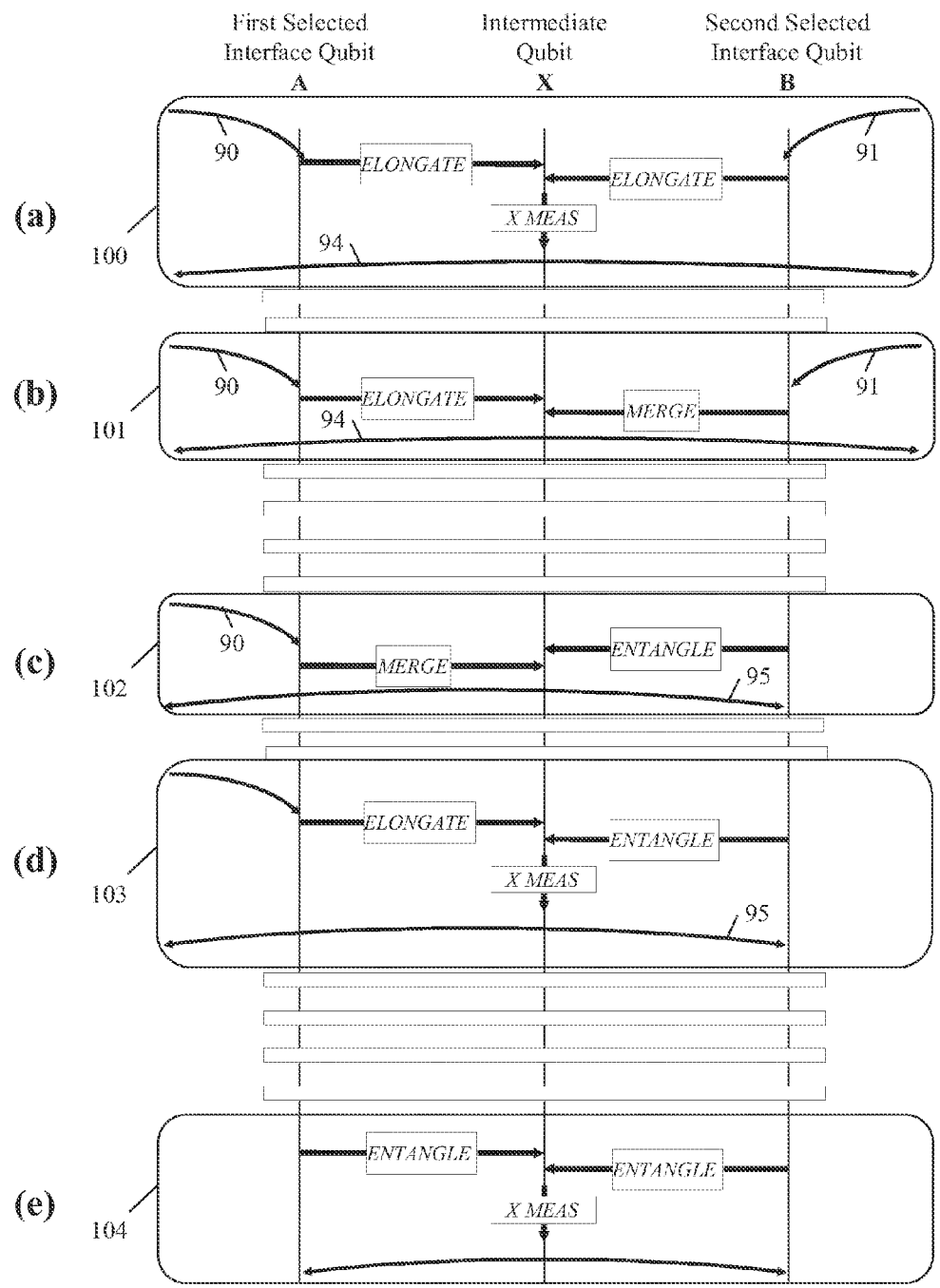
FIG. 10 is a diagram showing processes for operating the FIG. 8 switch in several different situations regarding the initial entanglement or non-entanglement of the qubits of the selected pairing of interface qubits.

The switch process 100 is also shown in row (a) of FIG. 10 using a reduced form of the representation used in FIG. 9; in particular, in FIG. 10 the qubits qbA, qbB and qbX are represented by respective vertical lines, only the entanglements present at the start and finish of the switch process are shown, and X measurements performed as part of an elongate or merge operation are not depicted.

Other switch processes 101-104 are depicted in rows (b) to (c) respectively of FIG. 10 using the same form of representation as in row (a) for switch process 100. The switch processes 100-104 are grouped as follows:

Processes 100 and 101—Rows (a) and (b) of FIG. 10
These processes (which are alternatives) are appropriate to the case of the first and second selected qubits qbA, qbB both being initially separately externally entangled (entanglements 90, 91). At the end of either process, the EBP length established between qbA and qbB by the process results in an entanglement 94 existing between the external qubits (not shown) involved in the initial entanglements 90, 91; at this point, none of the switch qubits qbA, qbB, qbX are entangled.

Processes 102 and 103—Rows (c) and (d) of FIG. 10
These processes (which are alternatives) are appropriate to the case of only one of the selected qubits (for example, the first selected qubit qbA) being initially externally entangled (entanglement 90). At the end of either process, the EBP length established between qbA and qbB by the process results in an entanglement 95 existing between the external qubit (not shown) involved in the initial entanglement 90 and the second selected qubit qbB; at this point, neither of the qubits qbA, qbX is entangled.

Process 104—Row (c) of FIG. 10
This process is appropriate to the case of neither of the selected qubits being initially externally entangled. At the end of this process, the EBP length established between qbA and qbB by the process results in an entanglement 96 existing between these qubits; at this point, qbX is not entangled.

The operations involved in each of the switch processes 101 to 104 are readily apparent from the corresponding row of FIG. 10 and will not be further set out herein. Other switch processes additional to those depicted are possible.

It will be understood that in any physical implementation of the intermediate-qubit-based EBP switch 80 represented in FIG. 8 (and also of the intermediate-qubit-based switches shown in FIGS. 11 and 13 to be described below) a control arrangement, shown as block 88 in FIG. 8, will be provided which, in response to an external command identifying the interface cubits to be selected and the switch process to be implemented (unless the switch is set up only to effect one particular process), is operative to sequence and initiate the operations making up the required switch process and to accumulate the parity measurements made as part of the switch process for combination with the other parity measurements made in building the desired E2E entanglement with which the switch EBP length is associated. Where the switch forms part of larger apparatus, the control arrangement can, of course, be integrated with control means of that apparatus although conceptually remaining part of the switch itself.

Figure 11:
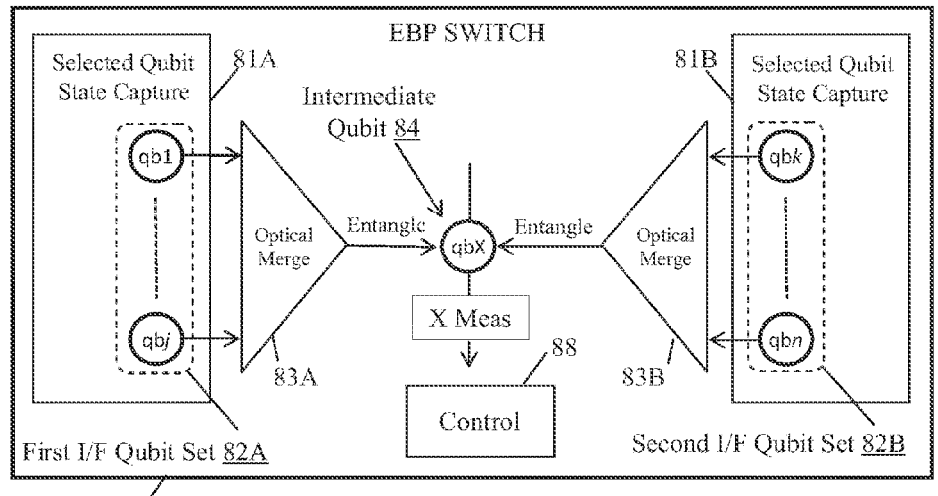
FIG. 11 is a diagram of a variant of the FIG. 8 intermediate-qubit-based EBP switch 80 in which the group of interface qubits is divided into first and second sets.

The intermediate-qubit-based EBP switch 80 can be used in a variety of contexts and specific implementations of the switch appropriate to particular contexts will be described hereinafter. In practice, many contexts effectively result in the group of interface qubits being divided into two sets with the first selected qubit qbA coming from one set and the second selected qubit qbB from the other set—for example, in a quantum repeater, the cubits naturally divide into a first set of one or more left-side qubits and a second set of one or more right-side qubits. FIG. 11 shows an intermediate-qubit-based EBP switch 110 that is a variant of the FIG. 8 intermediate-qubit-based EBP switch 80 and splits the group 82 of interface qubits qb1 to qbn into a first set 82A comprising qubits qb1 to qbj and a second set 82B comprising cubits qbk to qbn (where n≥2 and j≥1). In the FIG. 11 switch variant 110, there is a respective selected-qubit state-capture arrangement 81A, 81B and optical merge unit 83A, 83B for each set 82A, 82B; there is still only one intermediate qubit qbX. For clarity, the emitters 2 and detectors 3 have been omitted from FIG. 11. In carrying out a switch process, the first selected interface qubit qbA is taken from the set 82A and the second selected interface qubit qbB is taken from the set 82B. The switch processes for the FIG. 11 EBP switch 110 are the same as for the FIG. 8 EBP switch 80.

Figure 12:
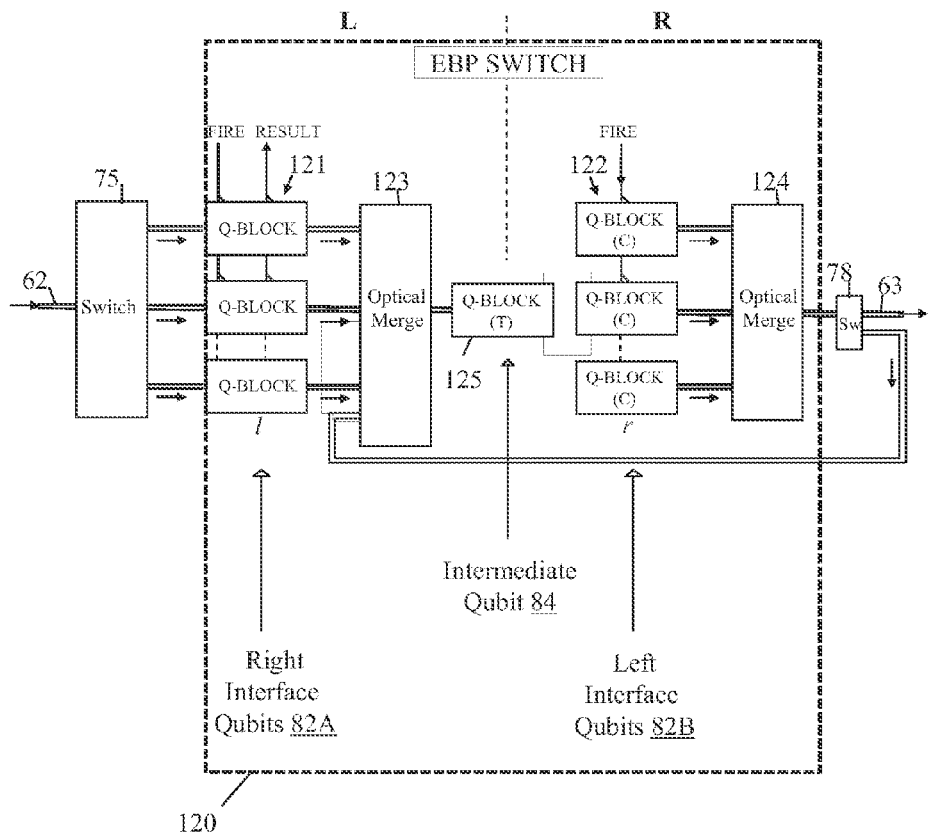
FIG. 12 shows an example implementation of the FIG. 11 variant EBP switch arranged to enable any selected one of l left-side Q-blocks of a quantum repeater to participate in a merge operation with any selected one of r right-side Q-blocks of the repeater.

FIG. 12 shows an implementation 120 of the FIG. 11 intermediate-qubit-based EBP switch for enabling any selected one of l left-side Q-blocks of a quantum repeater to participate in the equivalent of a merge operation with any selected one of r right-side Q-blocks of the repeater. This, of course is the scenario for which EBP switches 70 with optical fabric solutions have already been described with respect to FIGS. 7A and 7B, these solutions requiring the use of one-to-many optical switches. FIG. 12, like FIGS. 7A and 7B, shows the quantum physical hardware of a quantum repeater that interfaces with left and right local link fibres 62 and 63. As can be seen, the left-side repeater Q-blocks 121 (of the universal variety 44) provide the first set of interface qubits 82A of the FIG. 11 EBP switch while the right-side repeater Q-blocks 122 (of the capture variety 40) provide the second set of interface qubits 82B of the FIG. 11 EBP switch. Optical merge units 123 and 124 of the FIG. 12 switch 120 correspond to the optical merge units 83A, 83B respectively of the FIG. 11 EBP switch and serve to optically couple the left and right side Q-blocks respectively to an intermediate Q-block 125 providing the intermediate qubit qbX of the FIG. 11 EBP switch. In fact, for practical convenience, the output of the optical merge unit 124 is optically coupled to the intermediate Q-block 125 via the optical merge unit 123. It may be noted that the output of the optical merge unit 124 also passes via an optical switch 78 which, as for the FIG. 7B optical fabric, serves to route the output of the optical merge unit 124 selectively to the right local link fibre 63 or to the intermediate Q-block (via merge unit 123) depending on whether an LLE is to be created or a local merge operation is to be effected. The switch 78 is conceptually not a part of the EBP switch 120 but simply serves to change the functional configuration of the quantum repeater after the EBP switch 120 has performed its function of establishing an EBP length between a selected pairing of left and right side Q-blocks.

The selected-qubit state-capture arrangements 81A and 81B of the FIG. 11 EBP switch 110 are inherently provided by the Q-blocks 121, 122 since as already described, Q-blocks varieties 40 and 44 both incorporate capture functionality and can be individually fired. Furthermore, all Q-block varieties include X measurement functionality.

Either of the switch processes 100 or 101 (see FIG. 10) can be used with the FIG. 12 EBP switch 120 to merge two entanglements that respectively involve a qubit of a left-side Q-block 121 and a qubit of a right-side qubit. The control arrangement associated with the switch 120 for sequencing and initiating the operations making up the implemented switch process, takes as its command input the previously-mentioned Merge signals, though now the latter need only identify the left and right Q-blocks to be merged.

Figure 13:
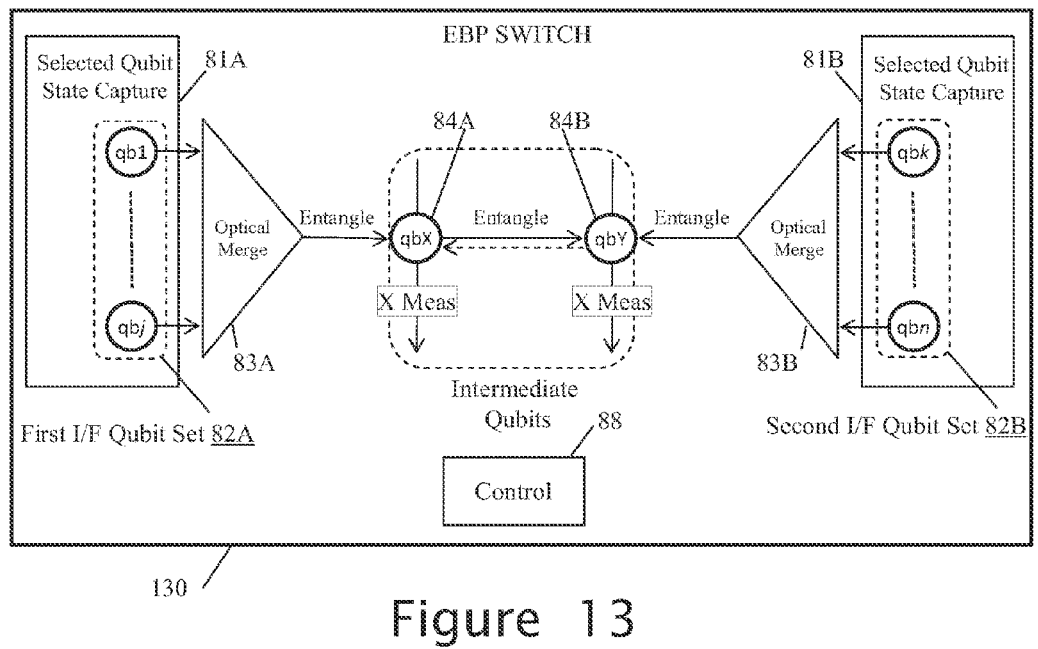
FIG. 13 is a diagram of a second embodiment of an intermediate qubit-based EBP switch of the present invention for establishing, through the use of two intermediate qubits, an EBP length between a selected pairing of a group of interface qubits of the switch.

A second embodiment of the invention in the form of an intermediate-qubit-based EBP switch 130 is conceptually depicted in FIG. 13 and is similar to the variant of the first embodiment shown in FIG. 11 with two sets of interface qubits 82A, 82B, each set having its own associated selected qubit state-capture arrangement 81A, 81B and optical merge unit 83A, 83B. However, in the EBP switch 130 of the second embodiment, two intermediate qubits 84A, 84B (qubits qbX, qbY) are provided rather than just the single intermediate qubit qbX of the first embodiment and its variant. The first set of qubits 82A is optically coupled via the merge unit 83A with the intermediate qubit 84A whereby any selected one of the qubits of the first set 82A can be entangled with the intermediate qubit 84A; similarly, the second set of qubits 82B is optically coupled via the merge unit 83B with the intermediate qubit 81B whereby any selected one of the qubits of the second set 82B can be entangled with the intermediate qubit 84B.

As well as each intermediate qubit 84A, 84B being provided with associated means for carrying out an X measurement on the qubit, provision is also made for entangling the two intermediate qubits with each other (whether this is mediated by a light field first capturing the state of qubit 84A before transferring it to qubit 84B, or vice verse, does not matter as indicated by the full and dotted reverse horizontal arrows between the qubits 84A, 84B in FIG. 13).

The FIG. 13 intermediate-qubit-based EBP switch 130 operates in the same general manner as the FIG. 8 intermediate-qubit-based EBP switch with entanglement, elongate, merge and X measurement operations being used to establish an EBP length between a selected pairing of interface qubits, the difference being that the selected interface qubits are entangled with respective ones of the intermediate qubits which are themselves at some stage entangled with each other.

Figure 14:
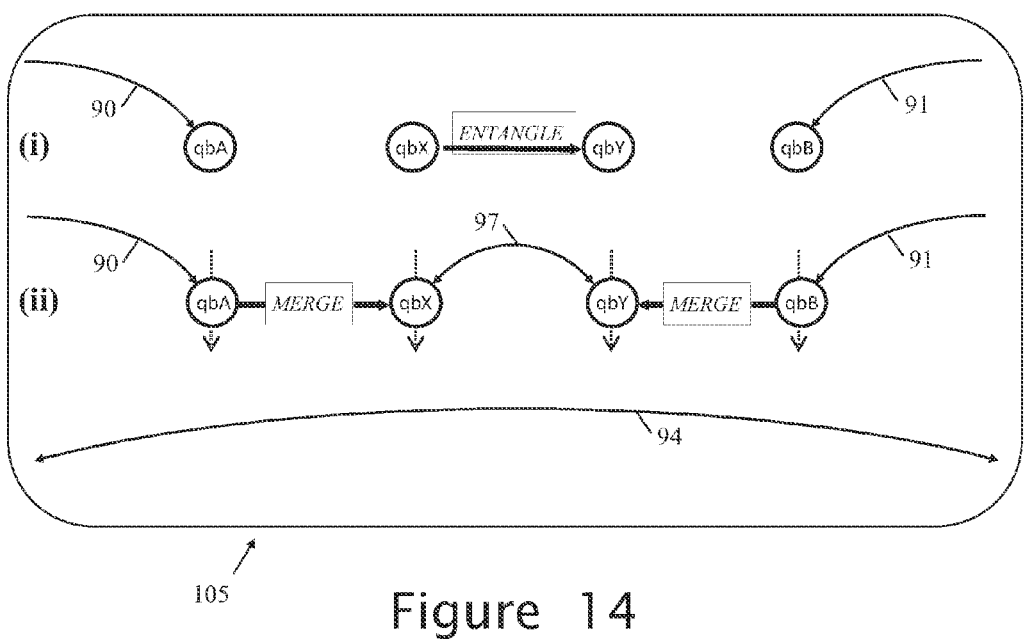
FIG. 14 is a diagram depicting a process for operating the FIG. 13 EBP switch in the situation of the qubits of the selected pairing of interface cubits both being initially separately externally entangled.

FIG. 14 depicts a switch process 105 for switch 130 in the case of a first qubit qbA selected from the first set of interface qubits 82A, and a second qubit qbB selected from the second set of interface cubits 82B, being initially separately externally entangled (entanglements 90 and 91 respectively). FIG. 14 uses the same form of representation of entanglement, merge, and X measurement operations as FIG. 9.

The FIG. 14 switch process 100 process proceeds as follows:
Step (i) An entanglement operation is performed to entangle the intermediate qubits qbX, qbY (entanglement 97);
Step (ii) A merge operation is performed between the first selected qubit qbA and intermediate qubit qbX and, similarly, a merge operation is performed between the second selected qubit qbB and intermediate qubit qbY. The X measurements inherent in the merge operations remove the qubits qbA, qbX, qbY, qbB from entanglement leaving entanglement 94 between the external qubits (not shown) involved in the initial entanglements 90, 91 respectively.

It will be appreciated that a similar result could have been obtained by a switch process (not illustrated) comprising a first step in which entanglement 90 is extended by an elongate operation to qbX and entanglement 91 is extended by an elongate operation to qbY, and a second step in which a merge operation is carried out between qbX and qbY.

Other switch processes, suitable for implementation by EBP switch 130, can be readily devised both for the case of only one of the selected qubits being initially externally entangled and for the case of neither of the selected qubits being initially externally entangled.

FIG. 12 and its related description already give one example application of an intermediate-qubit-based EBP switch. Several further example applications of such a switch are described below. Three of these examples have the context of a chain of quantum repeaters each of which uses a particularly efficient form of LLE creation system (referred to as a "Firing Squad" LLE Creation subsystem); accordingly, a description will first be given of the general form of this LLE creation subsystem and then of a quantum repeater incorporating such a subsystem.

Quantum Repeater Using "Firing Squad" LLE Subsystem

Figure 15:
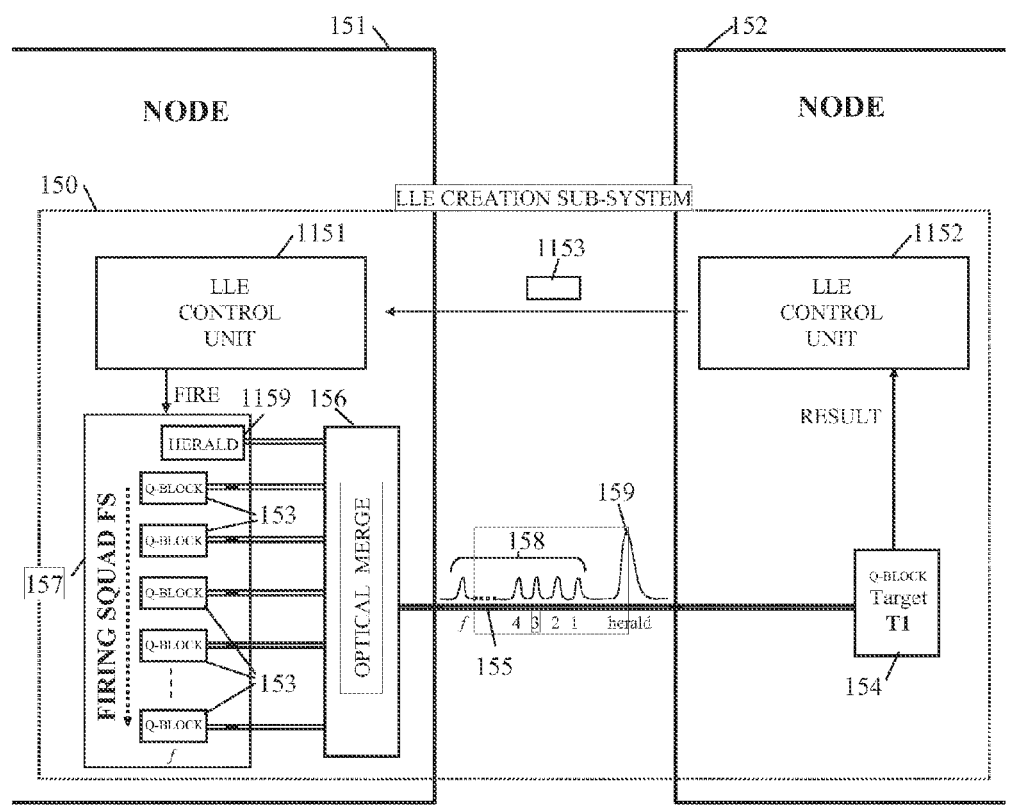
FIG. 15 is a diagram of a reliable "firing squad" form of entanglement creation subsystem for creating local-link entanglements (LLEs) between two optically-coupled nodes.

FIG. 15 depicts a "firing squad" form of LLE creation subsystem 150 formed between two nodes 151 and 152 that are optically coupled by local link fibre 155.

The node 151 comprises an LLE control unit 1151, and quantum physical hardware formed by f Q-blocks 153 (with respective IDs 1 to f) that have Capture interaction functionality, and an optical merge unit 156. The Q-blocks 153 (herein "fusilier" Q-blocks) collectively form a "firing squad" 157. The node 152 comprises an LLE control unit 1152, and quantum physical hardware formed by a single Q-block 154 with Transfer interaction functionality. The fusilier Q-blocks 153 of the firing squad 157 of node 151 are optically coupled through the optical merge unit 156 and the local link optical fibre 155 to the single target Q-block 154 of node 152. Thus, as can be seen, all the Q-blocks 153 of the firing squad 157 are aimed to fire light fields at the same target Q-block 154.

When the LLE control unit 1151 of node 151 outputs a Fire signal to its quantum physical hardware to trigger an LLE creation attempt, the fusilier Q-blocks 153 of the firing squad 157 are sequentially fired and the emitted light fields pass through the optical merge unit 156 and onto the fibre 155 as a light-field train 158. It may be noted that there will be an orderly known relationship between the fusilier Q-block IDs and the order in which the light fields appear in the train. Rather than each light field being preceded by its own herald, a single herald 159 preferably precedes the light-field train 158 to warn the target Q-block 154 of the imminent arrival of the train 158, this herald 159 being generated by emitter 1159 in response to the Fire signal and in advance of the firing of the fusilier Q-blocks 153.

As each light field arrives in sequence at the target Q-block 154 of node 152, the shutter of the target Q-block is briefly opened to allow the light field to pass through the qubit of the target Q-block to potentially interact with the qubit, the light field thereafter being measured to determine whether an entanglement has been created. If no entanglement has been created, the qubit of target Q-block 154 is reset and the shutter is opened again at a timing appropriate to let through the next light field of the train 158. However, if an entanglement has been created by passage of a light field of train 158, the shutter of the target Q-block is kept shut and no more light fields from the train 158 are allowed to interact with the qubit of target Q-block 154. The measurement-result dependent control of the Q-block shutter is logically part of the LLE control unit 1152 associated with the target Q-block 154 though, in practice, this control may be best performed by low-level control elements integrated with the quantum physical hardware.

It will be appreciated that the spacing of the light fields in the train 158 should be such as to allow sufficient time for a determination to be made as to whether or not a light field has successfully entangled the target qubit, for the target qubit to be reset and for the Q-block shutter to be opened, before the next light field arrives.

In fact, rather than using an explicit shutter to prevent disruptive interaction with the target qubit of light fields subsequent to the one responsible for entangling the target qubit, it is possible to achieve the same effect by transferring the qubit state from electron spin to nuclear spin immediately following entanglement whereby the passage of subsequent light fields does not disturb the captured entangled state (the target qubit having been stabilized against light-field interaction). It may still be appropriate to provide a shutter to exclude extraneous light input prior to entanglement but as the qubit is not set into its prepared state until the herald is detected, such a shutter can generally be omitted.

The LLE control unit 1152 is also responsible for identifying which light field of the train successfully entangled the target qubit of Q-block 154 and thereby permit identification of the fusilier Q-block 153 (and thus the qubit) entangled with the target Q-block qubit (as already noted, there is a known relationship between the fusilier Q-block IDs and the order in which the light fields appear in the train). For example, the light fields admitted to the target Q-block may simply be counted and this number passed back by the LLE control unit 1152 to the node 151 in a 'success' form of a message 1153, the LLE control unit 1151 of node 151 performing any needed conversion of this number to the ID number of the successful fusilier Q-block 153 before storing the latter, for example in a register, for later reference (alternatively, the fusilier ID may be passed on immediately). Of course, if none of the light fields of train 158 is successful in creating an entanglement, a 'fail' form of message 1153 is returned.

With regard to the parity information contained in the measurement result in respect of the successful entanglement of the target qubit, this parity information is passed to the control unit 1152 which may either store it for later use (for example in a register) or pass it on for example to node 151 in the message 1153.

Rather than sequentially firing the fusilier Q-blocks 153 of node 151 to produce the train of light fields 158, an equivalent result can be achieved by firing them all together but using different lengths of fibre to connect each fusilier Q-block to the optical merge unit 156, thereby introducing different delays and creating the light-field train 158.

The number of fusilier Q-blocks 153 in the firing squad 157 is preferably chosen to give a very high probability of successfully entangling target Q-block 154 at each firing of the firing squad, for example 99% or greater. More particularly, if the probability of successfully creating an entanglement with a single firing of a single fusilier Q-block is s, then the probability of success for a firing squad off fusilier Q-blocks will be:

$$\text{Firing squad success probability} = 1 - (1-s)^f$$

whereby for s=0.25, 16 fusilier Q-blocks will give a 99% success rate and 32 fusilier Q-blocks a 99.99% success rate. Typically one would start with a desired probability of successfully entangling the target qubit with a single firing (i.e. a single light-field train) and than determine the required number f of fusilier qubits according to the inequality:

$$P_{success} \leq 1 - (1-s)^f$$

The time interval between adjacent light fields in the train 158 is advantageously kept as small as possible consistent with giving enough lime for the earlier light field to be measured, the target qubit reset and its shutter opened before the later light field arrives. By way of example, the light fields are spaced by 1-10 nanoseconds.

Figure 16:
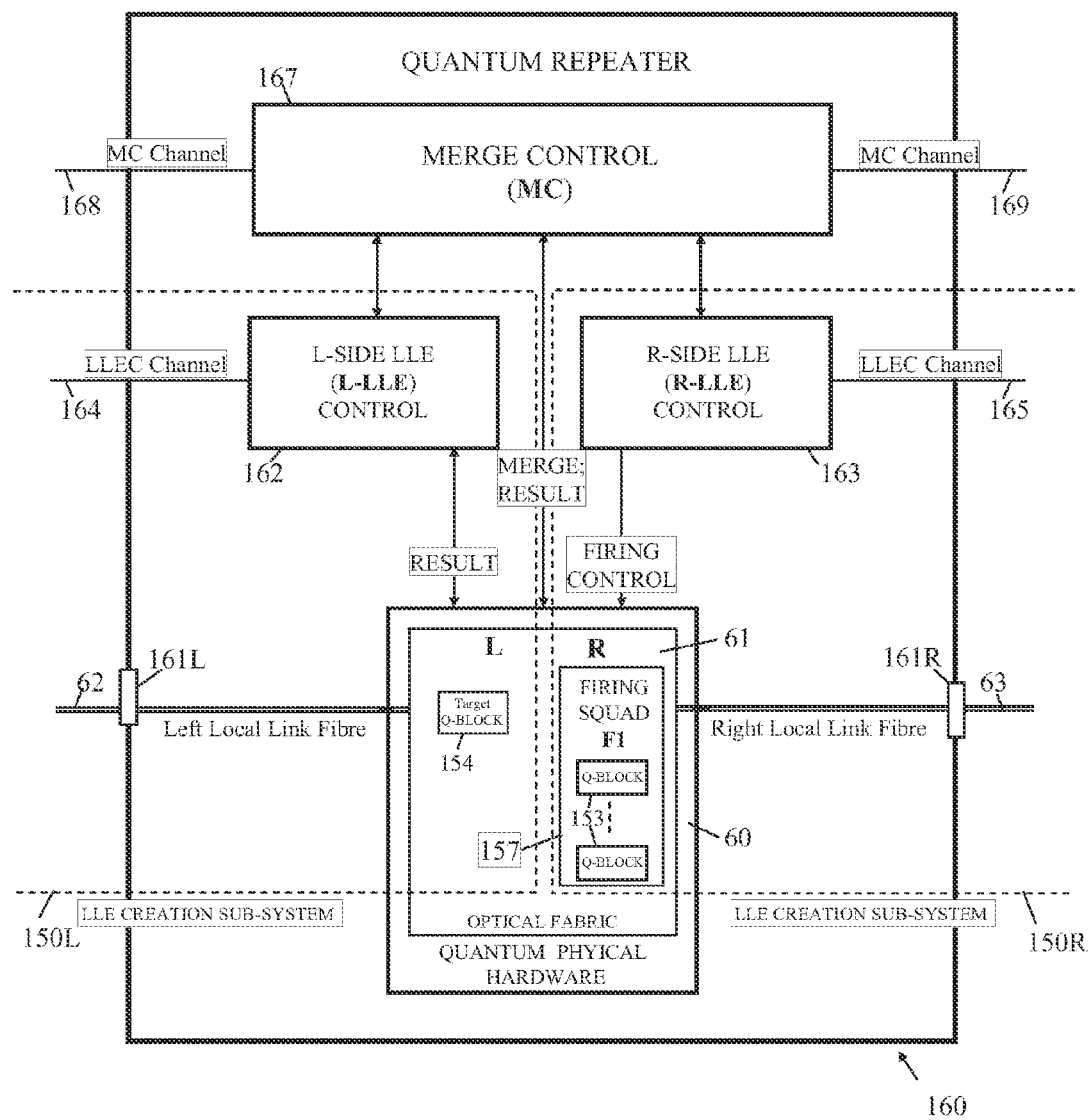
FIG. 16 is a diagram of a general form of quantum repeater built around the FIG. 15 LLE creation subsystem.

FIG. 16 depicts the general form of a quantum repeater implementation based upon LLE creation subsystems of the FIG. 15 "firing squad" form.

More particularly, quantum repeater 160 is optically coupled by left and right local link fibres 62, 63 to left and right neighbour nodes respectively (not illustrated). The quantum repeater 160 includes quantum physical hardware 60 depicted in the generalized manner explained with respect to FIG. 6 and comprising:

- a L-side (left-side) target Q-block 154 that forms part of a left LLE creation subsystem 150L;
- multiple R-side Q-blocks 153 that form the firing squad 157 of a right LLE creation subsystem 150R; and
- an optical fabric 61 coupled to left and right local link fibres 62, 63 via respective optical interfaces 161L, 161R.

Figure 17:
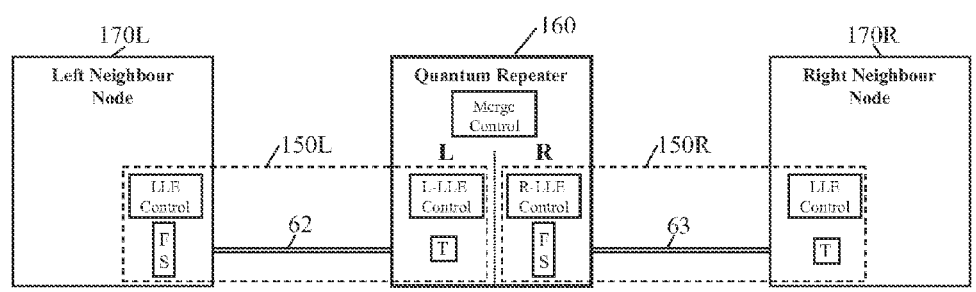
FIG. 17 is a diagram showing how the FIG. 16 quantum repeater cooperates with neighbouring nodes to form two LLE creation subsystems.

The left and right LLE creation subsystems 150L, 150R are substantially of the form illustrated in FIG. 15. As graphically depicted in FIG. 17, the left LLE creation subsystem 150l, comprises:

(a) in repeater 160, the above-mentioned L-side elements of the quantum physical hardware 60 (in particular, the target Q-block 154, depicted in FIG. 17 by a box with the letter 'T' inside), and a left LLE (L-LLE) control unit 162;

(b) the left local link fibre 62; and (c) in a left neighbour node 160L, a firing squad of fusilier Q-blocks 153 (depicted in FIG. 10 by a box with the letters 'FS' inside and its associated optical fabric and LLE control unit.

The right LLE creation subsystem 150R comprises:

(a) in repeater 160, the above-mentioned R-side elements of the quantum physical hardware 60 (in particular, the firing squad 157 depicted as box 'FS'), and a right LLE (R-LLE) control unit 163;

(b) the right local link fibre 63; and (c) in a right neighbour node 170R, a target Q-block (box 'T') and its associated optical fabric and LLE control unit.

Thus, although the quantum repeater 160 does not itself incorporate a complete operative LLE creation subsystem 150 of the FIG. 15 form, its R-side and L-side respectively comprise complementary firing squad and target portions of a FIG. 15 LLE creation subsystem 150, albeit that these portions relate to oppositely directed LLE creation subsystems.

Figure 18:
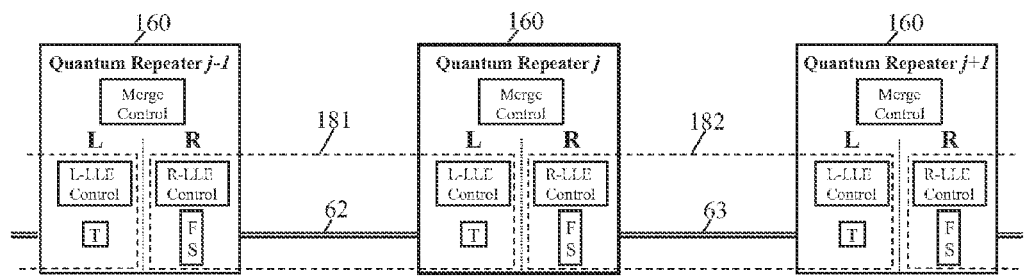
FIG. 18 is a diagram showing how FIG. 16 quantum repeaters can be serially optically coupled to provide LLE creation subsystems between neighbouring repeaters.

With this arrangement of complementary firing squad and target portions of an LLE creation subsystem 150, multiple quantum repeaters 160 can be optically coupled in series such as to form an LLE creation subsystem between neighbouring repeaters as is illustrated in FIG. 18 for quantum repeaters j−1, j, j+1 (the quantum repeater j forming an LLE creation subsystem 181 with its left neighbour repeater j−1 and an LLE creation subsystem 182 with its right neighbour repeater j+1).

The optical fabric 61 of the quantum repeater 160, as well as coupling the L-side and R-side Q-blocks to the left and right local link fibres 62, 63 respectively for LLE creation, also provides for the selective optical coupling of the L-side target Q-block 154 to a selected one of the R-side fusilier Q-blocks 153 for the purpose of effecting a local merge operation on the qubits of these Q-blocks.

During LLE creation, the quantum physical hardware 60 receives filing control signals from the R-LLE control unit 163 for controlling the R-side elements (in particular, the triggering of the firing squad 157), and outputs result signals (success/failure; parity; fusilier-identifying information) from the L-side target Q-block 154 to the L-LLE control unit 162. For a local merge operation, the quantum physical hardware 60 receives merge control signals from a merge control unit 1677 (these signals selecting the fusilier Q-block 153 that is to participate in the merge, and triggering the merge itself), and outputs back to the unit 167 result signals (success/failure; parity) regarding the outcome of the merge operation.

A suitable implementation of the optical fabric 61 is that shown in FIG. 7B but with only one L-side Q-block and the optical switch 75 removed (this no longer being needed due to the fact that there is only one L-side Q). This absence of optical switch 75 means that there is little to be gained in replacing the fully optical implementation of the EBP switch provided by the modified FIG. 7B arrangement for selective coupling of L-side and R-side Q-blocks, with an EBP switch using one or more intermediate qubits (such as FIG. 12 EBP switch 120 but with only one L-side Q-block 121).

The quantum repeater 160 is arranged to be linked by logical control channels to its left and right neighbour nodes as is more fully described below.

An LLE control ("LLEC") classical communication channel 164 inter-communicates the L-LLE control unit 162 with the R-LLE control unit of the left neighbour node (that is, the R-LLE control unit associated with the same LLE creation subsystem 150L, as the L-LLE control unit 162); the L-LLE control unit 162 uses the LLEC channel 164 to pass LLE creation success/failure messages (message 1153 in FIG. 15) to the R-LLE control unit of the left neighbour node.

An LLE control ("LLEC") classical communication channel 165 inter-communicates the R-LLE control unit 163 with the L-LLE control unit of the right neighbour node (that is, the L-LLE control unit associated with the same LLE creation subsystem 150R as the R-LIE control unit 163); the R-LLE control unit 163 receives LLE creation success/failure messages (message 1153 in FIG. 15) over the LLEC channel 165 from the L-LLE control unit of the right neighbour node.

A merge control ("MC") classical communication channel 168, 169 inter-communicates the MC unit 167 with corresponding units of its left and right neighbour nodes to enable the passing of success/fail lire and parity information concerning merge operations. As noted above, the passing of success/failure information may be omitted in appropriate cases.

The LLEC communication channel 164, 165 and the MC communication channel 168, 169 can be provided over any suitable high-speed communication connections (such as radio) but are preferably carried as optical signals over optical fibres. More particularly, the LLEC communication channel 164, 165 and file MC communication channel 168, 169 can be carried over respective dedicated optical fibres or multiplexed onto the same fibre which could be the fibre used for the local links optically coupling Q-blocks in neighbouring nodes— for example, the MC communication channel can be implemented as intensity modulations of the herald signal 159, particularly where only parity information is being sent on this channel). More generally, the LLEC and MC communication channels can be combined into a single duplex classical communications channel.

It will be appreciated from the foregoing that initiation of right-side LLE creation is effectively under the control of the R-LLE control unit 163 (as this unit 163 is responsible for triggering the firing squad 157); initiation of left-side LLE creation is effectively under the control of the R-LLE control unit in the left neighbour node; and initiation of a local merge operation is under the control of the merge control unit 167. Of course, a merge operation can only be effected once the target Q-block 154 is entangled to the left and one of the fusilier Q-blocks 153 is entangled to the right.

Entanglement parity can be handled either by standardizing the parity of entanglements by qubit state flipping, or by storing LLE parity information and subsequently combining it with merge parity information for passing on along cumulatively to an end node (typically in MC messages) thereby to enable the latter to determine the parity of end-to-end entanglements.

There are a number of different strategies that can be adopted for building an end-to-end ("E2E") entanglement between two end nodes linked by a chain of quantum repeaters 160; the strategy used will generally be embedded in the operational logic of one or more of the control units of each repeater.

One strategy (herein called "Extend-from-End") involves an iterative process, starting with an LLE between the left end node and the neighbouring quantum repeater, of extending an entanglement existing between the left end node and a quantum repeater of the chain of nodes by merging that entanglement with an LLE formed between that repeater and its right neighbour node. For each iteration, the operative quantum repeater (the one effecting the entanglement-extending merge) shifts rightwards by one along the chain of nodes (that is, away from the end node anchoring the entanglement being extended). With this strategy, a current operative repeater, once it has successfully carried out an entanglement-extending merge, passes on its 'operative repeater' mantle to its right neighbour by a trigger signal (effectively serving as a token) sent over the MC channel. This neighbour, now the operative repeater, knows that it is entangled leftwards (because its left neighbour would only have passed on its 'operative repeater' mantle after successfully merging the LLE between them with the entanglement anchored at the left end node) and so can carry out its own merge operation whenever a right-side LLE exists. By appropriate choice of the number of fusilier Q-blocks 153 in the firing squad 157, it is possible to achieve a high probability of successfully creating a right-side LLE from a single firing of the firing squad. Therefore, if a right-side LLE does not already exist when a repeater becomes the operative repeater, such an LLE can be created rapidly; as a result, building of an E2E entanglement proceeds quickly. From the foregoing, it will be appreciated that the "Extend-from-End" strategy is effectively embodied by having the merge control unit of each repeater only becoming active when it becomes the operative repeater, and then passing on the 'operative repeater' mantle to its right neighbour in a trigger signal after successfully carrying out an entanglement-extending merge.

In fact, the high probability of successfully creating a right-side LLE from a single triggering of the firing squad of the repeater 160 permits a number of other strategies for building an end-to-end ("E2E") entanglement that would otherwise be impracticable. For example, a "Synchronized" strategy can be used in the case where all repeaters in a chain of quantum repeaters 160 can be time synchronized (for example, by timing taken from a GPS constellation or by phase lock looping clocks in the repeaters by signals sent between them). Now, during each successive synchronized operating cycle of the repeaters, each repeater creates a right-side LLE by the triggering of its firing squad (whereby LLEs are brought into existence between all repeaters), and then all the repeaters substantially simultaneously carry out a merge operation provided all the merges are successful, the effect is to create an E2E entanglement. The overall process of creating an E2E entanglement is thus even quicker than for the "Extend-from-End" strategy because the repeaters are effectively operating in parallel. It will be appreciated that the "Synchronized" strategy is effectively embodied by having the merge control unit 167 and R-LLE control unit 163 of each repeater operate under the control of the synchronized clock.

Another strategy that takes advantage of the high probability of successfully creating a right-side LLE, but which does not call for synchronized operation of the quantum repeaters in the chain, has the quantum repeaters operating on a "Quasi Asynchronous" basis to build an end-to-end (E2E) entanglement. Building an E2E entanglement on the "Quasi Asynchronous" basis involves a cycle-trigger signal being propagated over the MC channel along the chain of nodes from one end node thereby to enable each repeater along the chain to carry out one top-level cycle of operation in which it initiates a local merge operation when left and right qubits of the repeater are known to be, or are expected to be, leftward and rightward entangled respectively. Typically, each repeater is responsible for initiating creation of right side LLEs either in response to receiving the cycle-trigger signal or independently thereof. In due course, every repeater will have effected a single merge and this results in an E2E entanglement being created, the whole process constituting an E2E operating cycle. The order in which the repeaters carry out their respective merge operations in an E2E operating cycle is not necessarily the same as the order in which the repeaters receive the cycle-trigger signal but will depend on a number of factors, most notably the spacing between nodes. Further E2E operating cycles can be initiated by the sending out of further cycle-trigger signals. While the top-level operating cycles of any one repeater do not overlap, the E2E operating cycles may do so.

Building an E2E entanglement on the "Quasi Asynchronous" basis has similarities to building an E2E entanglement on the "Extend-from-End" basis, both involving the propagation of a quantum-repeater (QR) trigger signal along the chain of repeaters. The main difference is that when operating on the "Quasi Asynchronous" basis the trigger signal is sent on by each repeater without waiting for the local merge operation at the repeater to be carried out Whereas when operating on the "Extend-from-End" basis, the trigger signal is propagated on only after a successful merge. In fact, operation on the "Synchronous" can also be seen to be regulated by a QR trigger signal, this being the timing signal synchronously generated in each repeater. Thus, regardless of the basis of operation, it can be seen that the merge control unit initiates a merge under the conditions that it has received a QR trigger signal and left and right-side entanglements are known (or can be reasonably be expected) exist.

It will be appreciated that creating a single E2E entangle ent is generally of little practical use on its own and what is required is the successive creation of a large number of E2E entanglements. This is achieved by arranging for the cyclic operation of the repeaters individually and of the chain as a whole. More particularly, the following operating cycles can be distinguished:

E2E Operating Cycle
is the operating cycle of the node-chain taken as a whole in which LLEs established between every pair of neighbour nodes are merged to create one E2E entanglement.

Top-Level Repeater Operating Cycle
is the top-level operating cycle of quantum repeater generally encompassing one merge operation (but potentially more if there are multiple LLE creation subsystems between repeaters); the cycle period is generally determined by the period between successive trigger signals. For operation on the 'Synchronized' or 'Extend from End' basis, the top-level repeater operating cycle matches the E2E operating cycle. For operation on the 'Quasi-Asynchronous' basis, the E2E operating cycle period will be substantially longer than the top-level repeater operating cycle period but the E2E operating cycles overlap each other.

LLE Creation Subsystem Operating Cycle
is the operating cycle for creating an LLE. This cycle will generally be coordinated with the top-level repeater operating cycle. However, it is also possible to effect LLE creation on a free-running basis in which a new LLE creation operation is initiated immediately the previous LLE is used or times out; in this case, the LLE creation operating cycle period will be variable.

Thus, in general terms, cyclic operation is driven by the cyclic generation of the trigger signals that trigger top-level cyclic operation of each repeater; the E2E operating cycles follow naturally from the latter whereas the LLE creation subsystem operating cycles are arranged to keep pace with the LLE demand determined by the top-level repeater operation.

Four Example Applications of Intermediate-Qubit-Based EBP Switches

1) Quantum Repeater Chain End—Node Buffers

The end nodes linked by a chain of quantum repeaters each contain functionality for inter-working with the facing side (L or R) of the neighbouring quantum repeater. Thus, the left end node will include functionality similar to that of the R-side of a quantum repeater thereby enabling the left end node to inter-work with the L-side of the neighbouring repeater, and the right end node will include functionality similar to that of the L-side of a quantum repeater to enable the right end node to inter-work with the R-side of the neighbouring repeater.

The left and right end nodes also serve a further function, namely to free up at the end of each E2E creation cycle the entangled end-node LLE creation subsystem qubits between which an E2E has just been formed. This is done by providing each end node with an output buffer comprising multiple Q-blocks and shifting each newly created E2E entanglement across into qubits of the buffers pending their consumption by consumer applications associated with the end nodes.

Figure 19:
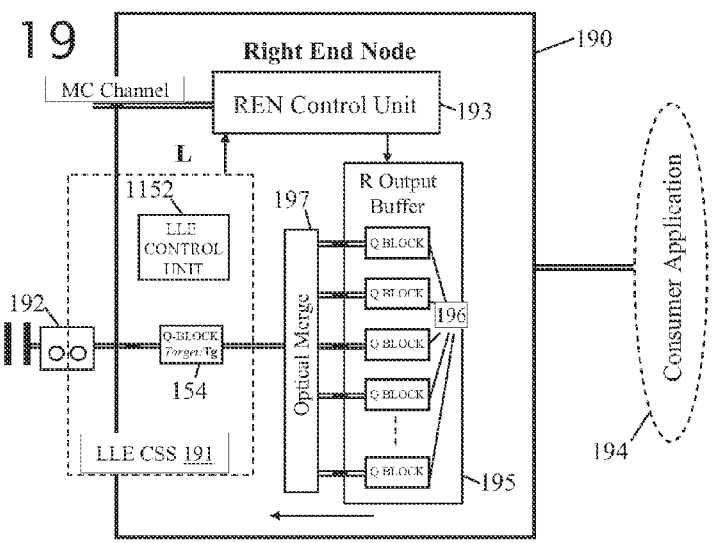
FIG. 19 is a diagram of an example implementation of a right end node of a chain of nodes having intermediate nodes formed by FIG. 16 quantum repeaters.
Figure 20:
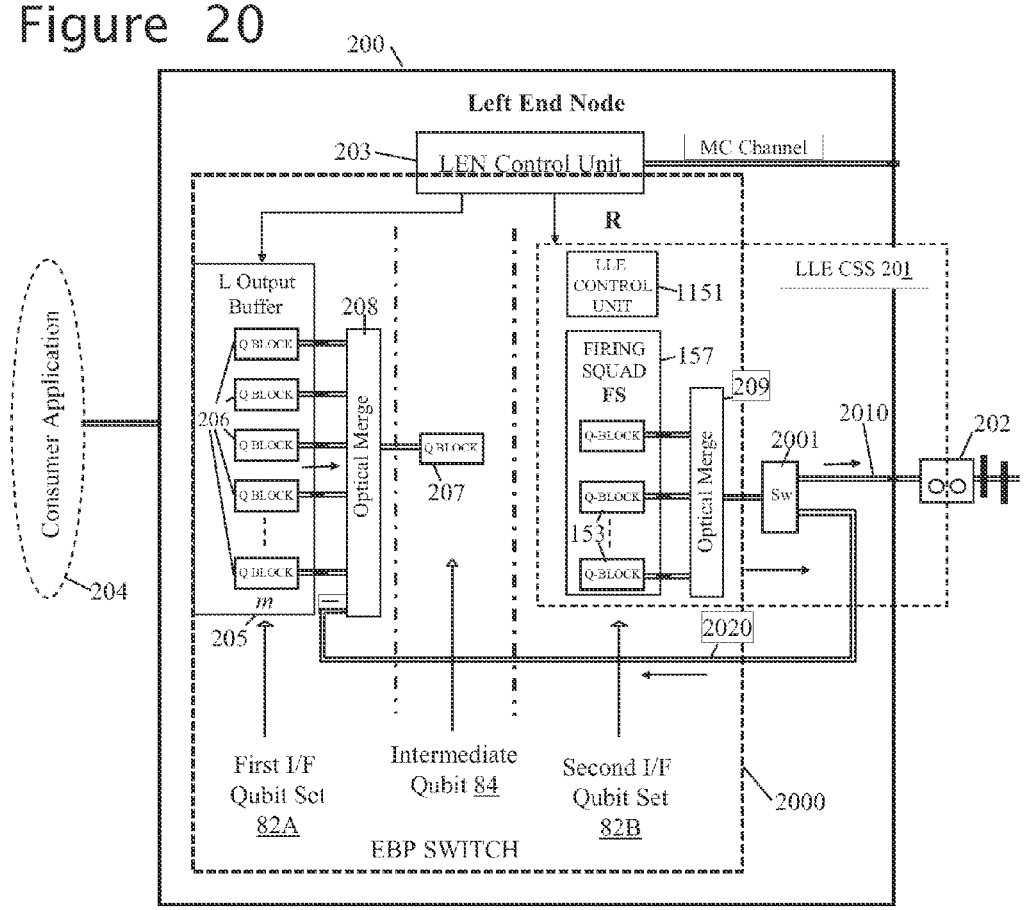
FIG. 20 is a diagram of an example implementation of a left end node of a chain of nodes having intermediate nodes formed by FIG. 16 quantum repeaters, the left end node including a bank of buffer qubits and an EBP switch of the FIG. 11 form for moving one end of an end-to-end entanglement into a selected one of the buffer qubits.

FIGS. 19 and 20 depict example implementations 190 and 200 of right and left end node respectively.

The right end node 190 shown in FIG. 19 comprises:
a target Q-block 154 and associated LLE control unit 1152 of an LLE creation subsystem 191 formed with left neighbour quantum repeater node 192;
an output buffer 195 comprising multiple Q-blocks 196 into a selected one of which the end of an entanglement rooted in target Q-block 154 can be transferred;
a high-level right end node (REN) control unit 193 that interfaces with the LLE control unit 1152, the buffer 195, and MC channel fibre, for the purpose of coordinating the transfer of the right end root of each E2E entanglement into the buffer.

The right end node 190 also interfaces with a local E2E entanglement consumer application 194 (shown dashed).

In order to transfer the right end root of an E2E entanglement from the target Q-block 154 to a selected one of the buffer Q-blocks 196, an EBP switch is provided to establish the required EBP length between the target Q-block and the selected buffer Q-block. As there is only one target Q-block 154, it is possible to implement this EBP switch without using an optical switch or intermediate qubits in much the same manner as described above in connection with effecting a merge operation between a target Q-block 154 and a desired fusilier Q-block 153 in the FIG. 9 quantum repeater. More particularly, the optical fabric used in the FIG. 19 right end node comprises an optical merge unit 197 that couples the buffer Q-blocks 196 to the target Q-block 154. The buffer Q-blocks 196 have Capture interaction functionality and the target Q-block 154 possesses Transfer interaction capability. To transfer the right end root of an E2E entanglement from the target Q-block 154 to a particular buffer Q-block, the qubit of the latter is first entangled with the qubit of the target Q block 154 by an entanglement operation; this is effected by selectively energizing the emitter associated with the buffer Q-block 196 concerned thereby causing a light field to traverse the qubit of that Q-block before being channeled by the optical merge unit 197 to the target Q-block 154. Thereafter, the qubit of the target Q-block 154 is removed from entanglement by an X measurement operation.

The REN control unit 193 is responsible for keeping track of which buffer Q-blocks 196 are currently entangled and also to correctly associate the cumulative parity information received in MC messages on the MC channel fibre with the relevant buffer Q-block 196.

The left end node 200 shown in FIG. 20 comprises:
firing squad 157 with fusilier Q-blocks 153, and associated LLE control unit 1151 of an LLE creation subsystem 201 formed with right neighbour quantum repeater node 202;
a high-level left end node (LEN) control unit 203 that includes a clock (not separately shown) for triggering the firing squad at regular intervals; the control unit interfaces with the MC channel fibre and sends out a cumulative parity message at the start of each E2E creation cycle (this message will only include parity information on the right LLE as the end node does not perform a local merge);
an output buffer 205 comprising in Q-blocks 206 into a selected one of which the end of an entanglement rooted in a fusilier Q-block 93 can be transferred under the control of LEN control unit 203.

The left end node 200 also interfaces with a local E2E entanglement consumer application 204 (shown dashed).

FIG. 20 depicts a particular implementation of an intermediate-qubit-based EBP switch 2000 of the FIG. 11 form for establishing an EBP length between a selected one of the fusilier Q-blocks 153 and a particular buffer Q-block 206. The depicted intermediate-qubit-based EBP switch 2000 avoids the use of an f×m optical switch that would otherwise be required to interface the f fusilier Q-blocks 153 with the m Q-blocks of the output buffer 205, this being achieved through the provision of an intermediate Q-block 207.

The intermediate-qubit-based EBP switch 2000 is very similar in form to the EBP switch 120 described above with reference to FIG. 12. In the EBP switch 2000, the f fusilier Q-blocks 153 are optically coupled through an optical merge unit 209 and local link fibre 2010 to the repeater node chain. The fusilier and buffer Q-blocks 153 and 206 all have Capture interaction functionality whereas the intermediate Q-block 207 has Transfer interaction capability. A 1×2 optical switch 2001 enables the output of the optical merge unit 209 to be switched between the local link fibre 2010 and a loopback fibre 2020 that feeds an input of an optical merge unit 208; the outputs of the buffer Q-blocks 206 are also coupled as inputs to the optical merge unit 208. The output of the optical merge unit 208 is coupled to the intermediary Q-block 207. This arrangement permits any selectively-fired one of the Q-blocks 153 or any selectively-fired one of the output-buffer Q-blocks 206 to be coupled to the intermediary Q-block 207.

It can readily be seen that the buffer Q-blocks 206 and the firing squad Q-blocks 153 respectively map to the first and second sets of interface qubits 82A, 82B of the FIG. 11 intermediate-qubit-based EBP switch 110; similarly the intermediate Q-block 207 maps to the intermediate qubit 84.

A control arrangement for the EBP switch 200 is integrated into the LEN control unit 203 and serves to control implementation of switch process 102 or 103 (see FIG. 10) in order to transfer the end of an E2E entanglement anchored in one of the fusilier Q-blocks 153 across to a selected one of the output-buffer Q-blocks 206.

The LEN control unit 203 is responsible for keeping track of which buffer Q-blocks 206 are currently entangled and determining which buffer Q-block and fusilier Q-block are next to be involved in a transfer effected by EBP switch 2000.

It will be appreciated that associated with the operation of moving of an E2E entanglement into a buffer Q-block, will be one or more parity measurements. If a measured parity is even, no further action is needed as the parity of the E2E entanglement unchanged; however, if a measured parity is odd, then to keep the E2E entanglement the same, the buffer qubit concerned is flipped.

2) Quantum Repeater Chain—Network Switch

Figure 21:
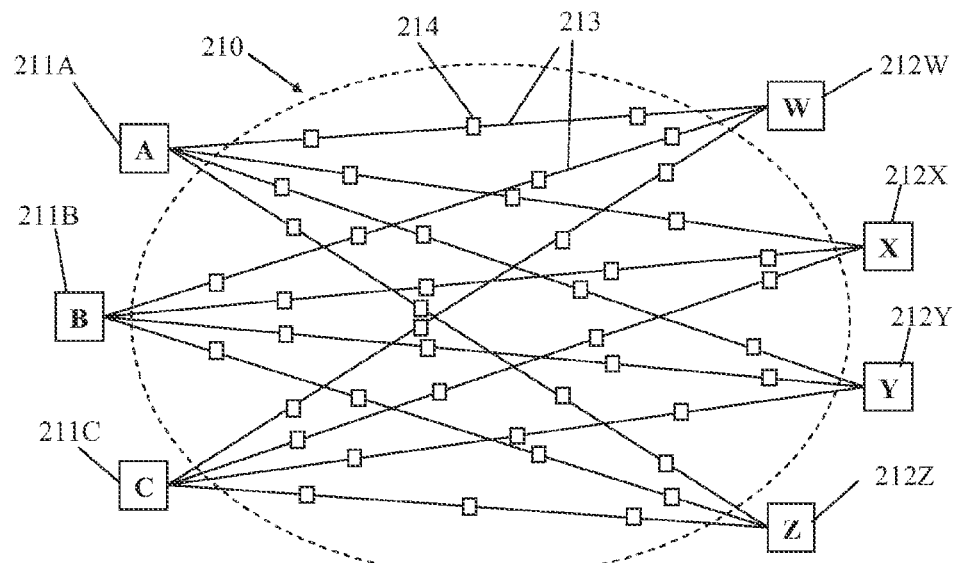
FIG. 21 depicts a quantum network in which three left end nodes are each linked by respective quantum repeater chains to each of four right end nodes.

A chain of quantum repeaters such as that depicted in FIG. 3B enables an E2E entanglement to be created between arbitrarily spaced right and left end nodes—the chain of repeaters effectively defines a point-to-point entanglement build path (EBP) between the end nodes. A single quantum repeater chain is the simplest form of a quantum network, that is, a network of elements enabling quantum entanglements to be created between qubits in nodes at the edge of the network (end nodes). By using multiple quantum repeater chains, it is possible to establish a quantum network of point-to-point EBPs between any number of left end nodes and any number of right end nodes thereby enabling E2E entanglements to be created between any desired pairing of left and right end nodes. FIG. 21 depicts such a quantum network 210 in which three left end nodes 211A-C (for brevity, nodes A-C) are each linked by respective quantum repeater chains 213 (only two of which are referenced) to each of four right end nodes 212W-Z (again, for brevity, nodes W-Z). In FIG. 21, the quantum repeater nodes of each chain 213 are represented by small squares on a line connecting the pair of end nodes concerned; it will be appreciated that the number and spacing of these repeaters in each chain may vary from that illustrated. It can readily be seen from FIG. 21, that providing a respective quantum repeater chain 213 for each pairing of left and right end nodes is inherently costly and inefficient, particularly if all the left and right end nodes form respective clusters separated by a large distance.

Figure 22:
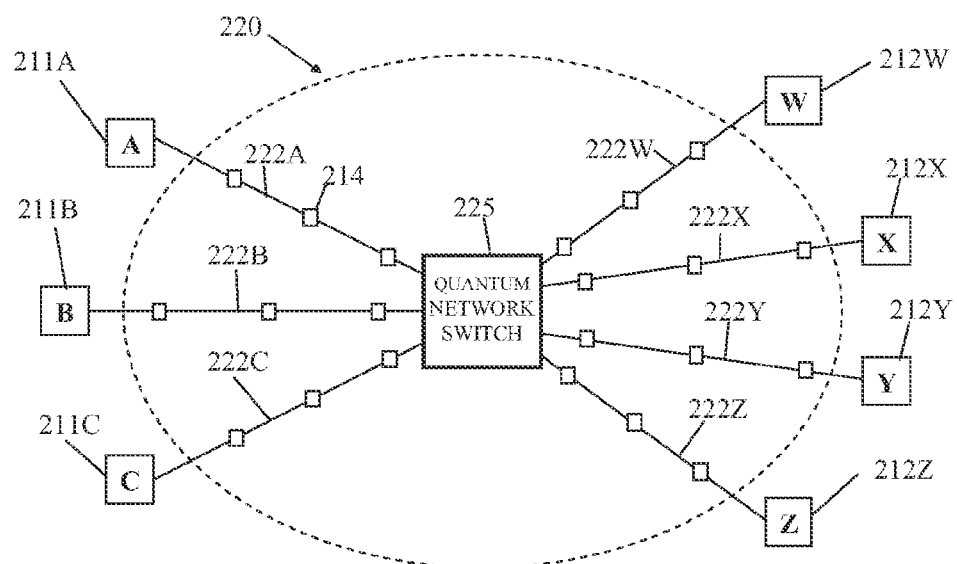
FIG. 22 depicts a quantum network which like that of FIG. 21 has three left end nodes and four right end nodes, but uses a quantum network switch to enable entanglements to be established between any pairing of the left and right end nodes.

FIG. 22 depicts a more efficient approach to providing for the establishment of EBPs between any pairing of the left and right end nodes 211, 212. In FIG. 22, a quantum network 220 is provided with a quantum network switch 225 to which each of the end nodes A-C, W-Z is linked by a respective quantum repeater chain segment 222, these segments being distinguished by the letter label A, B, C, W, X, Y, Z of the end node concerned (thus, for example, quantum repeater chain segment 222B links left end node 211B to the quantum repeater switch 225). For convenience, the quantum repeater chain segments 222A-C associated with left end nodes A-C are referred to below as the "left QR chain segments" while the quantum repeater chain segments 222W-Z associated with the right end nodes W-Z are referred to as the "right QR chain segments"

The quantum network switch 225 enables any one of the left QR chain segments 222A-C to be operatively coupled to any one of the right QR chain segments 222W-Z, and an EBP length established therebetween. As will be more fully described below, the quantum network switch 225 basically takes the form of multiple, reconfigurable, quantum repeaters built around an intermediate-qubit-based EBP switch. Since the intermediate qubit or bits at the heart of EBP switch are only very briefly involved in establishing an EBP length through the quantum network switch 225 between a desired pairing of left and right QR chain segments, it is possible for the switch to effectively service multiple desired pairings of QR chain segments by providing the required EBP lengths in quick succession, this generally being done on a cyclic basis.

Figure 23:
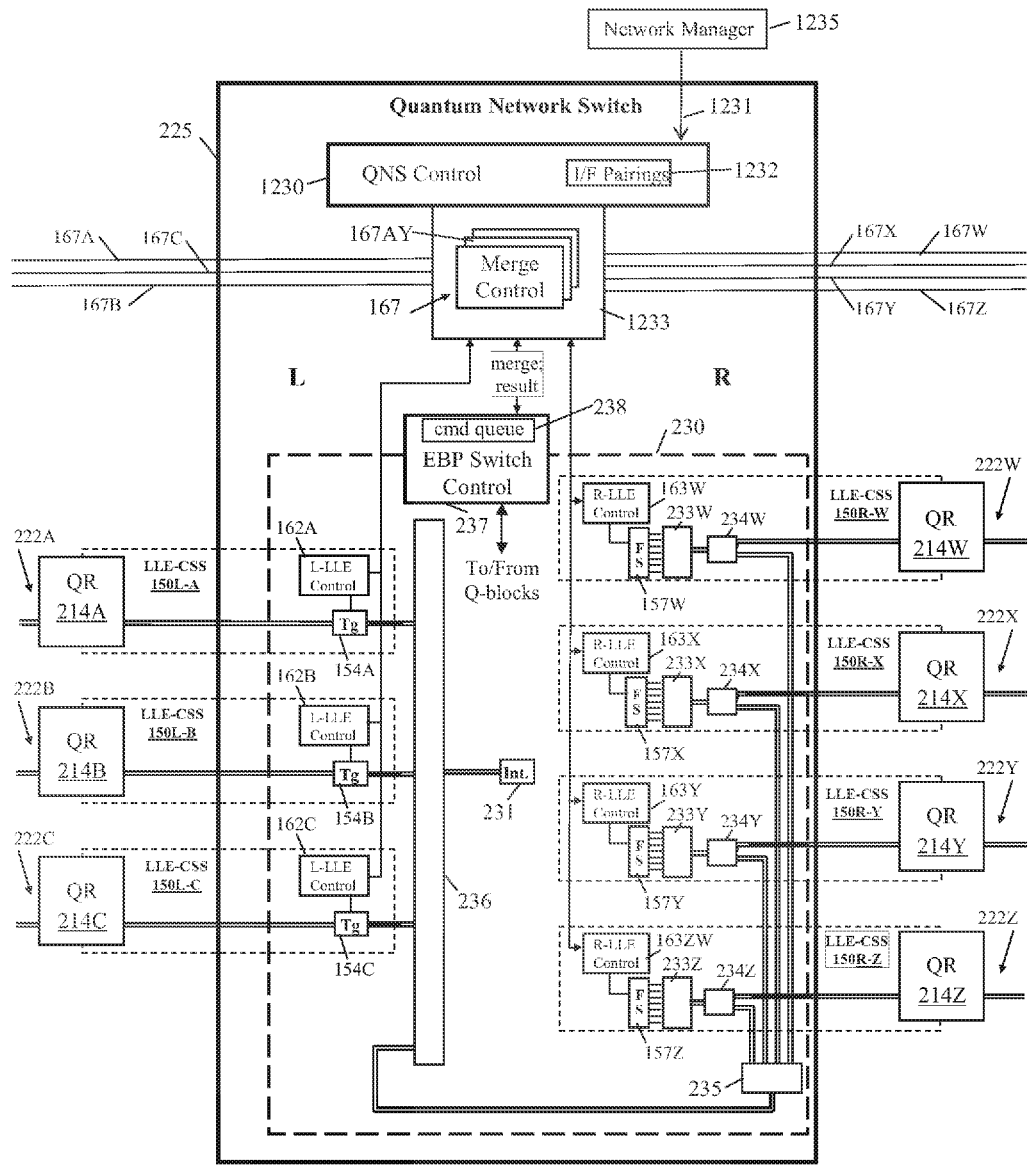
FIG. 23 is a diagram showing in more detail the quantum network switch of FIG. 22.

The quantum network switch 225 is shown in detail in FIG. 23, it being understood that the number of left and right QR chain segments attaching to the switch 25 can be varied from that illustrated.

The switch 25 terminates each of the QR chain segments 222A-Z by providing appropriate quantum network interfaces for completing the LLE creation subsystem involving the last QR in the chain segment. Thus, for the three left QR chain segments 222A-C, the switch 225 provides quantum network interfaces in the form of respective target Q-blocks 154A-C (labelled "Tg") and left-LLE control units 162A-C to complete respective left LLE creation subsystems 150L-A, 150L-B, 150L-C with the complementary firing squads in the last QR 214A-C of each of the left QR chain segments 222A-C. Similarly, for the four right QR chain segments 222W-Z, the switch 225 provides quantum network interfaces in the form of respective firing squads 157W-Z (labelled "FS") and right-LLE control units 163W-Z to complete respective right LLE creation subsystems 150R-W, 150R-X, 150R-Y, 150R-Z with the complementary target Q-blocks in the last QRs 214W-Z of each of the right QR chain segments 222W-Z.

The quantum network switch 225 includes a number of merge control units 67, one for each pairing of left and right QR chain segments it is desired to couple at any one time (in the present case, a maximum of three concurrent pairings is possible so three merge control units are provided). It will be appreciated that where the units 67 are implemented in software, an instance of a merge control unit 67 can be instantiated as and when needed. A classical-signal switching fabric 1233 is associated with the merge control units 167 and serves to interface the latter as required with the MC channels 167A-C, W-Z of the QR chain segments 222A-C, W-Z and with the LLE control units 162, 163.

The quantum network switch 225 further includes an intermediate-qubit-based EBP switch 230 that enables an EBP length to be established between and desired pairing of left and right QR chain segments and, more particularly, between the target Q-block 154 of any selected one of the left QR chain segments 222A-C and the appropriate fusilier Q-block of the firing squad 157 of any selected one of the right QR chain segments 222W-Z.

A QNS control unit 1230 of the quantum network switch 225 receives command inputs on line 1231 from a network manager unit 1235 indicating desired pairings of left and right QR chain segments, these pairings being stored in memory 1232. The QNS control unit 1230 controls the classical-signal switching fabric 1233 so as effectively to implement a respective quantum repeater for each stored pairing of left and right QR chain segments, thereby completing a QR chain between the corresponding pairs of left and right end nodes. Thus, for example, if the left QR chain segment 222A is paired with the right QR chain segment 222Y, the switching fabric 1233 routes the MC channels 168A, 169Y of these chain segments to the same merge control unit (referenced 167AY below for convenience of identification) and interfaces this merge control unit 167AY with the left and right LLE control units 162A and 163Y. This merge control unit 167AY is now in a position to detect when the target Q-block 154A and a fusilier Q-block of firing squad 157Y are (or can be expected to be) involved in left-side and right-side entanglements respectively and thus when a merge of these entanglements should be performed; at this point, the merge control unit 167AY commands a control unit 238 of the intermediate-qubit-based EBP switch 230 to carry out the appropriate switch process to establish an EBP length between the target Q-block 154A and the appropriate fusilier Q-block of firing squad 157Y, the effect of which is to merge the entanglements involving these Q-blocks.

As the intermediate-qubit-based EBP switch 230 can only service one merge control unit 167 at a time, the EBP switch control unit 238 includes a command buffer 238 for queuing inputs from the merge control units 167. Typically, the switch control unit 238 will service these queued commands in turn, though other strategies are possible.

As regards the details of the EBP switch 230, this switch comprises an optical merge architecture enabling a light field selectively emitted by any one of the target or fusilier Q-blocks 154, 157 (after interacting with the qubit of that Q-block), to be routed to an intermediate Q-block 231 to interact with the qubit of that Q-block. The optical merge architecture comprises a respective optical merge unit 233X-W for merging light fields output by the fusilier Q-blocks of each firing squad 157W-Z, an optical merge unit 235 for merging the outputs of the merge units 233X-W, and an optical merge unit 236 for merging light fields output by the target Q-blocks 154A-C and the output of the optical merge unit 235; the output of the optical merge unit 236 is coupled to the intermediate Q-block 231. Optical switches 234W-Z interposed between the firing-squad merge units 233W-Z and the merge unit 235 enable the firing squad outputs to be selectively switched between being sent along the local link fibres of the LLE creation subsystems of which the firing squads form a part, and being sent to the intermediate Q-block 231; the optical switches 234W-Z are set to the latter routing when the EBP switch 230 is active.

The left and right LLE control units 162, 163 and the optical switches 234 are conceptually not elements of the intermediate-qubit-based switch 230.

The EBP switch control unit 237 interfaces with all the target and firing squad Q-blocks and by selective operation can implement the operations appropriate for implementing a suitable switch process (such as process 100 or 101 in FIG. 10). The control unit 237 also accumulates the parity information measured as part of the implemented switch process and passes this information back to the relevant merge control unit 167.

The EBP switch 230 can be seen to be a more complex version of the EBP switch 200 described above with respect to FIG. 20 and thus an implementation of the FIG. 11 variant of the first intermediate-qubit-based EBP switch embodiment; in particular, the qubits of the target Q-blocks 154 form the first interface qubit set 82A and the qubits of the firing squad Q-blocks 157 form the second interface qubit set 82B.

In fact, it is possible to arrange for the quantum network switch 225 and the QR chain segments 222 to be set up to enable the switch 225h operatively couple any one of the QR chain segments 222A-C, W-Z with any other one of the QR chain segments 222A-C, W-Z and establish an EBP length therebetween. In other words, as well as it being possible to pair left and right QR chain segments, it is also possible to arrange for the pairing of any two left QR chain segments or any two right QR chain segments. Such operation is referred to below as "unrestricted chain-segment coupling" and with it the EBP switch 230 effectively becomes an implementation of the FIG. 8 EBP switch 80.

Implementation of unrestricted chain-segment coupling requires substantially no changes to the EBP switch 230 as any target Q-block and any fusilier Q-block can be entangled with the intermediate Q-block 231 so that an EBP length can be established between any pairing of the QR chain segments 222A-C, W-Z. Furthermore, as LLE creation in the QR chain segments is largely a self-contained activity within the relevant LLE creation subsystems, the direction of travel of the mediating light fields is inconsequential in this respect; as a result, coupling two left QR chain segments or two right QR chain segments causes no significant issues concerning LLE creation. The main issue to be dealt with when seeking to operatively couple two left or two right QR chain segments is to ensure that the merge control units of the quantum repeaters and quantum network switch receive the appropriate signals for determining when a merge operation should be effected (these signals comprising the trigger signals and signals indicative of when left and right entanglements are known, or can be reasonably be expected, to exist). This will generally involve ensuring that:

when operating on the 'Extend-from-End' or 'Quasi-Asynchronous' basis, only one end node of the two QR chain segments acts as a source of trigger signals;

one of the QR chain segments is effectively reversed by reconfiguring each repeater and the associated end node of that chain segment (herein, the 'reversed chain segment') such that the direction of passing of MC messages is reversed along the chain segment and the merge control unit of each repeater looks for the appropriate signals indicating when left and right entanglements are known, or can be reasonably be expected, to exist). The reversing of the MC message flows is done such that, in particular, (i) the trigger signals (when operating on the 'Extend-from-End' or 'Quasi-Asynchronous' basis) are passed, node-to-node, from the sourcing end node to the other end node along the QR chain segments being coupled, and (ii) parity information is accumulated along both chain segments (and through the switch 225) and passed to the appropriate end node. The reversing of one of the chain segments effectively restores the position of the operative coupling effected by the quantum network switch 225 being between left and right QR chain segments, though the assigned merge control unit of the switch 225 will need to be set to take into account that the appropriate entanglement-indicating signals for the reversed QR chain segment will differ from those associated with the QR chain segment type (left or right) the reversed QR chain is now simulating.

Assuming that either the left or right QR chain segments and their associated end nodes are configurable to implement the above, the network manager 1235 can be made responsible for determining Whether a pair of QR network segments to be joined are of the same type (left or right) and, if so, for instructing one of the chain segments, the end node(s), and the quantum network switch to effect the required reconfigurations.

It may be noted that the herald pulses sent over the local link fibres at the start of the light trains emitted by the firing squads 157, are not suitable for use in carrying MC message information such as cumulative parity where unrestricted chain-segment coupling is implemented by reversing one of the QR chain segments whilst leaving the direction of travel of light trains in that chain segment unchanged.

3) Quantum Repeater Chain—Bandwidth Matching

As previously mentioned, quantum repeater chains are generally designed to operate on a cyclic basis, generating a succession of E2E entanglements between the chain end nodes. The rate of generation of the QR trigger signal (whether generated by one end node and propagated along the chain as when operating on the Extend-from-End or Quasi Asynchronous basis, or synchronously generated in all nodes as when operating on the Synchronous basis) determines the 'E2E operational bandwidth' (a.k.a. 'E2E throughput') of the chain, that is, the number of E2E entanglements created per second.

The maximum QR trigger signal rate possible for a given chain is itself dependent on by the light round-trip time between adjacent nodes of the chain since the latter determines how long it takes for an LLE creation attempt to be effected and knowledge of the result—and of the successful fusilier in a firing-squad LLE creation subsystem implementation—to be returned to the node initiating the LLE creation attempt. For a single LLE creation subsystem between each chain node, the dependency of maximum QR trigger signal rate on inter-node light round trip time is determined by the basis on which the chain is being operated, as follows:

Operation on 'Synchronous' or 'Quasi Asynchronous' basis—the QR trigger signal rate is limited by the longest inter-node light round-trip time (in other words by the largest inter-node separation); reducing the longest round-trip time has a significant impact on the maximum QR trigger signal rate until the point that that round-trip time ceases to be the longest whereupon the new longest round-trip time becomes the constraining factor.

Operation on 'Extend-from-End' basis—the QR trigger signal rate is limited by the aggregate of the inter-node light round-trip times (in other words by the separation of the end nodes); reducing individual inter-node round trip times has no effect on the maximum QR trigger signal rate if the end node separation remains the same.

Using multiple LLE creation subsystems in parallel between nodes can be employed to increase the E2E operational bandwidth of a quantum repeater chain. Exactly how paralleled LLE creation subsystems are integrated into the operation of a quantum repeater will depend on the basis on which the QR chain as a whole is operating. Furthermore, if the chain is operating on the 'Extend-from-End' basis, paralleling up LLE creation subsystems is only useful when done all along the chain (except when trying to increase the probability of successful LLE creation, which is not required where firing-squad LLE creation subsystems are being used); in this case, the result is akin to having multiple parallel chains. Of more interest is the selective use of paralleled LLE creation subsystems to improve E2E operational bandwidth for quantum repeater chains operating on a 'Synchronous' or 'Quasi Asynchronous' basis and the following discussion is limited to such operation.

To facilitate the following discussion, it is useful to define the following terms;

"LLE-CSS Native Bandwidth"
this is the maximum possible LLE creation rate for an inter-node LLE creation subsystem (assuming each LLE creation involves a mediating light field node-to-node trip plus a return message trip) and is limited by the inter-node separation;

"LLE-CSS Operational Bandwidth"
this is the actual LLE creation rate achievable by a LLE creation subsystem having regard to the QR trigger signal rate in the chain on the assumption that each trigger signal directly or indirectly triggers creation of one LLE (where this is not the case, the LLE-CSS bandwidth is taken as the rate of LLE consumption); the LLE-CSS bandwidth will thus correspond to the QR signal rate, the latter being the set by the longest inter-node link;

"LLE-CSS Bandwidth Utilisation" (Represented by Symbol 'U' Below)
this is the inverse of the ratio, rounded down to the nearest integer, of LLE-CSS native bandwidth to LLE-CSS operational bandwidth;

"Inter-Node Operational Bandwidth"
this is the inter-node LLE creation rate where there are N parallel LLE creation subsystems between two nodes—for N=1 the inter-node operational bandwidth is the same as the LLE-CSS operational bandwidth.

For quantum repeater chains operating on a 'Synchronous' or 'Quasi Asynchronous' basis with only a single LLE creation subsystem between each pair of adjacent nodes, the LLE-CSS native bandwidth between the furthest-separated pair of adjacent nodes basically sets both the LLE-CSS operational bandwidth between all pairs of adjacent nodes and the E2E operational bandwidth. For all but one of the pairs of adjacent nodes, the LLE-CSS operational bandwidth will be less than the LLE-CSS native bandwidth and in many cases the LLE-CSS bandwidth utilisation will be a half or less (U≤½) which is clearly not efficient. When seeking to improve E2E operational bandwidth, it is desirable to maximise the use of idle bandwidth in preference to relying on the paralleling up of LLE creation subsystems between pairs of adjacent nodes. In particular, where (U≤½), one or more additional LLE creation cycles can be fitted in between QR trigger signals (though as will be described below, this may require the use of buffer qubits to free up the operational qubits, such as the target qubit, for each cycle of the LLE creation subsystem).

Assuming it is desired to increase the E2E operational bandwidth by a particular factor, hereinafter referred to as the "bandwidth upgrade factor" (abbreviated to "BUF"), then the inter-node operational bandwidth for each pair of adjacent nodes needs to be increased by the BUF, this being achieved by utilizing unused native bandwidth and, if required, adding parallel LLE creation subsystems. The BUF, the amount of parallelism N, and the LLE-CSS bandwidth utilisation U are inter-related as follows:

$$BUF=N/U$$

By way of example, for a RUE value of 6:
for a pair of adjacent nodes separated by a relatively very short distance where the value of U may be ⅙ or even less, one LLE creation subsystem will be adequate (that is, N=1) as the BUF value can be achieved by additional LLE creation cycles;
for the furthest-separated pair of adjacent nodes where the value of U will be one, the value of N will need to be 6, that is, six parallel LLE creation subsystems; and
for an averagely-separated pair of adjacent nodes where the value of U may be ½ or ⅓, respectively two or three LLE creation cycles can be accommodated between QR trigger signals and so the value of N need only be 3 or 2 respectively.

Figure 24:
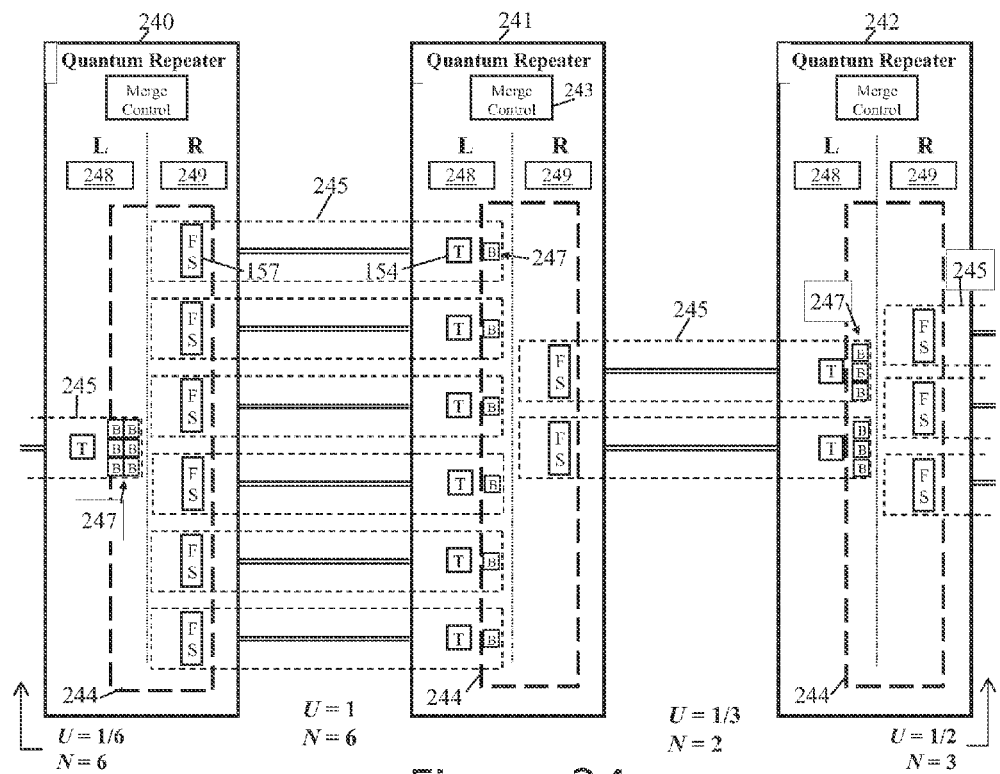
FIG. 24 is a diagram depicting an example arrangement of three successive quantum repeater nodes 240, 241 and 242 in a quantum repeater chain, each depicted quantum repeater node having differing numbers of LLE creation subsystems on its left and right sides.

The overall result is that the number N of parallel LLE creation subsystems on one side of a quantum repeater may well differ from the number on the other side of the repeater as is depicted in FIG. 24 example arrangement of three successive quantum repeater nodes 240, 241 and 242 in a QR chain. Although these quantum repeaters are, for convenience, shown equally spaced in the Figure, the spacing of the repeaters is actually such as to give the U values indicated, the resulting N values also being indicated for a BUF value of 6. As can be seen, quantum repeater 240 has on its L-side one LLE creation subsystem 245, and on its R-side six paralleled LLE creation subsystems 245; quantum repeater 241 has on its L-side six paralleled LLE creation subsystems 245, and on its R-side two paralleled LLE creation subsystems 245; and quantum repeater 242 has on its L-side two paralleled LLE creation subsystems 245, and on its R-side three paralleled LLE creation subsystems 245. Each repeater has a respective L-side and R-side coordinator 248, 249 to coordinate its multiple L-side and R-side LLE creation subsystems respectively (the L-side coordinator 248 for repeater 241 is provided for uniformity though its role is minimal as there is only one L-side IEEE creation subsystem).

Each LLE creation subsystem 245 includes, as well as a firing squad 157 of fusilier Q-blocks and a target Q-block 154, one or more buffer Q-blocks 247 associated with the target Q-block and into a selected one of which the target-Q-block end of a newly created LLE can be shifted to free up the target Q-block 154 to participate in a new LLE creation cycle. The number of buffer Q-blocks matches the number of LLE creation cycles to be carried out between successive QR trigger signals. The arrangement for shifting the entanglement into a selected buffer Q-block is not depicted in FIG. 24 but corresponds substantially to that shown in FIG. 19 for Shifting an entanglement from the target Q-block 154 of the right end node 190 into a buffer Q-block 186; the shifting is effected under the control of the L-LLE control unit of the LLE creation subsystem immediately an LLE is created.

Figure 25:
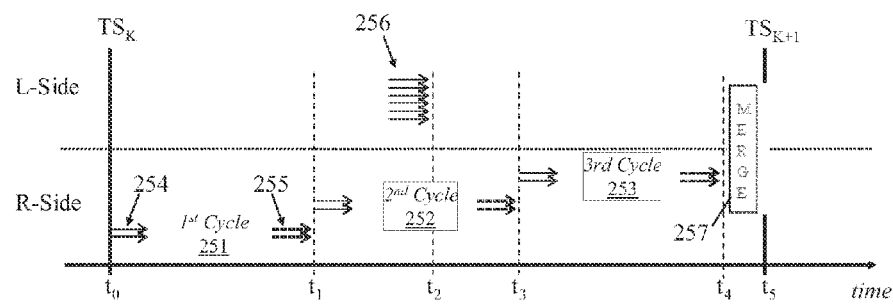
FIG. 25 is an operational timing diagram for one example implementation of one of the FIG. 24 quantum repeater nodes in the case of the quantum repeater chain operating on a Synchronous basis.

FIG. 25 is an operational timing diagram for one example implementation of the quantum repeater 241 in a chain operating on the Synchronous basis; FIG. 25 shows one top-level operational cycle between two successive trigger signals $TS_K$ and $TS_{K+1}$, generated by the repeater's synchronous clock (not shown), and occurring at times $t_0$ and $t_5$ respectively. Repeater operation proceeds as follows:

At time $t_0$, first LLE-creation cycles 251 are initiated on the two R-side LLE creation subsystems by the sending off of respective light-field trains 254 (also at this time but not shown, the left neighbour repeater 240 initiates LLE creation on its six R-side LLE creation subsystems).

At time $t_1$, the two R-side LLE creation subsystems of repeater 241 complete their first LLE-creation cycles 251 on receiving receive back messages 255 from the right neighbour repeater 242 indicating which fusiliers of the two R-side LLE creation subsystems of repeater 241 have been entangled as part of respective R-side LLEs; second LLE-creation cycles 252 are then initiated on the two R-side LLE creation subsystems of repeater 241 but omitting from the firing squads the fusiliers entangled in the first cycles.

At time $t_2$ the light-field trains 256 sent off from repeater 240 at time $t_0$ are received at repeater 241 on its six L-side LLE creation subsystems, creating six L-side LLEs which are immediately shifted into the buffer Q-blocks 247.

At time $t_3$ the two R-side LLE creation subsystems of repeater 241 complete their second LLE-creation cycles 252 on receiving back messages from the right neighbour repeater 242 indicating which fusiliers of the two R-side LLE creation subsystems of repeater 241 have been entangled as part of respective R-side LLEs; third LIE-creation cycles 253 are then initiated on the two R-side LLE creation subsystems of repeater 241 but omitting from the firing squads the fusiliers entangled in the first and second cycles.

At time $t_4$ the two R-side LLE creation subsystems of repeater 241 complete their third LLE-creation cycles 253 on receiving back messages from the right neighbour repeater 242 indicating which fusiliers of the two R-side LLE creation subsystems of repeater 241 have been entangled as part of respective R-side LLEs. There now exist six L-side entanglements each with one end rooted in a respective buffer Q-block 247, and six R-side entanglements three of which have one end rooted in a respective fusilier Q-block of the firing squad 157 of a first one of the R-side LLE creation subsystems 245, and the other three of which have one end rooted in a respective fusilier Q-block of the firing squad 157 of the second one of the R-side LLE creation subsystems 245.

At time $t_4$-$t_5$ the six L-side entanglements are merged (see block 257) with respective ones of the six R-side entanglements; this is effected by EBP switch 244 at the command of the repeater's merge control unit 243.

Figure 26:
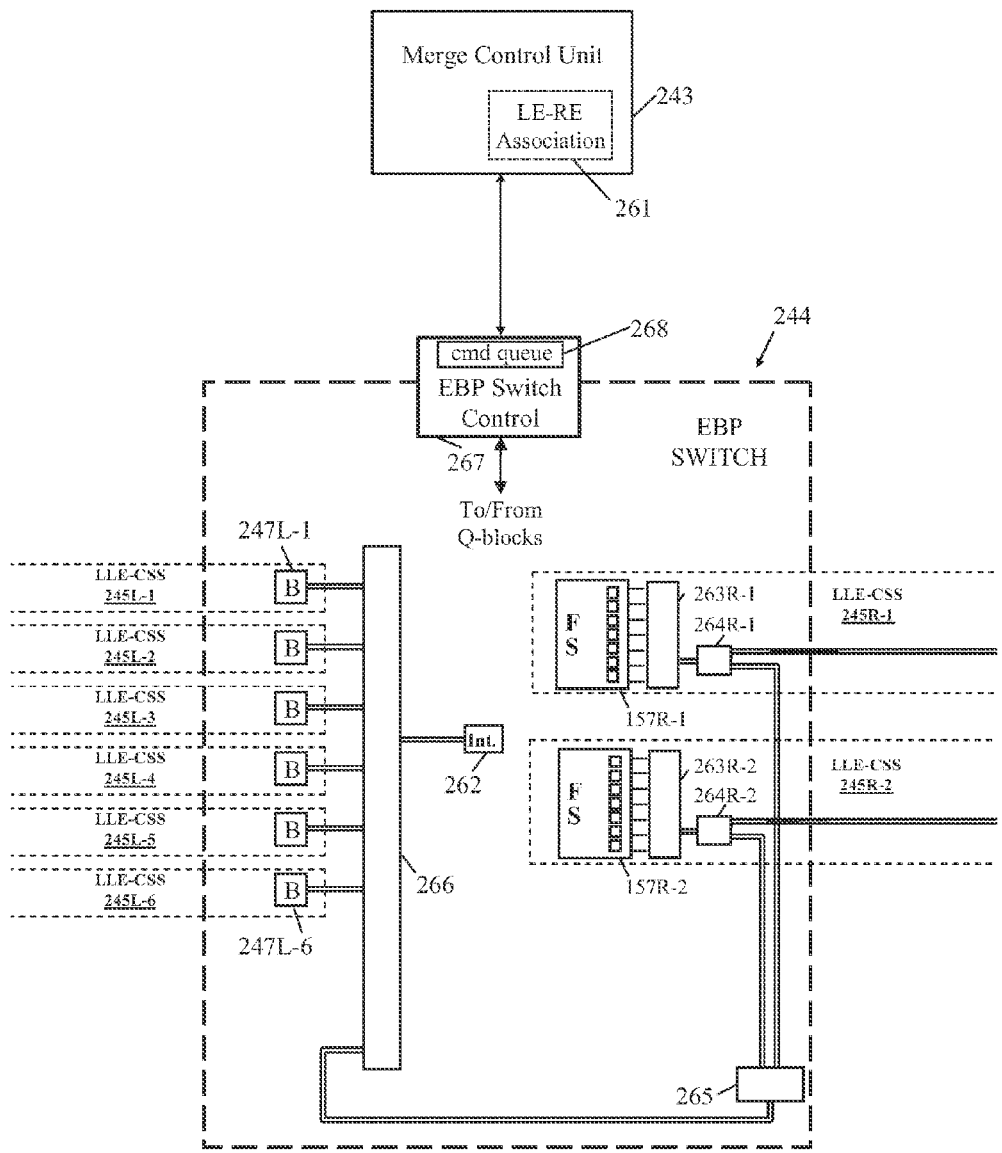
FIG. 26 is a diagram of an intermediate-qubit-based EBP switch used in the FIG. 24 quantum repeater nodes.

The EBP switch 244 is an intermediate-qubit-based EBP switch (shown in dashed outline in FIG. 24) and is similar in form to the EBP switch 230 described above with reference to FIG. 23. EBP switch 244 is illustrated in FIG. 26 in which the convention is used that elements associated with the six left-side LLE creation subsystems are distinguished from each other by respective designations L-1 to L-6 and the elements associated with the two right-side LLE creation subsystems are distinguished from each other by respective designations R-1 and R2; thus, the LLE creation subsystems themselves are referenced 245L-1 to 245L-6 and 245R1, 245R-2 while the six buffer Q-blocks associated with respective ones of the six left-side LLE creation subsystems are referenced 247L-1 to 247L-6, and the two firing squads associated with respective ones of the two right-side LLE creation subsystems are referenced 157R-1 and 157R-2.

Before describing the switch 244, consideration will be given to which left-side entanglements should be merged with which right-side entanglements. A consistent approach is required in order for parity values to be correctly accumulated and applied. In the present example, the left-side and right-side entanglements created during each top-level operating cycle of the repeater (that is, between successive QR trigger signals) are numbered by LLE creation cycle and, within each cycle, by the LLE creation subsystem concerned; thus:

For the Left-Side Entanglements:

| Entanglement number | Creation Cycle | LLE Creation Subsystem |
| --- | --- | --- |
| 1 | 1 | 245L-1 |
| 2 | 1 | 245L-2 |
| 3 | 1 | 245L-3 |
| 4 | 1 | 245L-4 |
| 5 | 1 | 245L-5 |
| 6 | 1 | 245L-6 |

For the Left-Side Entanglements:

| Entanglement number | Creation Cycle | LLE Creation Subsystem |
| --- | --- | --- |
| 1 | 1 | 245R-1 |
| 2 | 1 | 245R-2 |
| 3 | 2 | 245R-1 |
| 4 | 2 | 245R-2 |
| 5 | 3 | 245R-1 |
| 6 | 3 | 245R-2 |

Left and right entanglements numbered the same are merged. The above approach to entanglement numbering may be inherently built into the repeater control functionality or can be explicitly programmed into an association table such as LE-RE association table 261 that is shown in FIG. 26 as part of the merge control unit 243. The merge control unit 243 is also arranged to keep track of which Q-block is involved with each of the left and right entanglements, that is:

for the left-side entanglements, which of the buffer Q-block 247L-1 to 247L-6 is involved with each left-side entanglement—in the present case, there is a one-to-one correspondence as each left-side LLE creation subsystem only creates one entanglement per top-level operating cycle so there is only one buffer Q-block per LLE creation subsystem, however, generally there will be multiple buffer Q-blocks per left LLE creation subsystem;

for right-side LLE creation subsystems, which fusilier Q-block of which firing squad 157R-1, 157R-2 is involved with each right-side entanglement.

The merge control unit 243 is then responsible at time $t_5$ to send a succession of commands to a switch control unit 267 of the EPB switch 244; in all six commands are sent, one for each pair of matched left and right entanglements. Each command indicates a pair of Q-blocks (one buffer Q-block and one fusilier Q-block) between which an EBP length is to be established thereby merging the entanglements concerned. These commands are queued by the EPB switch control unit 268 in a command queue 268 and are executed in turn by effecting an appropriate switch process.

As regards the details of the EBP switch 244, as well as the switch control 267, the buffer Q-blocks 247L-1 to 247L-6, and the fusilier Q-blocks of the firing squads 157R-1, 157R-2, the switch comprises an optical merge architecture enabling a light field selectively emitted by any one of the buffer or fusilier Q-blocks (after interacting with the qubit of that Q-block), to be routed to an intermediate Q-block 262 to interact with the qubit of that Q-block. The optical merge architecture comprises a respective optical merge unit 263R-1, 263R-2 for merging light fields output by the fusilier Q-blocks of each firing squad 157R-1. 157R-2, an optical merge unit 265 for merging the outputs of the merge units 263R-1, 263R-2, and an optical merge unit 266 for merging light fields output by the buffer Q-blocks 247L-1 to 247L-6 and the output of the optical merge unit 265; the output of the optical merge unit 266 is coupled to the intermediate Q-block 262. Optical switches 264R-1, 264R-2 interposed between the firing-squad merge units 263R-1, 263R-2 and the merge unit 265 enable the firing squad outputs to be selectively switched between being sent along the local link fibres of the LLE creation subsystems of which the firing squads form a part, and being sent to the intermediate Q-block 262; the optical switches 264R-1, 264R-2 are set to the latter routing when the EBP switch 244 is active. The optical switches 234 are conceptually not elements of the switch 244.

The EBP switch control unit 267 interfaces with all the buffer and firing squad Q-blocks and by selective operation can implement the operations appropriate for implementing a suitable switch process (such as process 100 or 101 in FIG. 10). The control unit 267 also accumulates the parity information measured as part of the implemented switch process and passes this information back to the relevant merge control unit 243.

Figure 27:
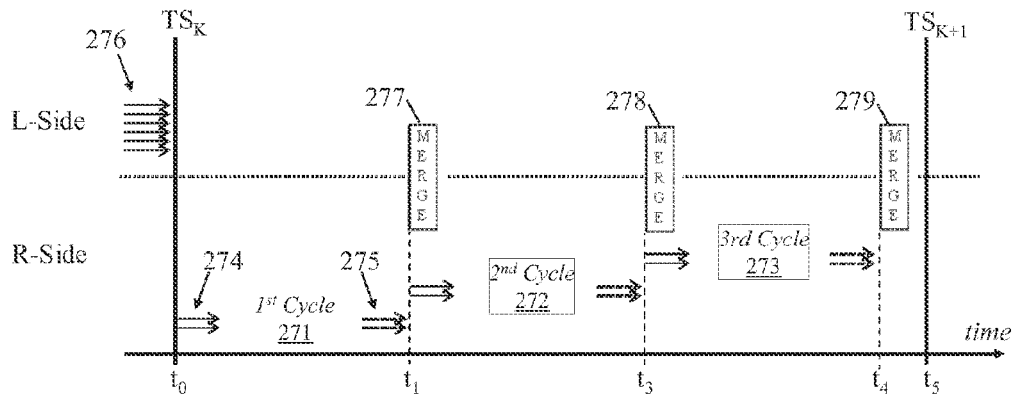
FIG. 27 is an operational timing diagram for one example implementation of one of the FIG. 24 quantum repeater nodes in the case of the quantum repeater chain operating on a Quasi Asynchronous basis.

FIG. 27 is an operational timing diagram for one example implementation of the quantum repeater 241 in a chain operating on the Quasi Asynchronous basis and with the repeater 241 including an EBP switch 244 substantially as shown in FIG. 26. For a chain operating on the Quasi Asynchronous basis and having a single firing-squad-based LLE creation subsystem between each node, the herald pulse associated with each light-field train QR can conveniently be used as the QR trigger signal; using the herald pulses as QR trigger signals is more complicated where there are multiple LLE creation subsystems but, for present purposes and to aid comparison with the above Synchronous-basis example, it will be assumed that a herald pulse received by the first of the right-side LLE creation subsystems 245R-1 during a first creation cycle forms the QR trigger signal for the repeater, subsequent first-cycle heralds of the same subsystem 245L-1 constituting subsequent QR trigger signals. FIG. 27 shows one top-level operational cycle of repeater 241 between two successive QR trigger signals $TS_K$ and $TS_{K+1}$ occurring at times $t_0$ and $t_5$ respectively. Repeater operation proceeds as follows:

At time $t_0$, light-field trains 276 earlier sent off from repeater 240 are received at repeater 241 on its six L-side LLE creation subsystems, creating six L-side LLEs (left entanglements one to six as defined above) which are immediately shifted into the buffer Q-blocks 47; first LLE-creation cycles 271 are initiated on the two R-side LLE creation subsystems by the sending off of respective light-field trains 274 (the herald sent on LLE creation subsystem 245L-1 in this first cycle constitutes the propagation of the QR trigger signal).

At time $t_1$, the two R-side LLE creation subsystems of repeater 241 complete their first LLE-creation cycles 251 on receiving back messages 275 from the right neighbour repeater 242 indicating which fusiliers of the two R-side LLE creation subsystems of repeater 241 have been entangled as part of respective R-side LLEs (right entanglements one and two as defined above, —note that these are not necessarily LLEs by the time the messages 275 are received as they may already have been extended further downstream). The merge control unit 243 instructs the EBP switch 244 to merge the first left and first right entanglements and the second left and second right entanglements by sending respective commands indicating the buffer and fusilier Q-blocks involved. Second LLE-creation cycles 272 are then initiated on the two R-side LLE creation subsystems of repeater 241 but omitting from the firing squads the fusiliers entangled in the first cycles.

At time $t_3$ the two R-side LLE creation subsystems of repeater 241 complete their second LLE-creation cycles 272 on receiving back messages from the right neighbour repeater 242 indicating which fusiliers of the two R-side LLE creation subsystems of repeater 241 have been entangled as part of respective R-side LLEs (right entanglements three and four). The merge control unit 243 instructs the EBP switch 244 to merge the third left and third right entanglements and the fourth left and fourth right entanglements by sending respective commands indicating the buffer and fusilier Q-blocks involved. Third LLE-creation cycles 273 are then initiated on the two R-side LLE creation subsystems of repeater 241 but omitting from the firing squads the fusiliers entangled in the first and second cycles.

At time $t_4$ the two R-side LLE creation subsystems of repeater 241 complete their third LLE-creation cycles 273 on receiving back messages from the right neighbour repeater 242 indicating which fusiliers of the two R-side LLE creation subsystems of repeater 241 have been entangled as part of respective R-side LLEs (right entanglements five and six). The merge control unit 243 instructs the EBP switch 244 to merge the fifth left and fifth right entanglements and the sixth left and sixth right entanglements by sending respective commands indicating the buffer and fusilier Q-blocks involved.

It is alternatively possible to operate the FIG. 24 chain on a Quasi Asynchronous basis by treating each herald pulse received by a left-side LLE creation subsystem 245E-1 to 245E-6 as a trigger signal for a respective instance of a control unit only concerned with initiating creation of a corresponding right entanglement and for subsequently commanding the EBP switch 244 to merge the corresponding left and right entanglements.

It may be noted that in a preferred implementation of a QR chain operating on the Quasi Asynchronous basis and having a single, firing-squad-based LLE creation subsystem between each node, parity information is transmitted along the chain encoded in the herald pulses—in particular, each herald pulse carries parity information relevant to the immediately preceding E2E entanglement being created along the chain. Where there are multiple parallel LLE creation subsystems between nodes, it is no longer possible for all the herald pulses to carry parity information concerning the immediately preceding E2E entanglement being created because that information may not be available to a repeater at the time the herald pulse is transmitted. However, what it is possible to do is to send each herald with parity information concerning the preceding E2E entanglement being created a number of creation cycles earlier corresponding to the maximum degree of parallelism N of the LLE creation subsystems along the chain; this, of course, requires the quantum repeaters to store parity information for an appropriate period until required.

4) Quantum Computer

Quantum computers comprise a plurality of quantum circuit nodes each operating on at least one qubit, the nodes being optically coupled to permit the state of one or more qubits of one node to be output by quantum teleportation to one or more qubits of another node to serve as input to that node. The simplest quantum circuits comprise quantum gates including the Hadamard gate, the Toffoli gate, the Pauli-X, Pauli-Y and Pauli-Z gates, the phase shift gate, controlled gates such as the CNOT gate, etc. A particular quantum computer might contain hundreds of each of a hundred different types of quantum circuit node.

Typically, a quantum computer is set up by first defining the appropriate Hamiltonian which is then approximated using an arrangement of quantum circuit nodes formed from an appropriate combination of quantum gates. The assumption has been that a specialized quantum computer would be constructed with the quantum teleportation paths between the quantum gates "pre-wired" (that is, the optical coupling and related hardware for setting up Bell pairs and effecting quantum teleportation between selected qubits of the gates is fixed in advance). An alternative approach is to provide a quantum computer that "simulates" a quantum Turing machine and execute quantum code it that manner.

By using an intermediate-qubit-based EBP switch it becomes possible to construct a quantum computer in which the teleportation paths between nodes can be programmed and dynamically changed, allowing the quantum computer to evolve during computation. The intermediate-qubit-based EBP switch also provides for a scalable architecture.

Figure 28:
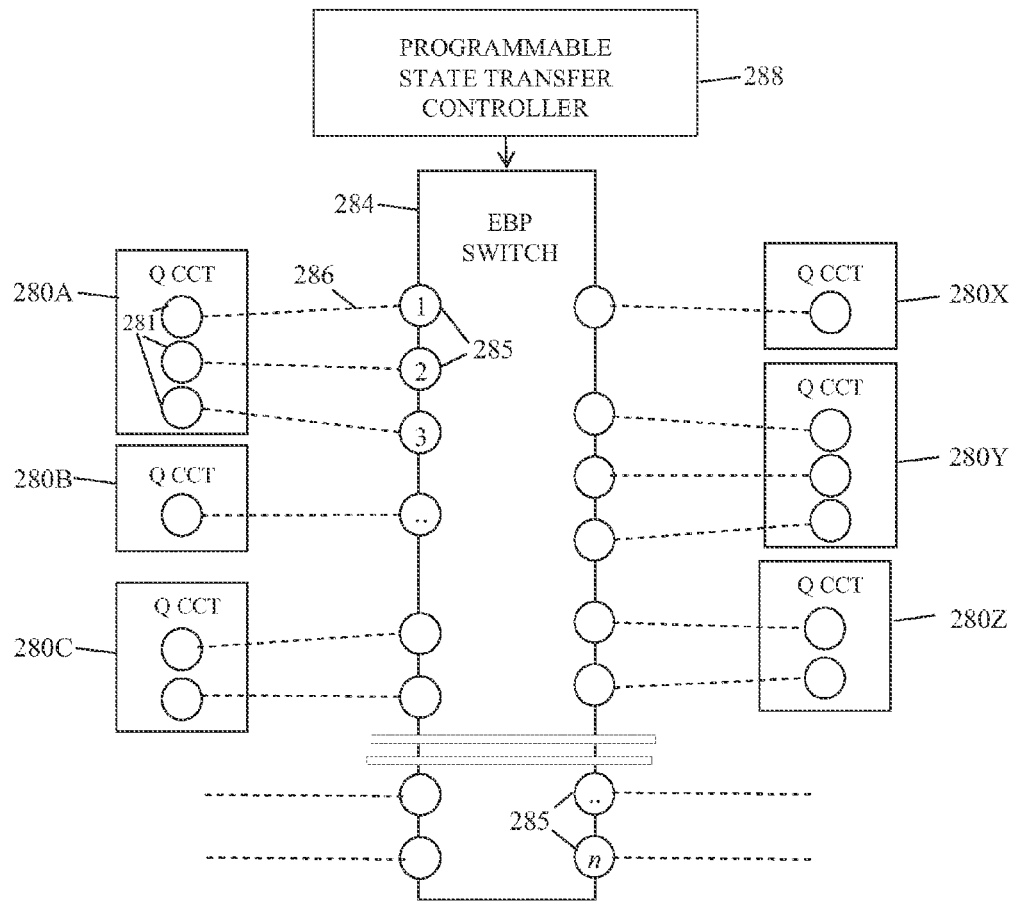
FIG. 28 depicts a quantum computer comprising a plurality of quantum circuit nodes and an intermediate-qubit-based EPB switch for determining the quantum teleportation paths between qubits of the nodes.

FIG. 28 depicts a quantum computer comprising quantum circuit nodes 280A-Z and an intermediate-qubit-based EPB switch 284 for determining the quantum teleportation paths between qubits of the nodes by establishing appropriate EBP lengths through the switch. In FIG. 28, cubits of the quantum circuit nodes 280A-Z are shown as circles 281—not all the qubits of a node are necessarily shown, but only those qubits involved in receiving state from another node and those qubits whose state is to be output (of course, a qubit may both receive state as input and subsequently output its own state after processing by the node)—these qubits are generically referred to below as I/O qubits for convenience.

The EBP switch 284 is, for example, of the form shown in FIG. 8 with a group of n interface qubits 285. Each of the I/O qubits 281 of the quantum circuit nodes 280 is optically coupled (see dashed lines 286) to an associated interface qubit of the EBP switch 284 and appropriate hardware is provided to enable each I/O qubit 281 to be entangled with its associated switch interface qubit 285. With this arrangement any I/O qubit 281 whose state is to be output can be entangled with any other I/O qubit thereby enabling state transfer between the two I/O qubits.

Figure 29:
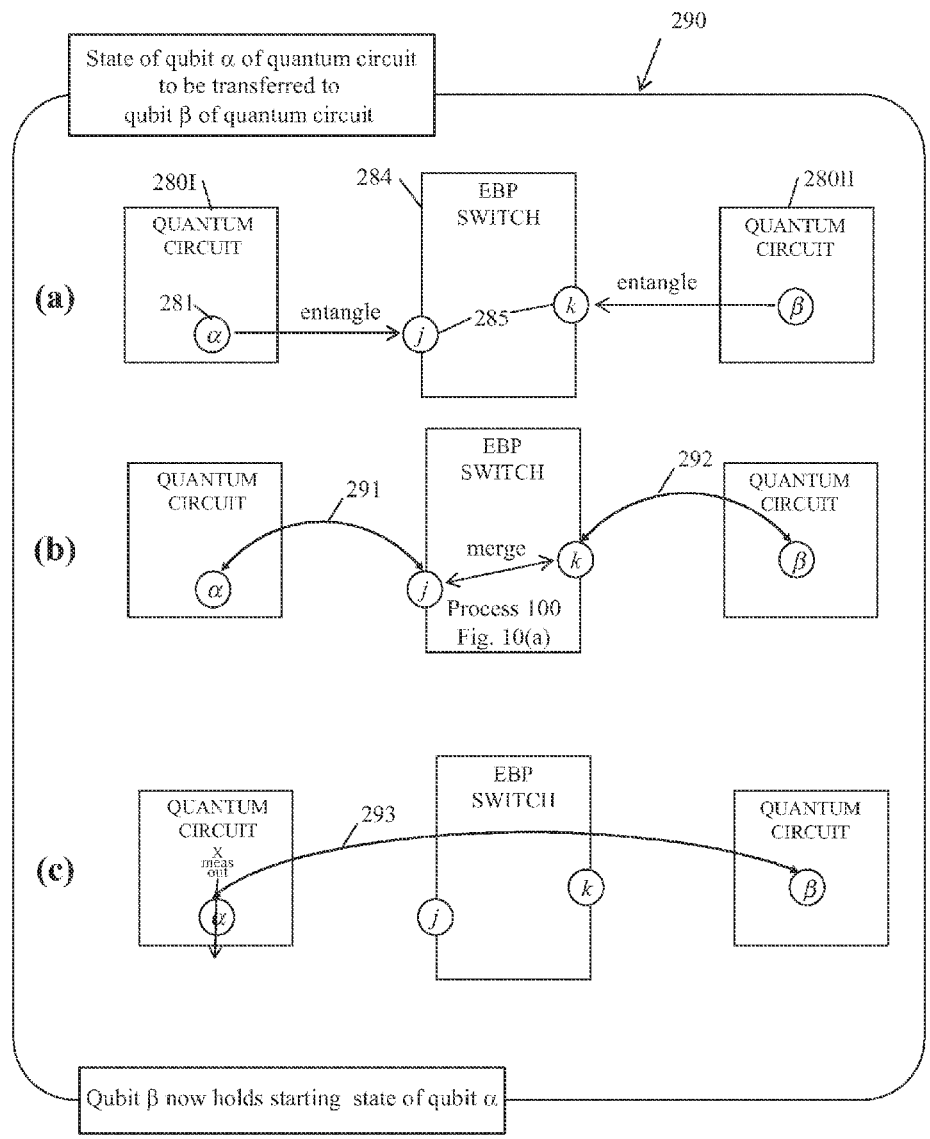
FIG. 29 is a diagram illustrating a state transfer process for effecting transfer of the state between qubits of different quantum circuit nodes of the FIG. 28 quantum computer.

FIG. 29 illustrates a state transfer process 290, involving the EBP switch 284, for effecting transfer of the state of an I/O qubit $\alpha$ of quantum circuit node 280I to an I/O qubit $\beta$ of quantum circuit node 280II. The I/O qubits $\alpha$ and $\beta$ are respectively associated with interface qubit j and k of the switch 284. (Although in FIG. 29, the I/O qubit $\alpha$ whose state is to be output is shown as associated with an interface qubit on one side of the switch whereas the I/O qubit $\beta$ that is to receive state is shown as associated with an interface qubit on the other side of the switch, this is purely arbitrary).

The state transfer process 290 comprises three steps as follows:
(a) I/O qubits $\alpha$ and $\beta$ are entangled with their respective associated interface qubits j and k of EPB switch 284— see arced entanglements 291, 292 shown in step (b);
(b) switch process 100 (see (a) of FIG. 10)—is carried out for the interface qubit pairing j and k thereby to entangle I/O qubits $\alpha$ and $\beta$—see arced entanglement 293 shown in step (c);
(c) An X measurement operation is carried out on I/O qubit $\alpha$ to remove it from entanglement with I/O qubit $\beta$ I/O qubit $\beta$ now has the state that I/O qubit $\alpha$ possessed at the start of the transfer process.

It is possible for two or more I/O qubits 281 to share a switch interface qubit 285 where a state transfer between these two I/O will not be required; in this case, entanglement of the I/O qubits with the switch interface qubit is, for example, effected by light fields generated by respective emitters associated with the I/O qubits, the light fields being channeled via an optical merge to the switch interface qubit concerned.

Figure 30:
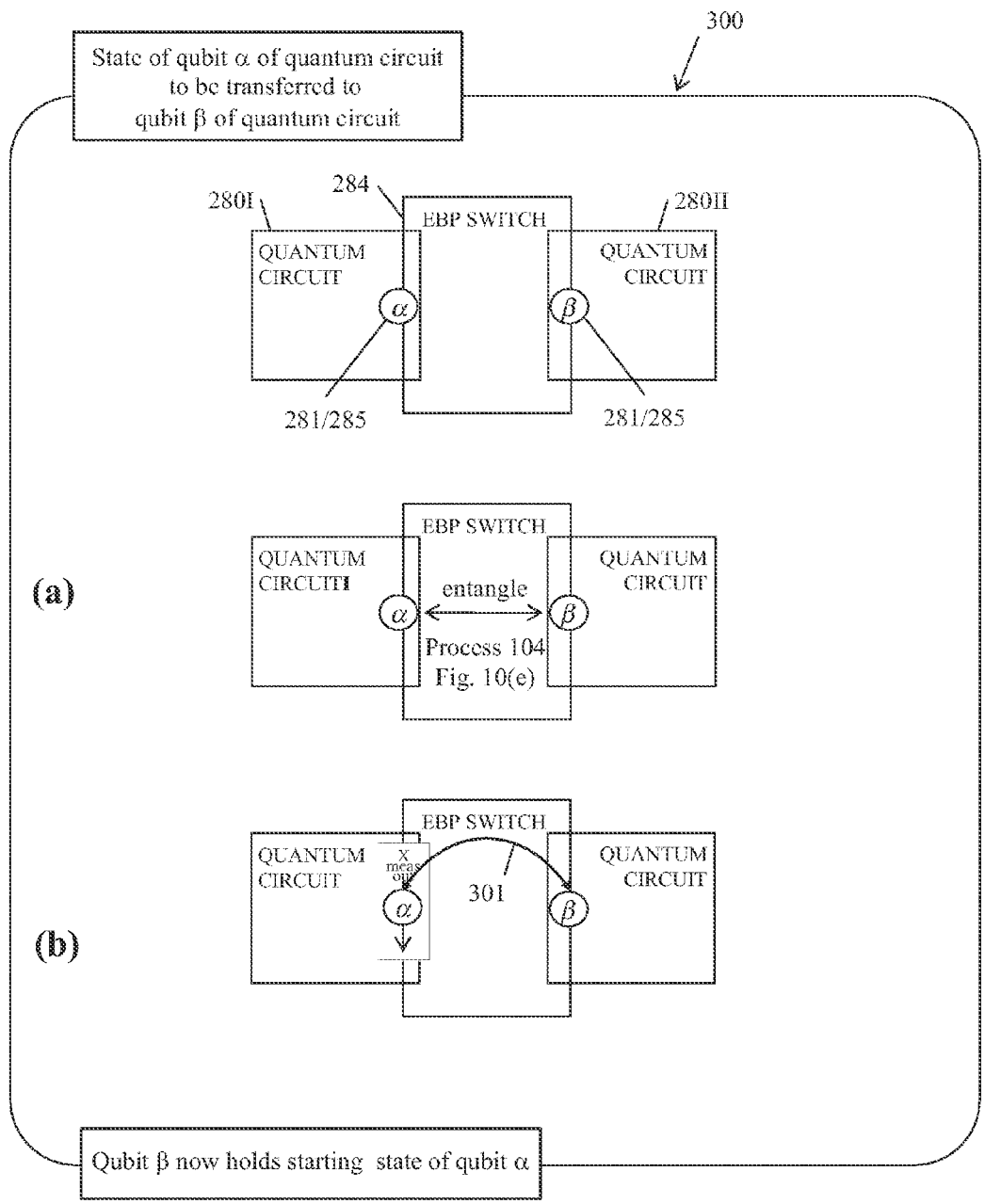
FIG. 30 is a diagram illustrating a state transfer process for effecting transfer of the state between qubits of different quantum circuit nodes for a variant of the FIG. 28 quantum computer.

In fact, it is also possible for the I/O qubits to serve directly as the switch interface qubits in much the same way as the LLE creation subsystem qubits form switch interface qubits in the FIG. 20 and FIG. 23 examples described above. FIG. 30 relates to such an arrangement where the qubits 281 of the quantum circuits 280I and 280II (qubits $\alpha$ and $\beta$) directly form interface qubits 285 of the switch 284 (the qubits j and k of FIG. 29). FIG. 30 illustrates a state transfer process 300 relevant to this arrangement, for effecting transfer of the state of the I/O qubit $\alpha$ to I/O qubit $\beta$.

The state transfer process 300 comprises two steps as follows:
(a) switch process 104 (see (e) of FIG. 10)—is carried out for the interface qubit pairing $\alpha$ and $\beta$ thereby entangling these qubits—see arced entanglement 301 shown in step (b);
(b) An X measurement operation is carried out on qubit $\alpha$ to remove it from entanglement with qubit $\beta$.

I/O qubit $\beta$ now has the state that I/O qubit $\alpha$ possessed at the start of the transfer process.

It will be appreciated that as the EBP switch only participates in one state transfer at a time, when used to effect state transfer for a plurality of quantum circuits in a quantum computer it is important to arrange matters such that state newly transferred to a qubit of a quantum circuit does not disturb the state of a qubit of that circuit that is awaiting transfer. This can be achieved by appropriate ordering of the transfers or by ensuring that for each quantum circuit inbound and outbound state transfers affect different qubits and that circuit operation is clocked (so that input state does not affect output state until the circuit is clocked).

The EBP switch 284 and its associated quantum circuits are most conveniently implemented on the same chip. One or more further EBP switches may also be provided to link together multiple such chips in much the same way as the quantum network repeater described above with respect to FIG. 22. Furthermore, remote quantum computers can also be linked in through the use of quantum repeater chains.

It will be appreciated that many variants are possible to the above described embodiments of the invention.

Figure 31:
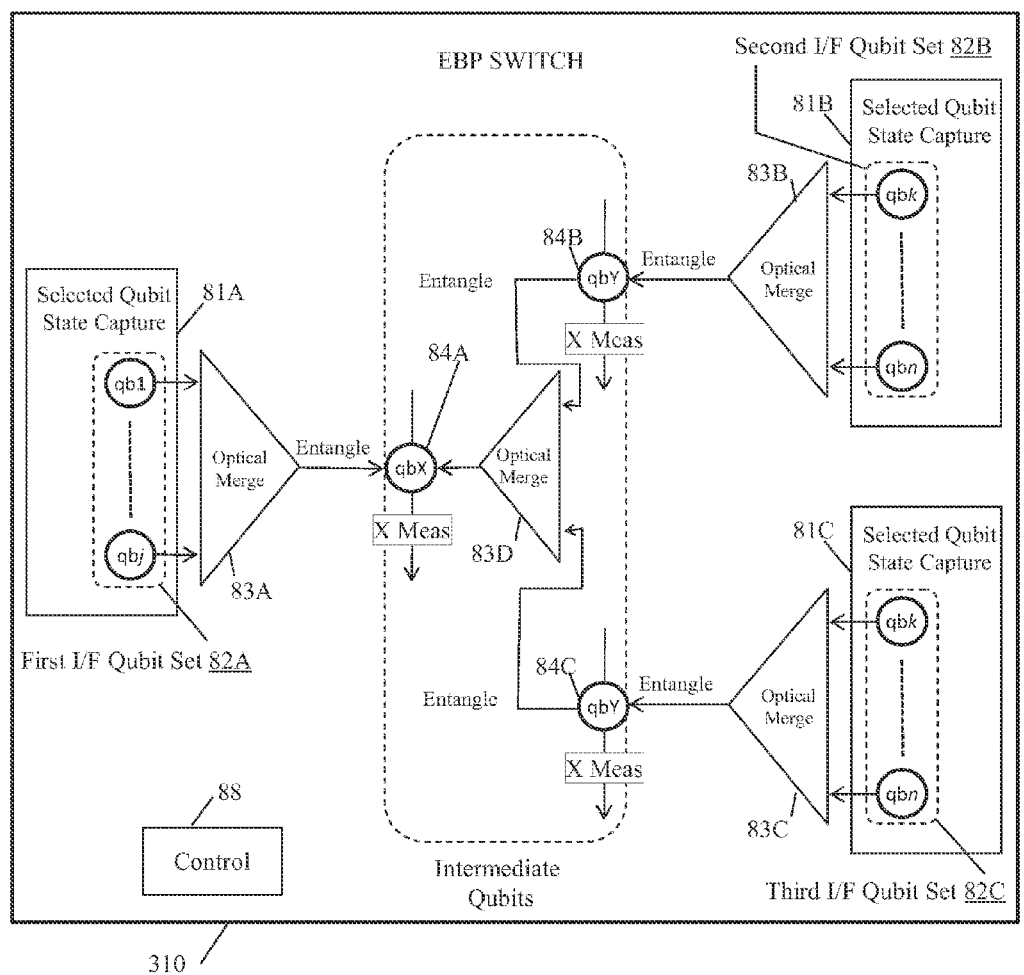
FIG. 31 is a diagram of a variant of the FIG. 13 intermediate qubit-based EPB switch.

For example, the number and arrangement of intermediate qubits in the EBP switch can be varied from those of the described embodiments. FIG. 31 depicts an EBP switch similar to that shown in FIG. 13 but with the second interface qubit set 82B now divided into two sets, respectively referenced 82B and 82C, each with its own selected qubit state capture arrangement 81B, 81C. Each interface qubit set 82B, 82C is also associated with a respective intermediate qubit 84B, 84C through a respective optical merge unit 83B, 83C. Thus there are now three intermediate qubits 84. Entanglement of intermediate qubit 84B or 84C with intermediate qubit 84A is effected by sending a light field first through intermediate qubit 84B/84C and then, via optical merge unit 83D, through intermediate qubit 84A after which the light field is measured.

In the above-described example applications of the intermediate-qubit-based EBP switch, it will be noted that in some examples, qubits of the quantum functionalities linked by the switch also serve as the interface qubits of the switch (as in the examples of FIGS. 12, 20, 23 and 30) Whereas in other examples, qubits of the quantum functionality linked by the switch are distinct from the switch interface qubits and have to be entangled with the latter in the course of operation (as in the examples of FIGS. 26 and 28—in the case of the FIG. 26 example, although the buffer qubits 247L are shown as being elements of both the LLE creation subsystems 245L and the EBP switch 244, for the particular case depicted these qubits are not actually required as part of the functioning of the LLE creation subsystems and principally serve as the interface qubits of the EBP switch). Generally it is possible to use either approach for any application, that is, to have the qubits of the quantum functionalities linked by the switch serve as the switch interface qubits or to keep the qubits of the quantum functionalities linked by the switch distinct from the switch interface qubits and entangle them as required.

Although in the foregoing neighbouring nodes have been described as optically coupled through local link optical fibres, it is to be understood that in appropriate circumstances these local links can be established over optical channels other than optical fibres. For example, the optical channel can simply be free space, particularly in satellite applications of the described LLE creation sub-systems.

With regard to the implementation of the various control units mentioned above, it will be appreciated that typically the described functionality will be provided by a program controlled processor or corresponding dedicated hardware.

Although in the foregoing description light fields have generally been described as being sent over optical fibres both between nodes and between components of the quantum physical hardware of a node, it will be appreciated that light fields can be sent over any suitable optical channel whether guided (as with an optical waveguide) or unguided (straight line) and whether through free space or a physical medium. Thus, for example, the optical fabric of the quantum physical hardware of a node may comprise silicon channels interfacing with a qubit provided by a nitrogen atom in a diamond lattice located within an optical cavity As already indicated, persons skilled in the art will understand how the Q-blocks can be physically implemented and relevant example implementation details can be found in the following papers, herein incorporated by reference:

"Fault-tolerant quantum repeaters with minimal physical resources, and implementations based on single photon emitters" L. Childress, J. M. Taylor, A. S. Sørensen, and M. D. Lukin; Physics Review A 72, 052330 (2005).

"Fault-Tolerant Quantum Communication Based on Solid-State Photon Emitters" L. Childress, J. M. Taylor, A, S. Sørensen, and M. D. Lukin Physical Review Letters 96, 070504 (2006), "Hybrid quantum repeater based on dispersive CQED interactions between matter qubits and bright coherent light" T D Ladd, P van Loock, K Nemoto, W J Munro, and Y Yamamoto; New Journal of Physics 8 (2006) 184, Published 8 Sep. 2006.

"Hybrid Quantum Repeater Using Bright Coherent Light" R van Loock, T. Ladd, K Sanaka, F. Yamaguchi, Kae Nemoto, W. J. Munro, and Y. Yamamoto; Physical Review Letters 96, 240501 (2006).

"Distributed Quantum Computation Based-on Small Quantum Registers" Liang Jiantz, Jacob M, Taylor, Anders S. Sørensen, Mikhail D. Lukin; Physics Review, A 76, 062323 (2007).

The invention claimed is:

1. An entanglement-build-path switch for selective routing of entanglement building, the switch comprising:
    physical hardware arranged to support a group of interface qubits and at least one intermediate qubit with an associated light-field emission and measurement arrangement;
    a selective state-capture arrangement for capturing the state of a selected one of the interface qubits by interaction with a light field;
    an optical merge arrangement for enabling a said light field that has interacted with any one of the interface qubits, to further interact with a said intermediate qubit and be measured whereby to entangle that intermediate qubit with the interface qubit; and
    a switch control for controlling the selective state-capture arrangement to separately entangle a first and a second interface qubit of said group with said at least one intermediate qubit and for causing the intermediate-qubit light-field emitter and measurement arrangement to entangle intermediate qubits with each other where there are multiple such qubits, and to remove any involved intermediate qubit from an entanglement.

2. An entanglement-build-path switch according to claim 1, wherein the switch is so arranged that any two interface qubits of said group can be used as said first and second interface qubits.

3. An entanglement-build-path switch according to claim 1, wherein the group of interface qubits is divided into two sets each with multiple qubits, the switch being so arranged that the said first and second interface qubits are from different sets.

4. An entanglement-build-path switch according to claim 3, wherein there are two intermediate qubits each associated with a respective said set, the optical merge arrangement comprising a respective optical merge unit for coupling each set of interface qubits with the associated intermediate qubit.

5. An entanglement-build-path switch according to claim 3, wherein there is a single intermediate qubit and the optical merge arrangement comprises a respective optical merge unit associated with each set of interface qubits, an output of one of the optical merge units being coupled as an input to the other optical merge unit and an output of the latter being optically coupled with the intermediate qubit.

6. An entanglement-build-path switch according to claim 1, wherein the switch control is arranged to control the selective state-capture arrangement and the intermediate-qubit light-field emitter and measurement arrangement to carry out a switch process which is appropriate to the case of the said first and second qubits being initially separately entangled with respective qubits external to the switch and at the completion of which the qubits external to the switch are entangled with each other.

7. An entanglement-build-path switch according to claim 1, wherein the switch control is arranged to control the selective state-capture arrangement and the intermediate-qubit light-field emitter and measurement arrangement to carry out a switch process which is appropriate to the case of one only of the said first and second qubits being entangled with a qubit external to the switch and at the completion of which the other of the said first and second qubits is entangled with said qubit external to the switch.

8. An entanglement-build-path switch according to claim 1, wherein the switch control is arranged to control the selective state-capture arrangement and the intermediate-qubit light-field emitter and measurement arrangement to carry out a switch process which is appropriate to the case of neither of the said first and second qubits being initially entangled with a qubit external to the switch and at the completion of which the first and second qubits are entangled with each other.

9. A quantum repeater including an entanglement-build-path switch, the quantum repeater further including quantum physical hardware for supporting left-side and right-side local-link-entanglement qubits that, in operation of the quantum repeater, form elements of local-link-entanglement creation subsystems between the quantum repeater and left and right neighbour nodes, said left-side and right-side local-link-entanglement qubits serving as, or being arranged for entanglement with, interface qubits of the switch whereby entanglement building can be routed between any pairing of a left-side local-link-entanglement qubit and a right-side local-link-entanglement qubit.

10. A quantum network switch comprising an entanglement-build-path switch and a plurality of quantum network interfaces arranged to support respective local-link-entanglement qubits that, in operation of the quantum network switch, form elements of local-link-entanglement creation subsystems between the quantum network switch and neighbour quantum network nodes, said local-link-entanglement qubits serving as, or being arranged for entanglement with, interface qubits of the entanglement-build-path switch whereby entanglement building can be routed between a selected pairing of said quantum network interfaces.

11. A quantum repeater including an entanglement-build-path switch and quantum physical hardware for supporting left-side and right-side local-link-entanglement qubits that, in operation of the quantum repeater, form elements of left-side and right-side local-link-entanglement creation subsystems respectively established between the quantum repeater and left and right neighbour nodes; said left-side and right-side local-link-entanglement qubits serving as, or being arranged for entanglement with, interface qubits of the switch whereby entanglement building can be routed between any pairing of a left-side and a right-side local-link-entanglement creation subsystem; the quantum repeater further including control functionality for commanding the switch such that when the quantum repeater is operating with differing numbers and bandwidths of left-side and right-side local-link-entanglement creation subsystems, entanglement building can be cyclically routed between appropriate pairings of left and right local-link-entanglement creation subsystems to compensate for the differing numbers and bandwidths of the left-side and right-side local-link-entanglement creation subsystems.

12. A quantum computer comprising a plurality of quantum circuits each supporting at least one state I/O qubit that is to receive or output quantum state, and an entanglement-build-path switch, said state I/O qubits serving as, or being arranged for entanglement with, interface qubits of the entanglement-build-path switch whereby to enable an entanglement to be built between a selected pairing of said state I/O qubits for teleporting the state of one of these qubits to the other.

13. A method of selectively routing entanglement building to between
a selected pairing of interface qubits, the method comprising:
  entangling the qubits of a selected pairing of interface qubits with at least one intermediate qubit by interacting respective light fields with the interface qubits of the selected pairing and using an optical merge arrangement to further interact the light fields with said at least one intermediate qubit; and
  removing the or each entangled intermediate qubit from entanglement;
the method further comprising, where there are multiple intermediate qubits and before they are removed from entanglement, entangling the intermediate qubits with each other.

14. A method according to claim 13, wherein the qubits of the selected pairing of interface qubits are initially separately entangled with respective further qubits, the method further comprising, after the qubits of said selected pairing of interface qubits have been entangled with said at least one intermediate qubit, removing these interface qubits from entanglement whereby on completion of the method said further qubits are entangled with each other but not with the interface or intermediate qubits.

15. A method according to claim 13, wherein a first one only of the qubits of the selected pairing of interface qubits is initially entangled with a further qubit, the method further comprising, after the qubits of said selected pairing of interface qubits have been entangled with said at least one intermediate qubit, removing from entanglement said first qubit of the selected pairing of interface qubits whereby on completion of the method said further qubit is entangled with the second one of the selected pairing of interface qubits but not with the first qubit of that pairing or with said at least one intermediate qubit.

16. A method according to claim 13, wherein neither of the qubits of the selected pairing of interface qubits is initially entangled and on completion of the method these qubits are entangled with each other.

17. A method according to claim 13 applied to the routing of entanglement building between quantum repeater chain segments.

18. A method according to claim 13 applied to the routing of entanglement building between qubits in a quantum computer to enable quantum teleportation therebetween.

* * * * *